(12) United States Patent
Palto

(10) Patent No.: US 8,142,863 B2
(45) Date of Patent: Mar. 27, 2012

(54) COLOR LIQUID CRYSTAL DISPLAY AND COMPENSATION PANEL

(75) Inventor: Serguei Palto, Moscow Region (RU)

(73) Assignee: Crysoptix, KK, Tokyo (JP)

( * ) Notice: Subject to any disclaimer, the term of this patent is extended or adjusted under 35 U.S.C. 154(b) by 65 days.

(21) Appl. No.: 12/426,329

(22) Filed: Apr. 20, 2009

(65) Prior Publication Data

US 2009/0268136 A1  Oct. 29, 2009

Related U.S. Application Data

(60) Provisional application No. 61/047,876, filed on Apr. 25, 2008.

(51) Int. Cl.
*G02B 5/30* (2006.01)
*G02F 1/13363* (2006.01)

(52) U.S. Cl. ........... 428/1.1; 428/1.5; 349/106; 349/117

(58) Field of Classification Search ............. 252/299.01; 428/1.1, 1.5; 349/117, 106
See application file for complete search history.

(56) References Cited

U.S. PATENT DOCUMENTS

| | | | |
|---|---|---|---|
| 6,245,399 | B1 | 6/2001 | Sahouani et al. |
| 6,565,974 | B1 | 5/2003 | Uchiyama et al. |
| 6,638,582 | B1 | 10/2003 | Uchiyama et al. |
| 6,730,446 | B2 | 5/2004 | Sahouani et al. |
| 7,376,327 | B2 * | 5/2008 | Galstian et al. ............... 385/140 |
| 2001/0008920 | A1 | 7/2001 | Arakawa |
| 2003/0218714 | A1 | 11/2003 | Song et al. |
| 2006/0098145 | A1 | 5/2006 | Kim et al. |
| 2007/0042137 | A1 | 2/2007 | Rao et al. |
| 2007/0247712 | A1 | 10/2007 | Rao et al. |
| 2009/0021673 | A1 * | 1/2009 | Fukagawa et al. ............... 349/96 |
| 2010/0085521 | A1 * | 4/2010 | Kasianova et al. ............ 349/117 |
| 2010/0118241 | A1 * | 5/2010 | Palto ............................. 349/118 |
| 2010/0149471 | A1 * | 6/2010 | Palto ............................. 349/117 |

FOREIGN PATENT DOCUMENTS

| | | |
|---|---|---|
| WO | 2005-045485 A1 | 5/2005 |
| WO | 2007-000705 A1 | 1/2007 |
| WO | 2007-086599 A1 | 8/2007 |

OTHER PUBLICATIONS

Bahadur, "Liquid Crystals: Applications and Uses," Liquid Crystals: Applications and Uses, 1990, World Scientific, Singapore-New York, vol. 1, p. 101.

(Continued)

*Primary Examiner* — Shean Wu
(74) *Attorney, Agent, or Firm* — Houst Consulting

(57) ABSTRACT

In one aspect of the present invention there is provided an optically anisotropic compensation panel with spectrally controllable dispersion of refractive indices. The compensation panel comprises at least one optically anisotropic layer based on an ordered guest-host system. The guest-host system comprises an anisotropic host matrix including an organic compound transparent to electromagnetic radiation in the visible spectral range, and guest component having guest particles. In another aspect the present invention provides a method of producing an optically anisotropic compensation panel disclosed. And in yet another embodiment the present invention provides a liquid crystal display with the compensation panel disclosed.

86 Claims, 34 Drawing Sheets

OTHER PUBLICATIONS

Kato et al., "Supramolecular hydrogen-bonded liquid-crystalline polymer complexes. Design of side-chain polymers and a host-guest system by noncovalent Interaction," Journal of polymer science, Part A, Polymer chemistry, 1996, vol. 34, No. 1, pp. 57-62.

Heilmeier et al., "Guest-Host Interactions in Nematic Liquid Crystals," Molecular Crystals and Liquid Crystals, 1969, vol. 8, pp. 293-304.

B. D. Bostwick et al., "Polarized Absorption Spectroscopy as a Tool in Studying Guest-Host Interactions in a Nematic Lyotropic Liquid Crystal," Mol. Cryst. Liq. Cryst., 1987, vol. 147, pp. 179-186.

Nakayama et al., "Development of low-retardation TAC film for protection films of LCD's Polarizer," J. Photopolym Sci. Technol., 2006, vol. 19, No. 2, pp. 169-173.

Uchiyama et al., "Novel Design Method Using Birefringence Dispersion Control of Retardation Films for High Contrast LCD in Wide Viewing Angle Range," IDW'04, 2004, pp. 647-650.

Tilsch et al., "Production scale deposition of multilayer film structures for birefringent optical components," Thin Solid Films, 2007, No. 516, pp. 107-113.

PCT, International Search Report and Written Opinion of the International Searching Authority in PCT/IB2009/051660, Aug. 31, 2009, 16 pages.

* cited by examiner (a)

(b)

(a)

(b)

COLOR LIQUID CRYSTAL DISPLAY AND COMPENSATION PANEL

FIELD OF THE INVENTION

This invention relates to a color liquid crystal display (LCD) device and, more particularly, to the improvement of color LCDs by using compensation panel with spectrally controllable dispersion of refractive indices.

BACKGROUND OF THE INVENTION

Liquid crystal displays are widely used in watches and clocks, photographic cameras, various instruments, computers, flat television sets, projection screens, and numerous information devices.

Electro-optical modes employed in LCDs include, in particular, the twisted nematic (TN), super twisted nematic (STN), optically compensated bend (OCB), and electrically controlled birefringence (ECB) modes, as well as some others and with their various modifications. All these modes use an electric field, which is substantially perpendicular to the substrate and, hence, to the liquid crystal (LC) layer. Besides these modes, there are several electro-optical modes employing an electric field substantially parallel to the substrate and, hence, to the liquid crystal layer, for example, the in-plane switching.

The in-plane switching (IPS) and vertically aligned (VA) modes are the most widely used in LCDs for large scale modern desktop monitors and TV sets, and are envisaged for use in future displays for multimedia applications.

A TN (twisted nematic) mode LCD is a common type of conventional LCD using liquid crystal molecules that have positive dielectric anisotropy and are horizontally aligned in a twisted state between two substrates. However the TN LCDs cannot display an absolute black state because of hardly compensated light leakage. On the other hand, the IPS LCD can display an almost complete black state in an OFF-state because the liquid crystal molecules are aligned almost horizontally and uniformly by the surfaces of the substrates so that the light polarized linearly along the LC optical axis undergoes no change in polarization state when passes through the liquid crystal layer. The VA mode LCD is also characterized by uniform distribution of LC molecules in the OFF-state. However, for a high-quality optical compensation of VA LCD one needs using at least two different types of the retardation films. Thus the light leakage remains a problem to be solved.

In connection with polarizing plates, compensation panel, retardation layers described in the present application, the following definitions of terms are used throughout the text.

The term optical axis refers to a direction in which the different linearly polarized components of propagating light have the same phase velocity and do not exhibit mutual retardation.

Any optically anisotropic medium is characterized by its second-rank dielectric permittivity tensor. A dielectric permittivity of any medium is determined by polarizability of particles forming this medium. If medium comprises supramolecules then dielectric permittivity of the medium is determined by orientation and polarizability of these supramolecules.

The classification of compensation panels is tightly connected to orientations of the principal axes of a particular permittivity tensor with respect to the natural coordinate frame of the compensation panel. The natural xyz coordinate frame of the panel is chosen so that the z-axis is parallel to the normal direction and the xy plane coincides with the panel surface.

FIG. 1 (prior art) demonstrates a general case when the principal axes (A, B, C) of the permittivity tensor are arbitrarily oriented relative to the xyz frame. Orientations of the principal axes can be characterized using three Euler's angles $(\theta, \phi, \psi)$ which, together with the principal permittivity tensor components $(\in_A, \in_B, \in_C)$, uniquely define different types of optical compensators. The case when all the principal components of the permittivity tensor have different values corresponds to a biaxial compensator, whereby the panel has two optical axes. For instance, in case of $\in_A < \in_B < \in_C$, these optical axes are in the plane of C and A axes on both sides from the C axis. In the uniaxial limit, when $\in_A = \in_B$, a degenerated case takes place when the two axes coincide and the C axis is a single optical axis.

In another example two principal axes A and B of the dielectric tensor lie in the panel plane, while the C-axis is normal to it. The x, y and z-axes of the laboratory frame can be chosen coinciding with A, B and C axes respectively. If, for instance, the lowest and highest magnitudes of three principal values $\in_A$, $\in_B$, and $\in_C$ of the dielectric permittivity tensor correspond to the A and B axes respectively, then $\in_A < \in_C < \in_B$, and two optical axes belong to the $A_B$ plane. For this reason such retardation layer is named "$A_B$" or "$B_A$" type panel (FIG. 2, prior art). The negative $A_B$ panel, when $\in_A - \in_B < 0$, is equivalent to positive $B_A$ panel or plate (replacing the order of the naming letters changes the sign of the dielectric permittivity difference: $\in_B - \in_A > 0$). Another fundamentally different case is when two optical axes belong to the plane orthogonal to the panel surface. This case takes place if the lowest or highest magnitude of one of the principal permittivity corresponds to the C-axis. For instance, in case of $\in_C < \in_B < \in_A$ the retardation layer is named negative $C_A$ or positive $A_C$ panel.

The zenith angle $\theta$ between the C axis and the z axis is most important in the definitions of various compensation types. There are several important types of uniaxial retardation layers, which are most frequently used in practice for compensation of LCD.

If a panel is defined by Euler angle $\theta = \pi/2$ and $\in_A = \in_B \neq \in_C$ then it is called "A-panel". In this case the principal C-axis lies in the panel plane (xy-plane), while A-axis is normal to the plane surface (due to the uniaxial degeneration the orthogonal orientations of A and B-axes can be chosen arbitrary in the plane that is normal to the xy-surface). In case of $\in_A = \in_B < \in_C$ the panel is named "positive A-panel" (FIG. 3(a), prior art). Contrary, if $\in_A = \in_B > \in_C$ the panel is named "negative A-panel" (FIG. 3(b), prior art).

A C-panel is defined by the Euler angle $\theta = 0$ and $\in_A = \in_B \neq \in_C$. In this case, the principal C axis (extraordinary axis) is normal to the panel surface (xy plane). In case of $\in_A = \in_B < \in_C$, the panel is named "positive C-panel". On the contrary, if $\in_A = \in_B > \in_C$, the panel is named "negative C-panel". FIG. 4 (Prior art) shows the orientation of the principal axes of a particular permittivity tensor with respect to the natural coordinate frame of the positive (a) and negative (b) C-panel. The axes OA and OB located in a xy plane are equivalent.

Generally when the permittivity tensor components ($\in_A$, $\in_B$, and $\in_C$) are complex values, the principal permittivity tensor components ($\in_A$, $\in_B$, and $\in_C$), the refractive indices (na, nb, and nc), and the absorption coefficients (ka, kb, and kc) meet the following conditions: na=Re[$(\in_A)^{1/2}$], nb=Re $[(\epsilon_B)^{1/2}]$, nc=Re$[(\epsilon_C)^{1/2}]$, ka=$(4\pi/\lambda)$Im$[(\epsilon_A)^{1/2}]$, kb=$(4\pi/\lambda)$Im$[(\epsilon_B)^{1/2}]$, kc=$(4\pi/\lambda)$Im$[(\epsilon_C)^{1/2}]$, where $\lambda$ is a free space wavelength.

The optical characteristics of LCD devices can be improved by application of one or more layers having optical birefringence. In the conventional commercial displays the retardation layers (or retardation films) are used in order to solve the problems of low contrast and light leakage. The typical retardation film consists of at least one homogeneous layer of uni- or biaxial birefringent material, and is disposed between a polarizer and a liquid crystal cell. The retardation film for compensation of contrast ratio at oblique viewing angles comprises a negative C-type panel for compensating an in-plane retardation ($R_{in}$), and a negative A-type panel for compensating out-of-plane retardation ($R_{out}$) which should be placed in a specific order to increase the contrast at wide viewing angles.

However, typical retardation films have a normal dispersion and cannot provide the solution to the above referenced disadvantages in the entire visible spectral range. It can result in the distortion of color of the displayed picture, especially at wide viewing angles. Usually the optimization of LCD is held in the maximal sensitivity human eye vision range for the light wavelength of 550 nm. Therefore, the maximal distortions arise in the red and blue parts of the light spectrum. In the present invention it is supposed that the visible spectral range has a lower boundary that is approximately equal to 400 nm, and an upper boundary that is approximately equal to 750 nm.

FIG. 5 (prior art) demonstrates a typical liquid crystal cell 1 of a color liquid crystal display. The liquid crystal cell comprises front substrate 2 with color filters 3, black matrix 4 and planarization layer 5; liquid crystal layer 6; other functional layers 7 comprising electrode and alignment layers; and a back substrate 8 with electrodes, driving elements and alignment layers.

The present invention provides a compensated color liquid crystal display with improved optical performance, in particular, higher contrast and better color rendering at a wide range of viewing angles, and reduced color shift in an entire viewing angle range. These advantages are provided along with the simplified manufacturing technology.

SUMMARY OF THE INVENTION

The present invention provides an optically anisotropic compensation panel comprising at least one optically anisotropic layer based on an ordered guest-host system comprising an anisotropic host matrix, and a guest component comprising guest particles, wherein the anisotropic host matrix comprises an organic compound transparent to electromagnetic radiation in the visible spectral range, the guest particles provide an absorption additional to an absorption of the anisotropic host matrix, and said additional absorption is realized in at least one principal direction of the anisotropic host matrix in at least one subrange of the wavelength range from approximately 250 to 2500 nm; and wherein the compensation panel possesses a spectrally controllable dispersion of refractive indices.

In a further aspect, the present invention also provides a method of producing an optically anisotropic compensation panel based on an ordered guest-host system and having spectral dependencies of principal refractive indices $n_x(\lambda)$, $n_y(\lambda)$ and $n_z(\lambda)$, wherein at least one of them possesses anomalous spectral dispersion in at least one subrange of the visible spectral range and which includes the following steps:

a) assignment of spectral dependencies of principal refractive indices $n_x(\lambda)$, $n_y(\lambda)$ and $n_z(\lambda)$, so that at least one difference of the principal refractive indices $\Delta_v(\lambda)$ defining the optical anisotropy satisfies the condition $\partial \Delta_v(\lambda)/\partial \lambda \geqq 0$ in the visible spectral range, wherein subscript v is selected from the list comprising in and out;

b) numerical designation and variation of principal absorption coefficient spectra $k_{x,cal}(\lambda)$, $k_{y,cal}(\lambda)$, and $k_{z,cal}(\lambda)$ until the spectral dependencies $n_x(\lambda)=KK(k_x(\lambda))$, $n_y(\lambda)=KK(k_y(\lambda))$ and $n_z(\lambda)=KK(k_z(\lambda))$ evaluated according to Kramers-Kronig relation satisfy the spectral dependencies for the refractive indices as specified in step (a);

c) selection of at least one organic compound substantially transparent to electromagnetic radiation in the visible spectral range which serves as a host component capable of forming an optically anisotropic host matrix with normal spectral dispersion in the visible range that is characterized by the absorption coefficients $k_{x,h}(\lambda)$, $k_{y,h}(\lambda)$ and $k_{z,h}(\lambda)$ in the UV spectral range;

d) selection of at least one type of guest particles capable of absorbing electromagnetic radiation in at least one subrange of the wavelength range from 250 to 2500 nm, to fit into the host matrix as a guest component and which are characterized by the absorption coefficients $k_{x,g}(\lambda)$, $k_{y,g}(\lambda)$ and $k_{z,g}(\lambda)$;

e) optimization of the guest-components quantity which minimizes inconsistence between the calculated absorption spectra $k_{x,cal}(\lambda)$, $k_{y,cal}(\lambda)$ and $k_{z,cal}(\lambda)$ according to step b) and appropriate functions $k_{x,h}(\lambda)+k_{x,g}(\lambda)$, $k_{y,h}(\lambda)+k_{y,g}(\lambda)$, and $k_{z,h}(\lambda)+k_{z,g}(\lambda)$ in the wavelength range from 250 to 2500 nm;

f) formation of a coating solution according to previous steps, wherein at least one organic compound transparent to electromagnetic radiation in the visible spectral range and at least one type of guest particles capable of absorbing electromagnetic radiation in at least one subrange of the wavelength range from 250 to 2500 nm are used;

g) application of the coating solution onto a substrate to form a liquid layer;

h) application of an external alignment action upon the liquid layer, i) drying with formation of a solid guest-host layer, and j) measurements of experimental spectra $k_x(\lambda)$, $k_y(\lambda)$, and $k_z(\lambda)$ for the solid guest-host layer and repeating steps c) to i) until an inconsistence between the measured and calculated absorption spectra $k_{x,cal}(\lambda)$, $k_{y,cal}(\lambda)$, and $k_{z,cal}(\lambda)$ is minimal.

In yet a further aspect, the present invention provides a color liquid crystal display comprising a liquid crystal cell, first and second polarizers arranged on each side of the liquid crystal cell, and at least one compensation panel located between said polarizers. The compensation panel comprises at least one optically anisotropic layer based on an ordered guest-host system, wherein the guest-host system comprising an anisotropic host matrix comprising an organic compound transparent to electromagnetic radiation in the visible spectral range, and a guest component comprising guest particles, wherein the guest particles provide an absorption additional to an absorption of the anisotropic host matrix, and wherein said additional absorption is realized in at least one principal direction of the anisotropic host matrix in at least one subrange of the wavelength range from approximately 250 to 2500 nm.

BRIEF DESCRIPTION OF THE DRAWINGS

The subject of the invention is illustrated by the following Figures, of which.

DETAILED DESCRIPTION OF THE INVENTION

Figure 1:
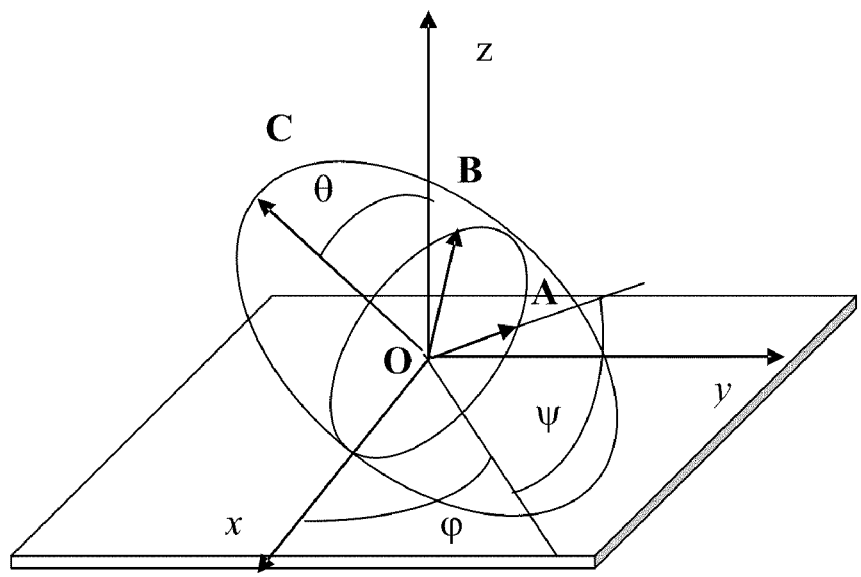
FIGS. 1 to 5 are described hereinabove as illustrations to prior art.
Figure 2:
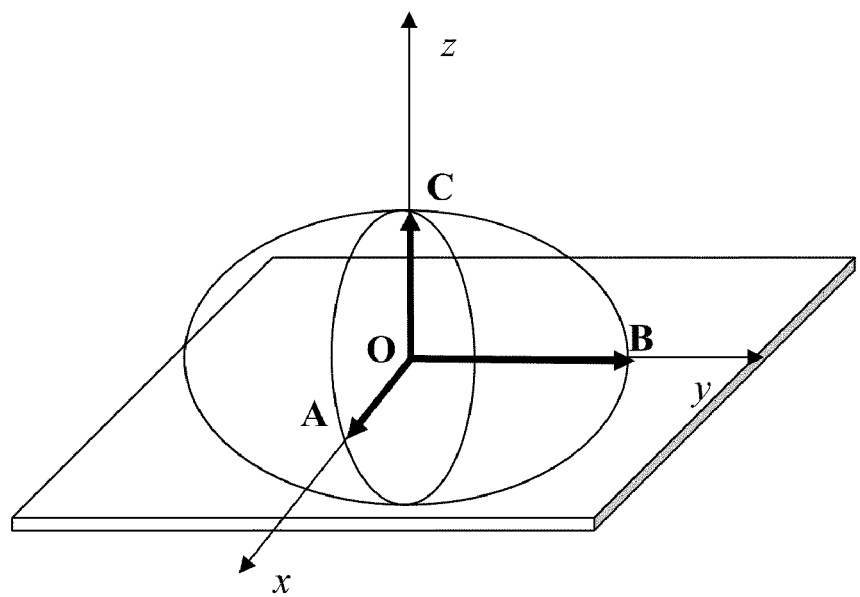
Figure 3:
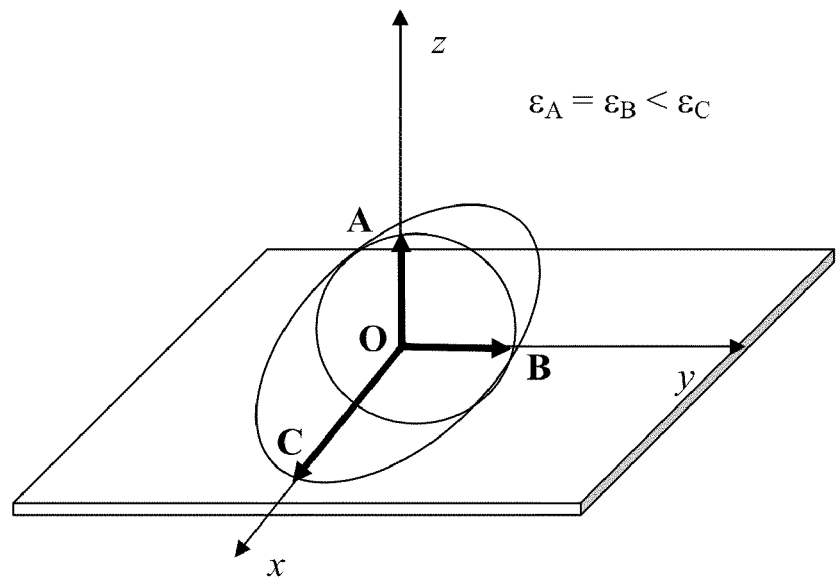
Figure 3:
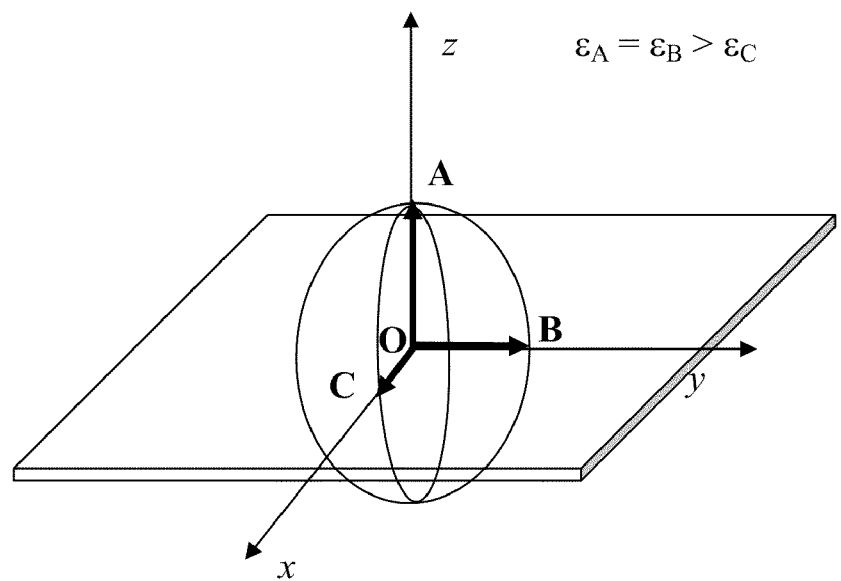
Figure 4:
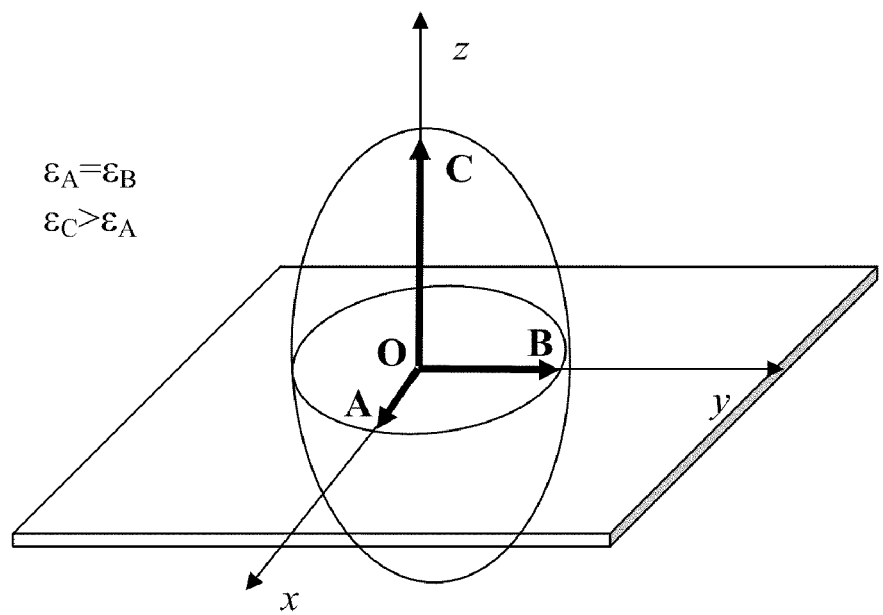
Figure 4:
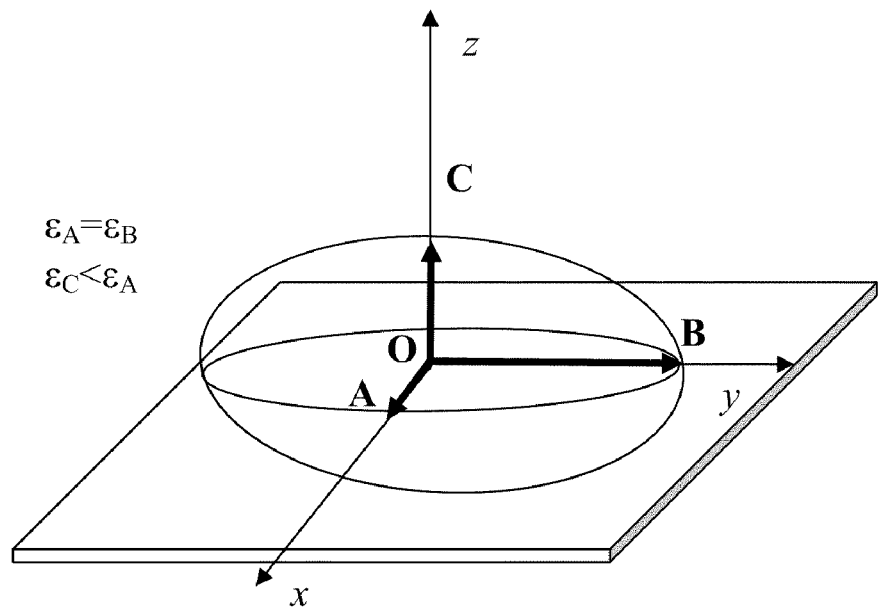

Definitions of various terms used in the description and claims of the present invention are listed below.

The term "visible spectral range" refers to a spectral range having the lower boundary approximately equal to 400 nm, and upper boundary approximately equal to 750 nm.

The term "compensation panel" refers to an optical device which includes at least one optically anisotropic layer which is characterized by three principal refractive indices ($n_x$, $n_y$, and $n_z$), wherein two principal directions for refractive indices $n_x$ and $n_y$ belong to xy-plane coinciding with a plane of the compensation panel and one principal direction for refractive index ($n_z$) coincides with a normal line to the compensation panel (the in-plane x and y axes are chosen so they always coincide with the in-plane principal axes).

The term "in-plane difference of refractive indices $\Delta_{in}(\lambda)$" is defined as an absolute value of a difference of two in-plane indexes $|n_y(\lambda) - n_x(\lambda)|$ and characteristic of in-plane optical anisotropy.

The term "out-of-plane difference of refractive indices $\Delta_{out}(\lambda)$" is defined as an absolute value of a difference of vertical index $n_z$ and one in-plane index $n_x$: $|n_z(\lambda) - n_x(\lambda)|$ and characteristic of out-of-plane optical anisotropy.

The term "optically anisotropic layer of $B_A$-type" refers to an optical layer for which refractive indices $n_x$, $n_y$, and $n_z$ obey the following condition in the visible spectral range: $n_y > n_z > n_x$ or $n_x > n_z > n_y$.

The term "optically anisotropic layer of negative A-type" refers to an optical layer for which refractive indices $n_x$, $n_y$, and $n_z$ obey the following condition in the visible spectral range: $n_z = n_y > n_x$ or $n_z = n_x > n_y$.

The term "optically anisotropic layer of positive A-type" refers to an optical layer for which refractive indices $n_x$, $n_y$, and $n_z$ obey the following condition in the visible spectral range: $n_z = n_x < n_y$, or $n_z = n_y < n_x$.

The term "optically anisotropic layer of $A_C$-type" refers to an optical layer for which refractive indices $n_x$, $n_y$, and $n_z$ obey the following condition in the visible spectral range: $n_y > n_x > n_z$ or $n_x > n_y > n_z$ (positive $A_C$-type) or $n_y < n_x < n_z$ or $n_x < n_y < n_z$. (negative $A_C$-type)

The term "optically anisotropic layer of negative C-type" refers to an optical layer for which refractive indices $n_x$, $n_y$, and $n_z$ obey the following condition in the visible spectral range: $n_x = n_y > n_z$.

The term "optically anisotropic layer of positive C-type" refers to an optical layer for which refractive indices $n_x$, $n_y$, and $n_z$ obey the following condition in the visible spectral range: $n_x=n_y<n_z$.

The above mentioned definitions are invariant to rotation of system of coordinates (of the laboratory frame) for 90 degrees around the vertical 0z-axis for all the types of anisotropic layers.

The term "guest-host system" refers to an optical system comprising host matrix and a guest component, wherein the host matrix is characterized by three principal refractive indices ($n_{x,h}$, $n_{y,h}$ and $n_{z,h}$), two principal directions for refractive indices $n_{x,h}$ and $n_{y,h}$ belong to xy-plane coinciding with a plane of the compensation panel, and one principal direction for refractive index ($n_{z,h}$) coincides with a normal line to the compensation panel.

The term "anisotropic host matrix of $B_A$-type" refers to a host matrix wherein refractive indices $n_{x,h}$, $n_{y,h}$, and $n_{z,h}$ obey the following condition in the visible spectral range: $n_{y,h}>n_{z,h}>n_{x,h}$ or $n_{x,h}>n_{z,h}>n_{y,h}$ The term "anisotropic host matrix of positive A-type" refers to a host matrix, wherein refractive indices $n_{x,h}$, $n_{y,h}$, and $n_{z,h}$ obey the following condition in the visible spectral range: $n_{z,h}=n_{x,h}<n_{y,h}$ or $n_{z,h}=n_{y,h}<n_{x,h}$ The term "anisotropic host matrix of negative A-type" refers to a host matrix, wherein refractive indices $n_{x,h}$, $n_{y,h}$, and $n_{z,h}$ obey the following condition in the visible spectral range: $n_{z,h}=n_{y,h}>n_{x,h}$ or $n_{z,h}=n_{x,h}>n_{y,h}$.

The term "anisotropic host matrix of $A_C$-type" refers to a host matrix, wherein refractive indices $n_{x,h}$, $n_{y,h}$, and $n_{z,h}$ obey the following condition in the visible spectral range: $n_{y,h}>n_{x,h}>n_{z,h}$, or $n_{x,h}>n_{y,h}>n_{z,h}$ (for positive $A_C$-type) and $n_{y,h}<n_{x,h}<n_{z,h}$, or $n_{x,h}<n_{y,h}<n_{z,h}$ (for negative $A_C$ type)

The term "anisotropic host matrix of positive C-type" refers to a host matrix, wherein refractive indices $n_{x,h}$, $n_{y,h}$, and $n_{z,h}$ obey the following condition in the visible spectral range: $n_{x,h}=n_{y,h}<n_{z,h}$ The term "anisotropic host matrix of negative C-type" refers to a host matrix, wherein refractive indices $n_{x,h}$, $n_{y,h}$, and $n_{z,h}$ obey the following condition in the visible spectral range: $n_{x,h}=n_{y,h}>n_{z,h}$ The above mentioned definitions are invariant to rotation of system of coordinates (of the laboratory frame) for 90 degrees around of the vertical 0z-axis for all the types of the anisotropic host matrix.

The present invention provides an optically anisotropic compensation panel comprising at least one optically anisotropic layer based on an ordered guest-host system comprising an anisotropic host matrix, and a guest component comprising guest particles, wherein the anisotropic host matrix comprises an organic compounds transparent to electromagnetic radiation in the visible spectral range, the guest particles provide an absorption additional to an absorption of the anisotropic host matrix, and said additional absorption is realized in at least one principal direction of the anisotropic host matrix in at least one subrange of the wavelength range from approximately 250 to 2500 nm; and wherein the compensation panel possesses a spectrally controllable dispersion of refractive indices.

In one embodiment of the disclosed optically anisotropic compensation panel, the optically anisotropic layer is characterized by three principal refractive indices ($n_x$, $n_y$, and $n_z$), at least one of which satisfies the condition $\partial n_u(\lambda)/\partial \lambda \geqq 0$ in at least one subrange of the visible spectral range, wherein the subscript u is selected from the list comprising x, y and z.

In another embodiment of the disclosed optically anisotropic compensation panel, the optically anisotropic layer possesses biaxial properties of $B_A$-type. This optically anisotropic layer is characterized by an in-plane difference of refractive indices $\Delta_{in}(\lambda)=|n_y(\lambda)-n_x(\lambda)|$ which satisfies the condition $\partial \Delta_{in}(\lambda)/\partial \lambda \geqq 0$ in at least one wavelength subrange of the visible spectral range. In this embodiment, the optically anisotropic layer may be further characterized by an out-of-plane difference of refractive indices $\Delta_{out}(\lambda)=|n_z(\lambda)-n_x(\lambda)|$ which satisfies the condition $\Delta_{out}(\lambda)/\partial \lambda \geqq 0$ in at least one wavelength subrange of the visible spectral range.

In still another embodiment of the disclosed optically anisotropic compensation panel, the optically anisotropic layer possesses biaxial properties of $B_A$-type. This optically anisotropic layer is characterized by an out-of-plane difference of refractive indices $\Delta_{out}(\lambda)=|n_z(\lambda)-n_x(\lambda)|$ which satisfies the condition $\partial \Delta_{out}(\lambda)/\partial \lambda \geqq 0$ in at least one wavelength subrange of the visible spectral range.

In yet another embodiment of the disclosed optically anisotropic compensation panel, the optically anisotropic layer possesses uniaxial properties of negative A-type. This optically anisotropic layer is characterized by an in-plane difference of refractive indices $\Delta_{in}(\lambda)=|n_y(\lambda)-n_x(\lambda)|$ which satisfies the condition $\partial \Delta_{in}(\lambda)/\partial \lambda \geqq 0$ in at least one wavelength subrange of the visible spectral range.

In one embodiment of the disclosed optically anisotropic compensation panel, the optically anisotropic layer possesses uniaxial properties of positive A-type. This optically anisotropic layer is characterized by an in-plane difference of refractive indices $\Delta_{in}(\lambda)=|n_y(\lambda)-n_x(\lambda)|$ which satisfies the condition $\partial \Delta_{in}(\lambda)/\partial \lambda \geqq 0$ in at least one wavelength subrange of the visible spectral range.

In another embodiment of the disclosed optically anisotropic compensation panel, the optically anisotropic layer possesses biaxial properties of $A_C$-type. This optically anisotropic layer is characterized by an in-plane difference of refractive indices $\Delta_{in}(\lambda)=|n_y(\lambda)-n_x(\lambda)|$ which satisfies the condition $\partial \Delta_{in}(\lambda)/\partial \lambda \geqq 0$ in at least one wavelength subrange of the visible spectral range. In this embodiment, the optically anisotropic layer may be further characterized by an out-of-plane difference of refractive indices $\Delta_{out}(\lambda)=|n_x(\lambda)-n_z(\lambda)|$ which satisfies the condition $\Delta_{out}(\lambda)/\partial \lambda \geqq 0$ in at least one wavelength subrange of the visible spectral range.

In still another embodiment of the disclosed optically anisotropic compensation panel, the optically anisotropic layer possesses biaxial properties of $A_C$-type. This optically anisotropic layer is characterized by an out-of-plane difference of refractive indices $\Delta_{out}(\lambda)=|n_x(\lambda)-n_z(\lambda)|$ which satisfies the condition $\Delta_{out}(\lambda)/\partial \lambda \geqq 0$ in at least one wavelength subrange of the visible spectral range.

In yet another embodiment of the disclosed optically anisotropic compensation panel, the optically anisotropic layer possesses uniaxial properties of negative C-type. This optically anisotropic layer is characterized by an out-of-plane difference of refractive indices $\Delta_{out}(\lambda)=|n_x(\lambda)-n_z(\lambda)|$ which satisfies the condition $\Delta_{out}(\lambda)/\partial \lambda \geqq 0$ in at least one wavelength subrange of the visible spectral range.

In one embodiment of the disclosed optically anisotropic compensation panel, the optically anisotropic layer possesses uniaxial properties of positive C-type. This optically anisotropic layer is characterized by an out-of-plane difference of refractive indices $\Delta_{out}(\lambda)=|n_z(\lambda)-n_x(\lambda)|$ which satisfies the condition $\Delta_{out}(\lambda)/\partial\lambda \geqq 0$ in at least one wavelength subrange of the visible spectral range.

In another embodiment of the disclosed optically anisotropic compensation panel, the in-plane difference of refractive indices $\Delta_{in}(\lambda)$ obeys the following condition: spectral dispersion factors $(\Delta_{in,450}/\Delta_{in,550})$ and $(\Delta_{in,550}/\Delta_{in,650})$ are in a range of 0.4-1.0, wherein $\Delta_{in,450}$, $\Delta_{in,550}$ and $\Delta_{in,650}$ are values of the in-plain differences of refractive indices at wavelengths of 450 nm, 550 nm and 650 nm respectively.

In still another embodiment of the disclosed optically anisotropic compensation panel, the out-of-plane difference of refractive indices $\Delta_{out}(\lambda)$ obeys the following condition: spectral dispersion factors $(\Delta_{out,450}/\Delta_{out,550})$ and $(\Delta_{out,550}/\Delta_{out,650})$ are in a range of 0.4-1.0, wherein $\Delta_{out,450}$, $\Delta_{out,550}$ and $\Delta_{out,650}$ are values of the out-of-plane difference of refractive indices $\Delta_{out}(\lambda)$ at wavelengths of 450 nm, 550 nm and 650 nm respectively.

In one embodiment of the disclosed optically anisotropic compensation panel, the organic compound for the host matrix has a general structural formula I

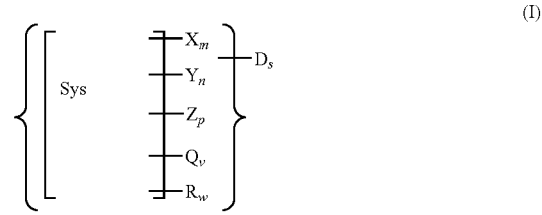

(I)

where Sys is an at least partially conjugated substantially planar polycyclic molecular system, X is a carboxylic group —COOH, m is 0, 1, 2, 3 or 4; Y is a sulfonic group —$SO_3H$, n is 0, 1, 2, 3 or 4; Z is a carboxamide, p is 0, 1, 2, 3 or 4; Q is a sulfonamide, v is 0, 1, 2, 3 or 4; D is a counterion; s is the number of counterions providing electrically neutral state of the molecule; R is a substituent selected from the list comprising $CH_3$, $C_2H_5$, Cl, Br, $NO_2$, F, $CF_3$, CN, OH, $OCH_3$, $OC_2H_5$, $OCOCH_3$, OCN, SCN, $NH_2$, and $NHCOCH_3$, and w is 0, 1, 2, 3 or 4. In another embodiment of the disclosed optically anisotropic compensation panel, the polycyclic molecular system Sys is substantially transparent in the visible spectral range. In still another embodiment of the disclosed optically anisotropic compensation panel, the polycyclic molecular system Sys has a general structural formula from the list comprising structures II to XLVI shown in the Table 1.

TABLE 1

Examples of polycyclic molecular systems (Sys)

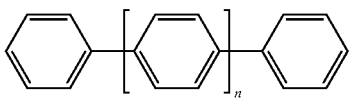

(II)

where n is a number in the range from 1 to 8
Oligophenyls

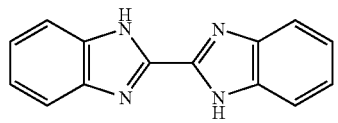

(III)

1H, 1'H-2,2'-bibenzimidazole

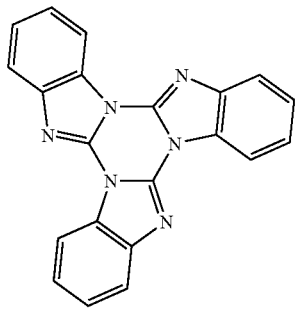

(IV)

bisbenzimidazo[1',2':3,4;1'',2'':5,6][1,3,5]
triazino[1,2-a]benzimidazole

TABLE 1-continued
Examples of polycyclic molecular systems (Sys)
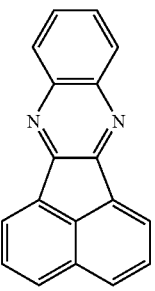
acenaphtho[1,2-b]quinoxaline (V)
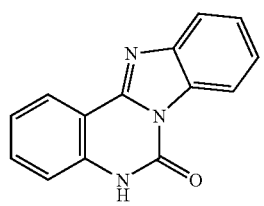
benzimidazo[1,2-c]quinazolin-6(5H)-one (VI)
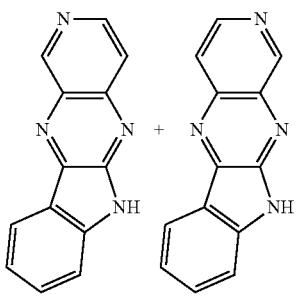
6H-pyrido[3′,4′:5,6]pyrazino[2,3-b]indole &
10H-pyrido[4′,3′:5,6]pyrazino[2,3-b]indole (VII)
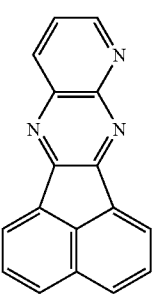
acenaphtho[1,2-b]pyrido[2,3-e]pyrazine (VIII)
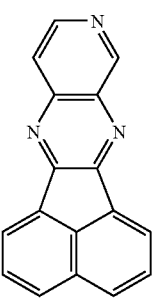
acenaphtho[1,2-b]pyrido[3,4-e]pyrazine (IX)

TABLE 1-continued
Examples of polycyclic molecular systems (Sys)
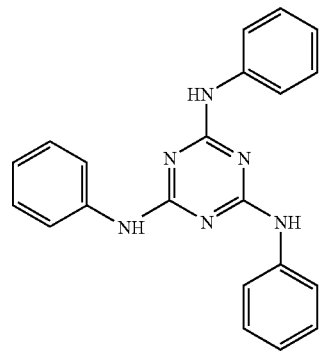
N,N',N''-triphenyl-1,3,5-triazine-2,4,6-triamine
(X)
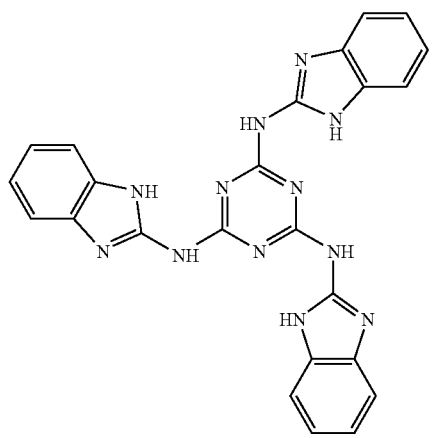
N,N',N''-tris(1H-benzimidazol-2-yl)-1,3,5-triazine-2,4,6-triamine
(XI)
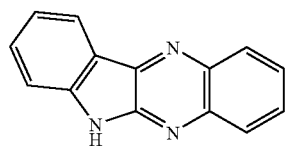
6H-indolo[2,3-b]quinoxaline
(XII)
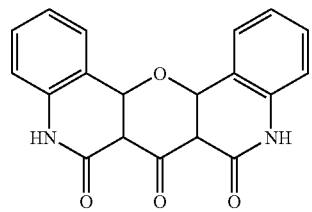
3,4,6,7-Dibenzo-4a,5a,9a,10a-tetrahydro-1H-
pyrido[3',4':5,6]pyrano[3,2-c]pyridine-1,9,10(2H,8H)-trione
(XIII)

TABLE 1-continued
Examples of polycyclic molecular systems (Sys)
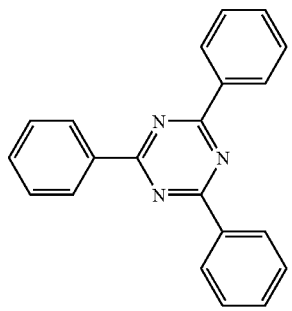
2,4,6-triphenyl-1,3,5-triazine
(XIV)
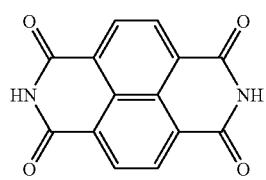
benzo[lmn]-3,8-phenanthroline-1,3,6,8(2H,7H)-tetrone
(XV)
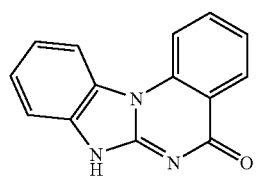
benzimidazo[1,2-a]quinazolin-5(7H)-one
(XVI)
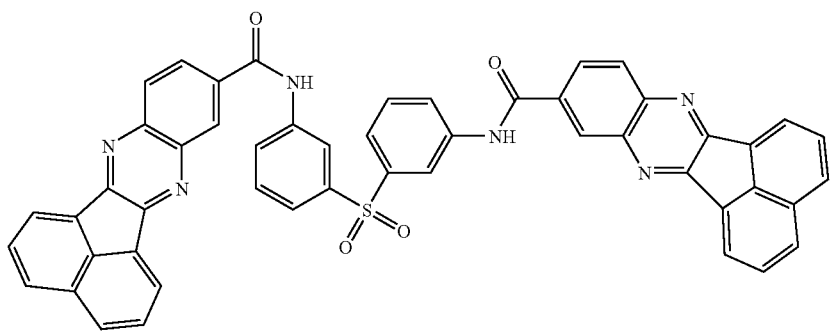
N,N′-[sulfonylbis(3,1-phenylene)]bisacenaphtho[1,2-b]quinoxaline-9-carboxamide
(XVII)
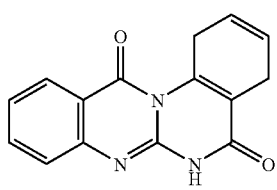
4H-quinazolino[3,2-a]quinazoline-5,12
(1H,6H)-dione
(XVIII)

TABLE 1-continued
Examples of polycyclic molecular systems (Sys)
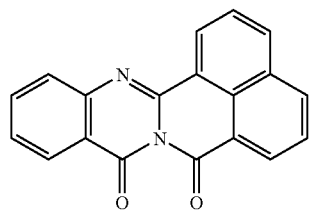
(XIX)
7H,9H-benzo[4,5]isoquino[1,2-b]
quinazoline-7,9-dione
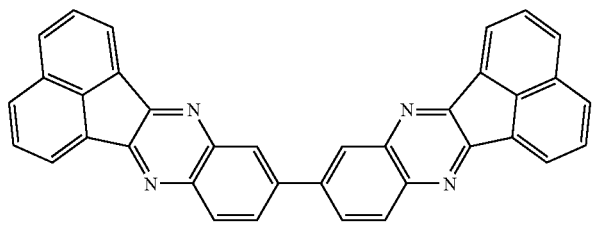
(XX)
7H,9H-benzo[4,5]isoquino[1,2-b]quinazoline-7,9-dione
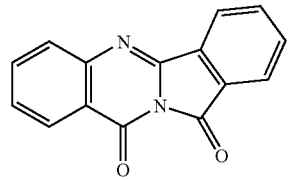
(XXI)
isoindolo[1,2-b]quinazoline-10,12-dione
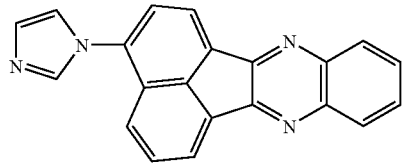
(XXII)
3-(1H-imidazol-1-yl)acenaphtho[1,2-b]quinoxaline
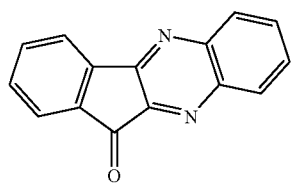
(XXIII)
11H-indeno[1,2-b]quinoxalin-11-one
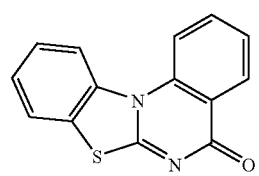
(XXIV)
5H-[1,3]benzothiazolo[3,2-a]quinazolin-5-one
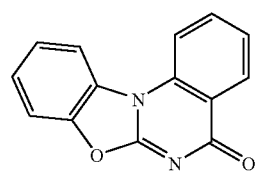
(XXV)
5H-[1,3]benzoxazolo[3,2-a]quinazolin-5-one TABLE 1-continued
Examples of polycyclic molecular systems (Sys)
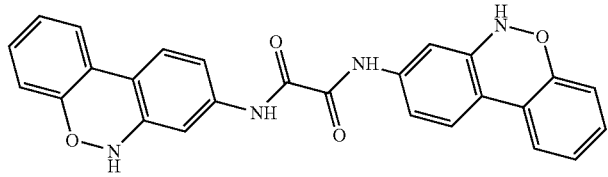
N,N'-di-6H-dibenzo[c,e][1,2]oxazin-8-ylethanediamide
(XXVI)
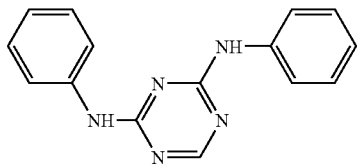
N,N'-diphenyl-1,3,5-triazine-2,4-diamine
(XXVII)
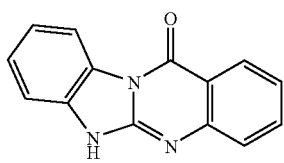
benzimidazo[2,1-b]quinazolin-12(6H)-one
(XXVIII)
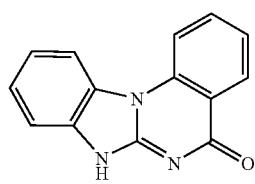
benzimidazo[1,2-a]quinazolin-5(7H)-one
(XXIX)
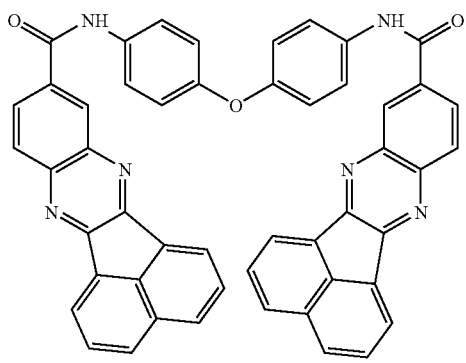
N,N'-[oxybis(4,1-phenylene)]bisacenaphtho[1,2-b]quinoxaline-9-carboxamide
(XXX)
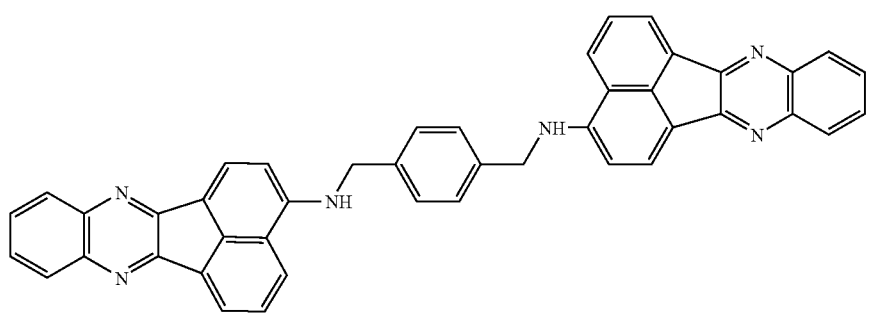
N,N'-[1,4-phenylenedi(methylene)]bisacenaphtho[1,2-b]quinoxalin-3-amine
(XXXI)

TABLE 1-continued
Examples of polycyclic molecular systems (Sys)
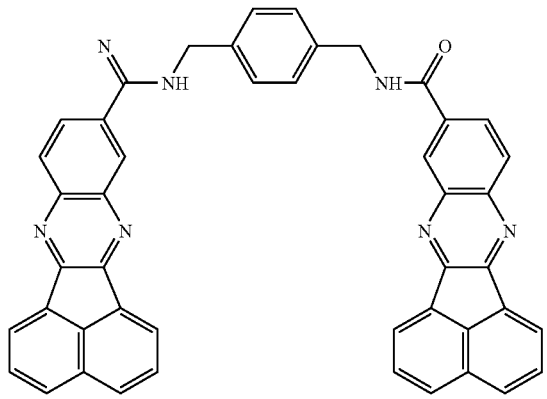
N,N'-[1,4-phenylenedi(methylene)]bisacenaphtho[1,2-b]quinoxaline-9-carboxamide
(XXXII)
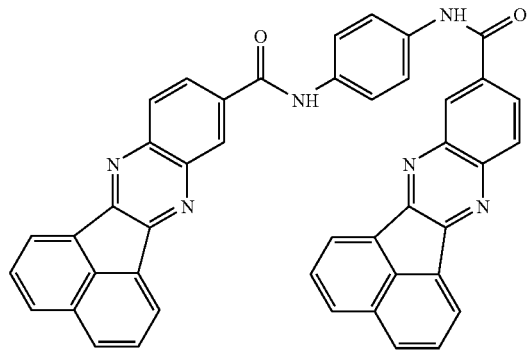
N,N'-1,4-phenylenebisacenaphtho[1,2-b]quinoxaline-9-carboxamide
(XXXIII)
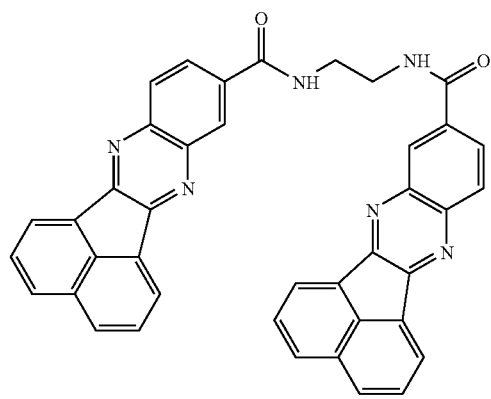
N,N'-ethane-1,2-diylbisacenaphtho[1,2-b]quinoxaline-9-carboxamide
(XXXIV)
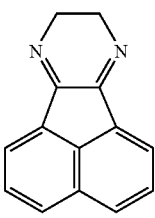
8,9-dihydroacenaphtho[1,2-b]pyrazine
(XXXV)

TABLE 1-continued
Examples of polycyclic molecular systems (Sys)
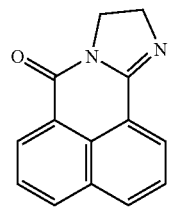
9,10-dihydro-7H-benzo[de]imidazo
[2,1-a]isoquinolin-7-one
(XXXVI)
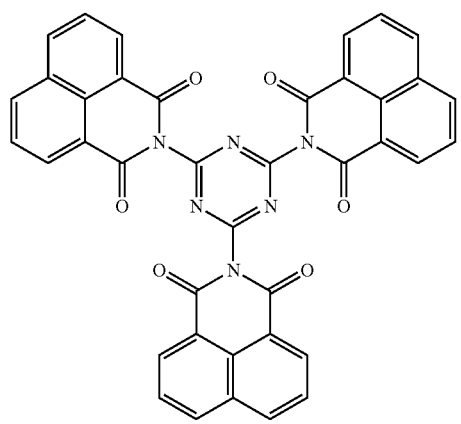
2,2',2''-(1,3,5-triazine-2,4,6-triyl)tris(1H-benzo[de]
isoquinoline-1,3(2H)-dione)
(XXXVII)
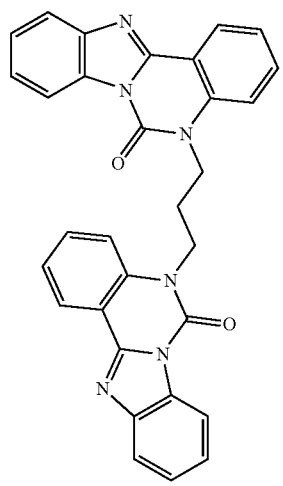
5,5'-propane-1,3-diylbisbenzimidazo[1,2-c]
quinazolin-6(5H)-one
(XXXVIII)

TABLE 1-continued
Examples of polycyclic molecular systems (Sys)
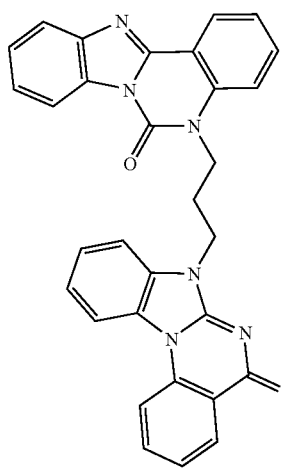
5-[3-(5-oxobenzimidazo[1,2-a]quinazolin-7(5H)-yl)propyl]benzimidazo[1,2-c]quinazolin-6(5H)-one
(XXXIX)
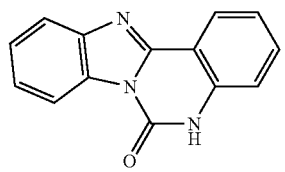
benzimidazo[1,2-c]quinazolin-6(5H)-one
(XL)
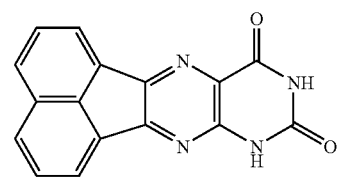
acenaphtho[1,2-g]pteridine-9,11(8H,10H)-dione
(XLI)
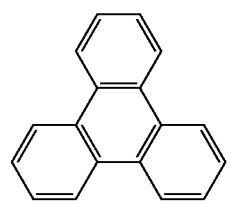
triphenylene
(XLII)
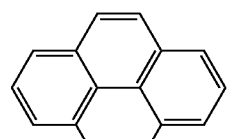
pyrene
(XLIII)
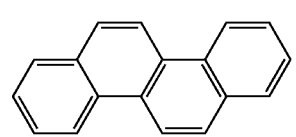
chrysene
(XLIV)

TABLE 1-continued

Examples of polycyclic molecular systems (Sys)

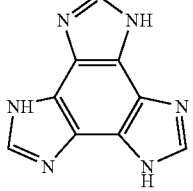

Tris(imidazole) (XLV)

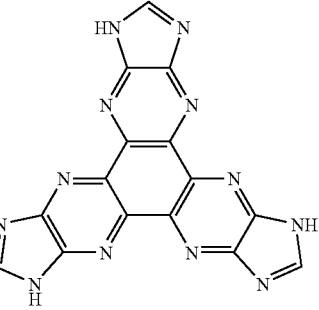

6,11-dihydro-1H-imidazo[4,5-b]bisimidazo
[4',5':5,6]pyrazino[2,3-f:2',3'-h]quinoxaline (XLVI)

In yet another embodiment of the disclosed optically anisotropic compensation panel, the counterion is selected from the list comprising $H^+$, $NH_4^+$, $Na^+$, $K^+$, $Li^+$, $Ba^{++}$, $Ca^{++}$, $Mg^{++}$, $Sr^{++}$, $Cs^+$, $Pb^{++}$, and $Zn^{++}$.

In one embodiment of the disclosed optically anisotropic compensation panel, the organic compound is an oligophenyl derivative. The examples of the oligophenyl derivative of a general structural formula corresponding to structures 1 to 7 are given in Table 2.

TABLE 2

Examples of the structural formulas of oligophenyl derivative

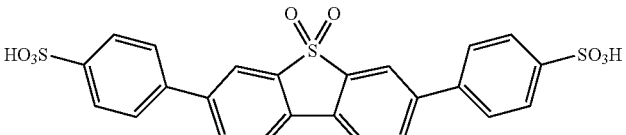

4,4'-(5,5-dioxidodibenzo[b,d]thiene-3,7-diyl)dibenzenesulfonic (1)

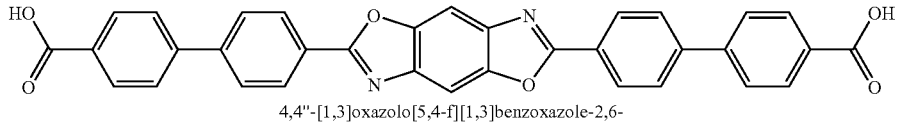

4,4''-[1,3]oxazolo[5,4-f][1,3]benzoxazole-2,6-diyldibiphenylsulfonic acid (2)

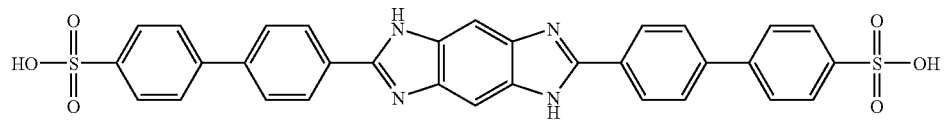

4,4''-(1,5-dihydroimidazo[4,5-f]benzimidazole-2,6-diyl)dibiphenylsulfonic acid (3)

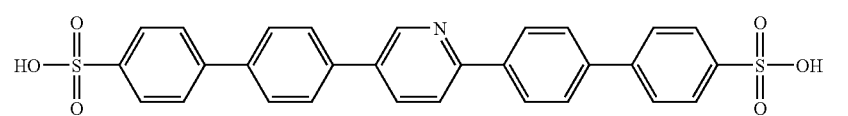

4',4''-pyridine-2,5-diyldibiphenyl-4-sulfonic acid (4)

TABLE 2-continued

Examples of the structural formulas of oligophenyl derivative (5) 4',4''-pyrazine-2,5-diyldibiphenyl-4-sulfonic acid (6) 4',4''-pyrimidine-2,5-diyldibiphenyl-4-carboxylic acid (7) 4',4''-(1,3,4-oxadiazole-2,5-diyl)dibiphenyl-4-sulfonic acid In another embodiment of the disclosed optically anisotropic compensation panel, the organic compound is selected from the list comprising derivatives of 1H,1'H-2,2'-bibenzimidazole, derivatives of 2,2'-bi-1,3-benzoxazole, and derivatives of 2,2'-bi-1,3-benzothiazole. In yet another embodiment of the present invention, the organic compound has general structural formulas shown in Table 3.

TABLE 3

Examples of 2,2'-bibenzheteroazole derivatives (8), (9), (10), (11), (12), (13)

TABLE 3-continued

Examples of 2,2'-bibenzheteroazole derivatives (14), (15), (16), (17), (18), (19), (20)

TABLE 3-continued

Examples of 2,2'-bibenzheteroazole derivatives

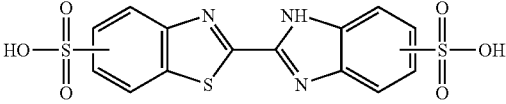

(21)

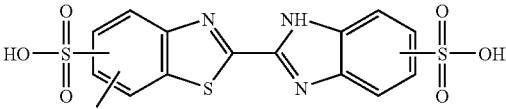

(22)

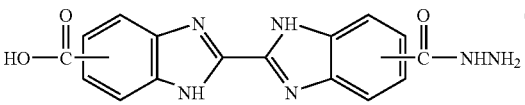

(23)

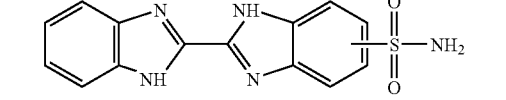

(24)

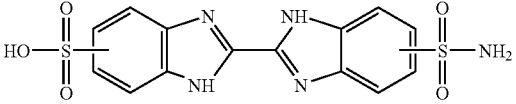

(25)

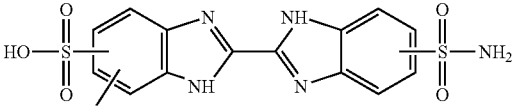

(26)

In still another embodiment of the disclosed optically anisotropic compensation panel, the organic compound is a "triazine" derivative and has a general structural formula corresponding to one of structures 27 to 29 shown in Table 4.

TABLE 4

Examples of the structural formulas of "triazine" derivatives

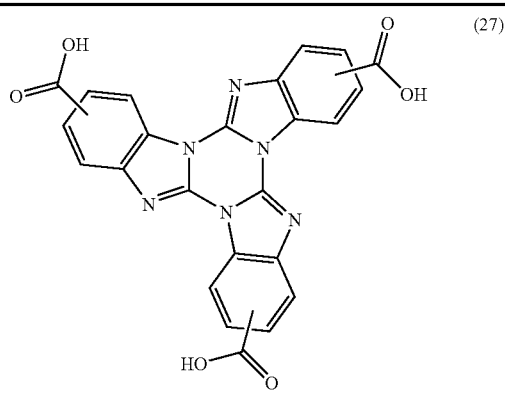

(27)

TABLE 4-continued

Examples of the structural formulas of "triazine" derivatives

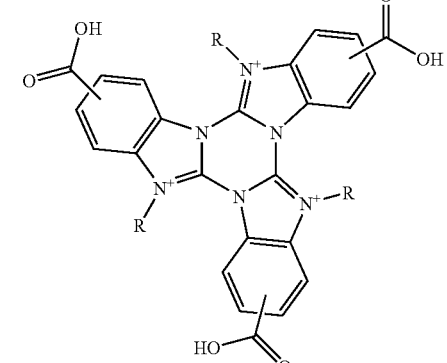

(28)

R = CH$_3$, C$_2$H$_5$, C$_3$H$_7$, C$_4$H$_9$

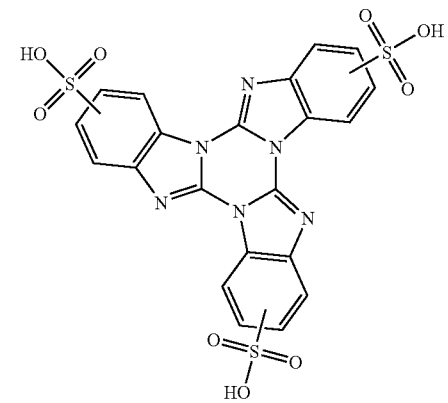

(29)

In one preferred embodiment of the disclosed compensation panel, the organic compound is acenaphthoquinoxaline derivative comprising a carboxylic group. Examples of the acenaphthoquinoxaline derivative comprising carboxylic and/or sulfonic groups and having general structural formulas corresponding to structures 30-48 are given in Table 5.

TABLE 5

Examples of the structural formulas of acenaphthoquinoxaline derivative

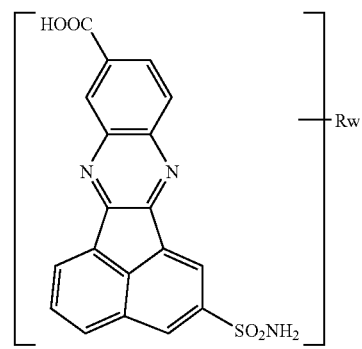

(30)

TABLE 5-continued
Examples of the structural formulas of acenaphthoquinoxaline derivative
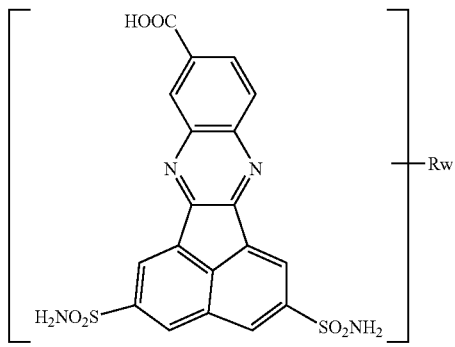
(31)
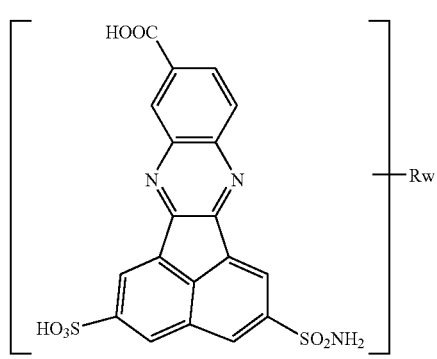
(32)
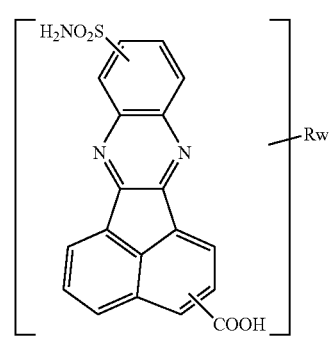
(33)
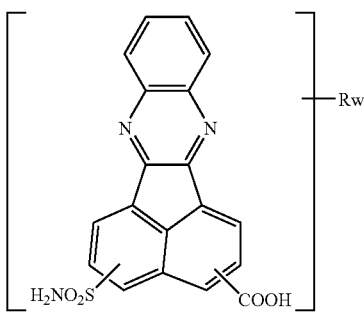
(34)
TABLE 5-continued
Examples of the structural formulas of acenaphthoquinoxaline derivative
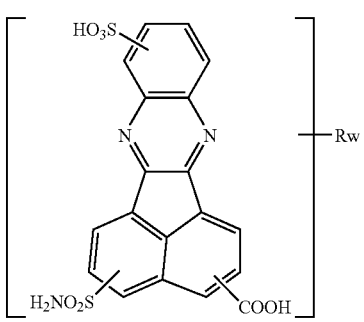
(35)
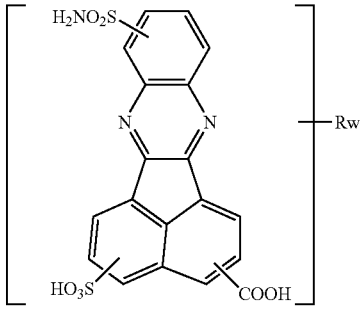
(36)
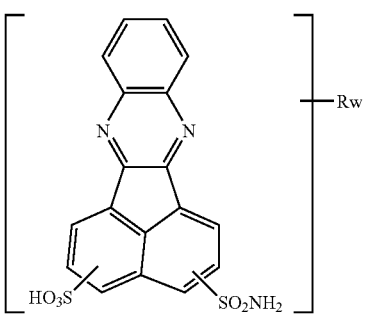
(37)
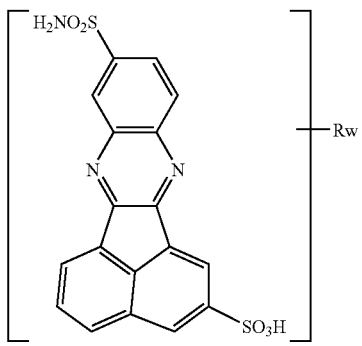
(38)

TABLE 5-continued
Examples of the structural formulas of acenaphthoquinoxaline derivative
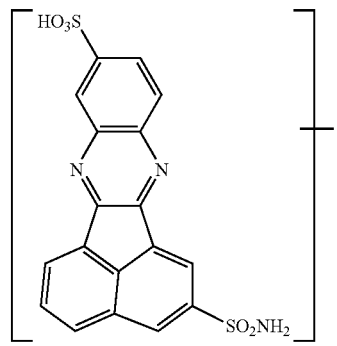 (39)
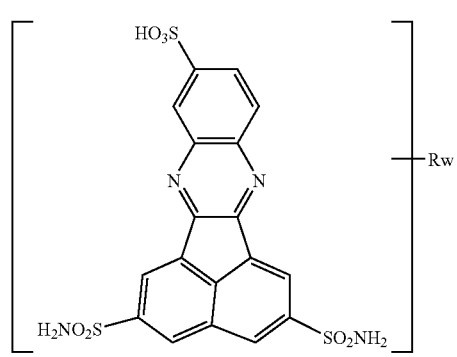 (4)
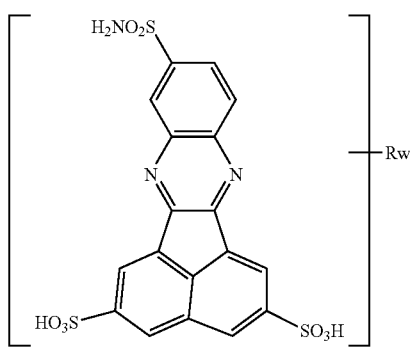 (41)
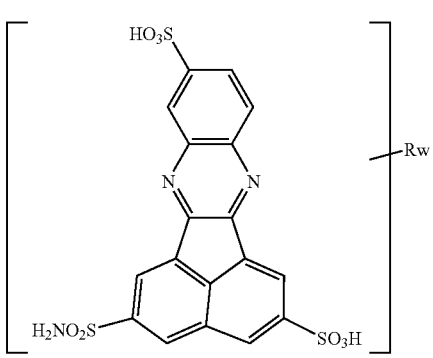 (42)
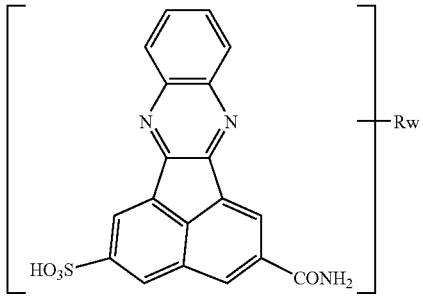 (43)
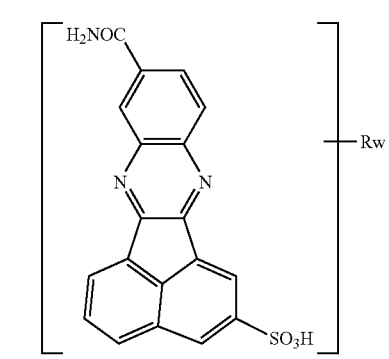 (44)
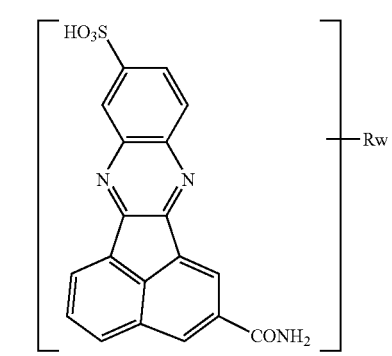 (45)
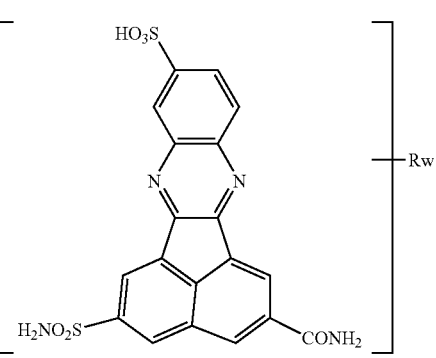 (46)

TABLE 5-continued

Examples of the structural formulas of acenaphthoquinoxaline derivative

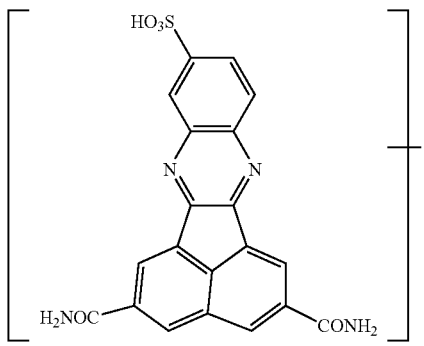
(47)

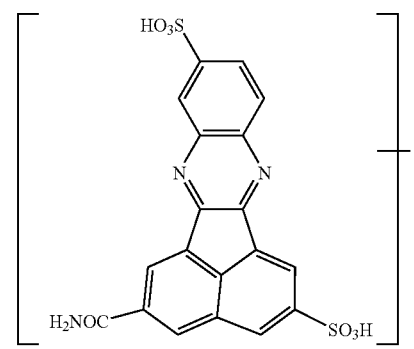
(48)

In yet another preferred embodiment of the disclosed compensation panel, the organic compound is a 6,7-dihydrobenzimidazo[1,2-c]quinazolin-6-one derivative.

In one embodiment the 6,7-dihydrobenzimidazo[1,2-c]quinazolin-6-one derivative comprises carboxylic and/or sulfonic groups and has a general structural formula from the group comprising structures 49 to 70. The examples are given in Table 6.

TABLE 6

Examples of the structural formulas of 6,7-dihydrobenzimidazo[1,2-c]quinazolin-6-one derivative

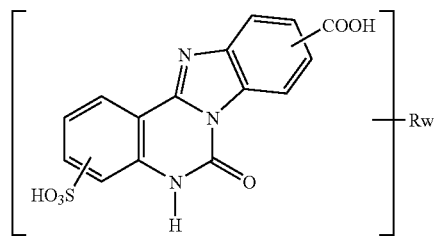
(49)

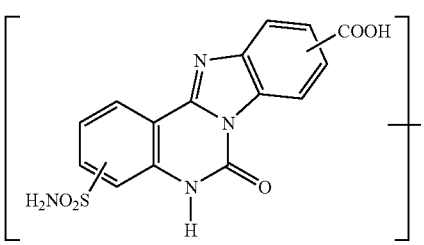
(50)

TABLE 6-continued

Examples of the structural formulas of 6,7-dihydrobenzimidazo[1,2-c]quinazolin-6-one derivative

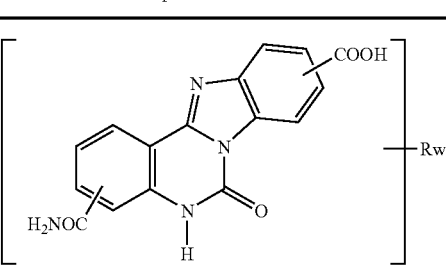
(51)

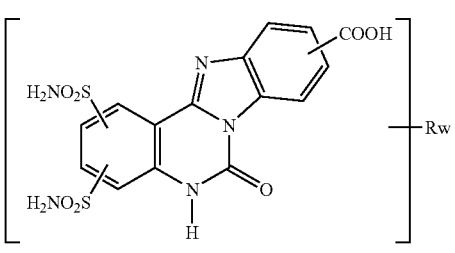
(52)

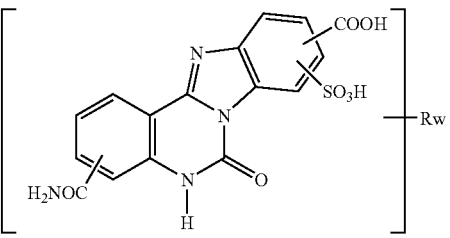
(53)

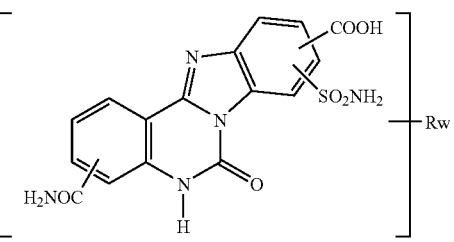
(54)

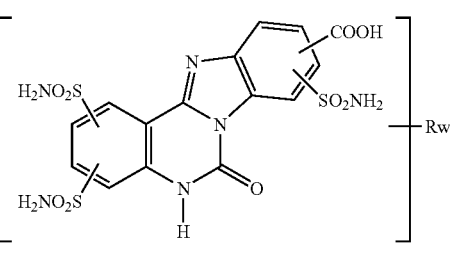
(55)

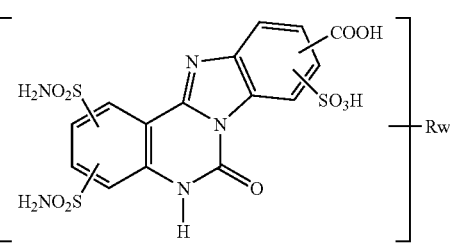
(56)

TABLE 6-continued

Examples of the structural formulas of 6,7-dihydrobenzimidazo[1,2-c]quinazolin-6-one derivative

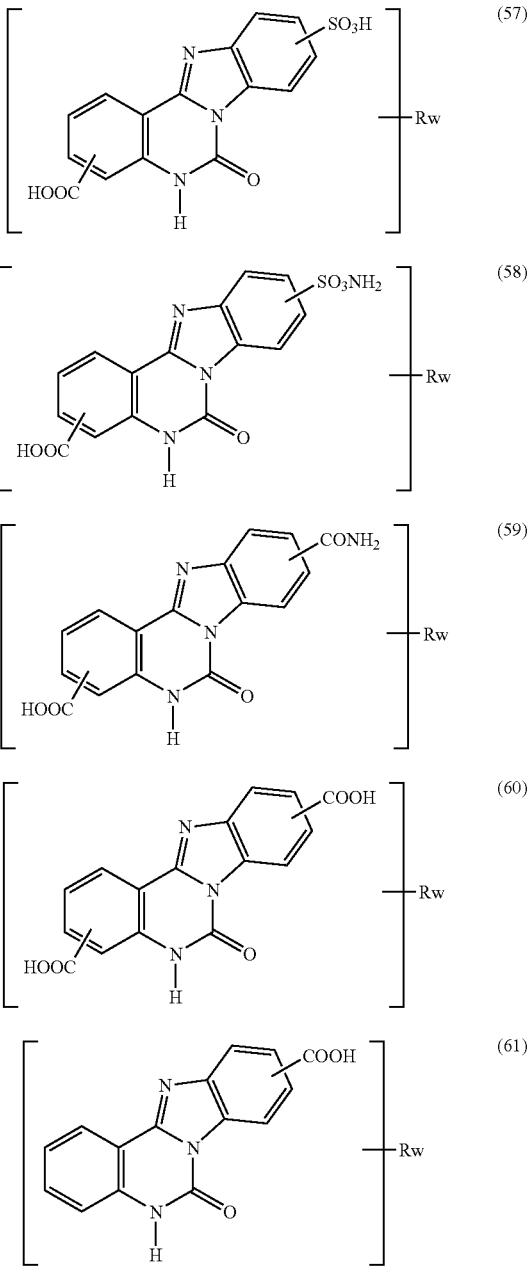

In one embodiment of the disclosed compensation panel, the anisotropic host matrix is characterized by three principal refractive indices ($n_{x,h}$, $n_{y,h}$ and $n_{z,h}$) which possess normal spectral dispersion $\partial n_u(\lambda)/\partial \lambda < 0$ in the visible spectral range, and wherein the subscript u is selected from the list comprising x, y and z.

In another embodiment of the disclosed compensation panel, the anisotropic host matrix possesses biaxial properties of $B_A$-type. The disclosed compensation panel is characterized by an in-plane difference of refractive indices $\Delta_{in,h}(\lambda) = |n_{y,h}(\lambda) - n_{x,h}(\lambda)|$ possessing normal dispersion ($\partial \Delta_{in,h}(\lambda)/\partial \lambda < 0$) in the visible spectral range. In this embodiment of the disclosed compensation panel, the anisotropic host matrix may be further characterized by an out-of-plane difference of refractive indices $\Delta_{out,h}(\lambda) = |n_{x,h}(\lambda) - n_{z,h}(\lambda)|$ possessing normal spectral dispersion ($\partial \Delta_{out,h}(\lambda)/\partial \lambda < 0$) in the visible spectral range.

In still another embodiment of the disclosed compensation panel, the anisotropic host matrix possesses biaxial properties of $B_A$-type. The disclosed compensation panel is characterized by an out-of-plane difference of refractive indices $\Delta_{out,h}(\lambda) = |n_{x,h}(\lambda) - n_{z,h}(\lambda)|$ possessing normal dispersion ($\partial \Delta_{out,h}(\lambda)/\partial \lambda < 0$) in the visible spectral range.

In yet another embodiment of the disclosed compensation panel, the anisotropic host matrix comprises anisotropic supramolecules characterized by polarizability tensor, for which one of its principal axes is substantially parallel to the x-axis.

In one embodiment of the disclosed compensation panel, the anisotropic host matrix possesses uniaxial properties of positive A-type. The disclosed compensation panel is characterized by an in-plane difference of refractive indices $\Delta_{in,h}(\lambda) = |n_{y,h}(\lambda) - n_{x,h}(\lambda)|$ possessing normal dispersion ($\partial \Delta_{in,h}(\lambda)/\partial \lambda < 0$) in the visible spectral range.

In another embodiment of the disclosed compensation panel, the anisotropic host matrix possesses uniaxial properties of negative A-type. The disclosed compensation panel is characterized by an in-plane difference of refractive indices $\Delta_{in,h}(\lambda) = |n_{y,h}(\lambda) - n_{x,h}(\lambda)|$ possessing normal dispersion ($\partial \Delta_{in,h}(\lambda)/\partial \lambda < 0$) in the visible spectral range.

In still another embodiment of the disclosed compensation panel, the anisotropic host matrix comprises uniaxial anisotropic supramolecules which are oriented with one of their principal axes substantially parallel to the x-axis. For this embodiment one of principal directions of polarizability tensor coincides with the principal axis of said supramolecules. Other two principal axes may be chosen in a perpendicular plane arbitrarily and principal values of the polarizability tensor along these chosen two principal axes are substantially equal. In yet another embodiment of the disclosed compensation panel, the anisotropic host matrix possesses biaxial properties of $A_C$-type. The disclosed compensation panel is characterized by an out-of-plane difference of refractive indices $\Delta_{out,h}(\lambda) = |n_{x,h}(\lambda) - n_{z,h}(\lambda)|$ possessing normal spectral dispersion ($\partial \Delta_{out,h}(\lambda)/\partial \lambda < 0$) in the visible spectral range. In this embodiment, the anisotropic host matrix may be further characterized by an in-plane difference of refractive indices $\Delta_{in,h}(\lambda) = |n_{y,h}(\lambda) - n_{x,h}(\lambda)|$ possessing normal dispersion ($\partial \Delta_{in,h}(\lambda)/\partial \lambda < 0$) in the visible spectral range.

In one embodiment of the disclosed compensation panel, the anisotropic host matrix possesses biaxial properties of $A_C$-type. The disclosed compensation panel is characterized by an in-plane difference of refractive indices $\Delta_{in,h}(\lambda) = |n_{y,h}(\lambda) - n_{x,h}(\lambda)|$ possessing normal spectral dispersion ($\partial \Delta_{in,h}(\lambda)/\partial \lambda < 0$) in the visible spectral range.

In another embodiment of the disclosed compensation panel, the anisotropic host matrix possesses uniaxial properties of positive C-type. The disclosed compensation panel is characterized by an out-of-plane difference of refractive indices $\Delta_{out,h}(\lambda) = |n_{z,h}(\lambda) - n_{x,h}(\lambda)|$ possessing normal spectral dispersion ($\partial \Delta_{out,h}(\lambda)/\partial \lambda < 0$) in the visible spectral range.

In still another embodiment of the disclosed compensation panel, the anisotropic host matrix possesses uniaxial properties of negative C-type. The disclosed compensation panel is characterized by an out-of-plane difference of refractive indices $\Delta_{out,h}(\lambda) = |n_{x,h}(\lambda) - n_{z,h}(\lambda)|$ possessing normal spectral dispersion ($\partial \Delta_{out,h}(\lambda)/\partial \lambda < 0$) in the visible spectral range.

In yet another embodiment of the disclosed compensation panel, the guest absorbing particle is selected from the list comprising single atom, single organic molecule, single inorganic molecule, macromolecule, polymer molecule, group of atoms, inorganic nano-crystal, group of molecules, molecular nano-crystal, non-ordered nano-particle. In one preferred embodiment, the guest absorbing particles are made of at least one inorganic material. In another preferred embodiment, guest absorbing particles are made of at least one organic material. In still another preferred embodiment of the disclosed compensation panel, the guest absorbing particles are pigments. In one preferred embodiment, the guest absorbing particles are dye molecules. In another preferred embodiment of the disclosed compensation panel, the guest absorbing particles are optically isotropic particles. In still another preferred embodiment, the guest absorbing particles are optically anisotropic particles. In yet another preferred embodiment of the disclosed compensation panel, at least one dye molecule has a general structural formula corresponding to structures 71 to 79 shown in Table 7.

TABLE 7

Examples of the structural formulas of the dye molecules

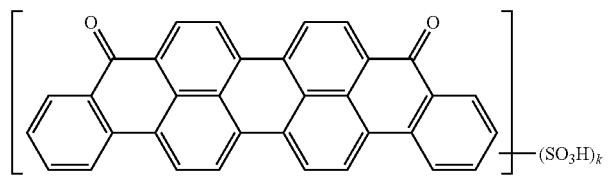

(71)

$k = 1, 2, 3, 4$

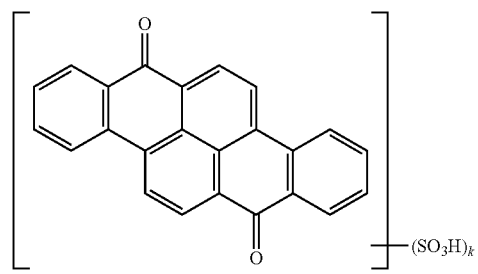

(72)

$k = 1, 2, 3, 4$

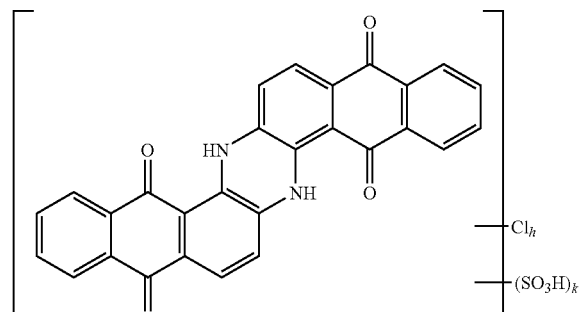

(73)

$h = 0, 1$
$k = 1, 2, 3, 4$

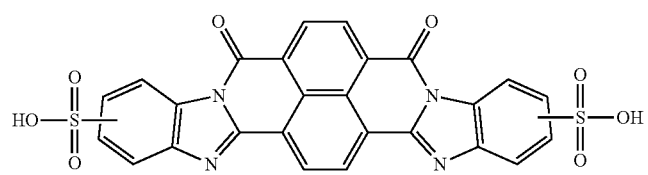

(74)

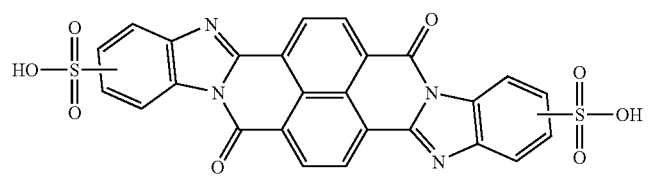

(75)

TABLE 7-continued

Examples of the structural formulas of the dye molecules

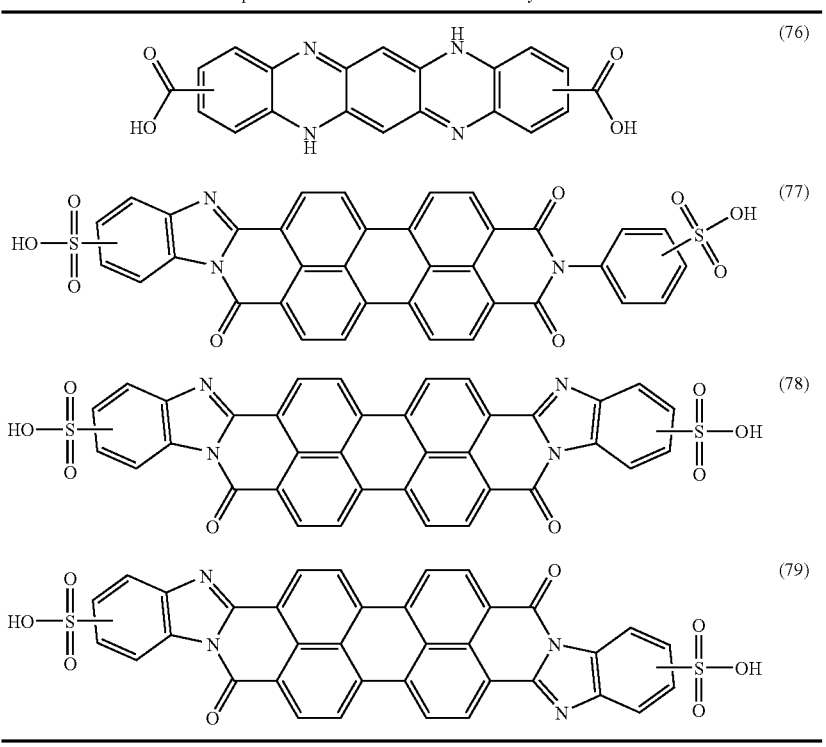

(76)

(77)

(78)

(79)

In one embodiment of the present invention, the optically anisotropic compensation panel further comprises a substrate. In one embodiment of the disclosed compensation panel, the substrate is made of one or several materials of the group comprising diamond, quartz, plastics, glasses, ceramics, and comprises at least one element of the group comprising color filter substrate, circuit features, multilevel interconnects, and thin film transistor (TFT) array substrate.

The present invention also provides a method of producing an optically anisotropic compensation panel based on an ordered guest-host system and having spectral dependencies of principal refractive indices $n_x(\lambda)$, $n_y(\lambda)$ and $n_z(\lambda)$, wherein at least one of them possesses anomalous spectral dispersion in at least one subrange of the visible spectral range and which includes the following steps:

a) assignment of spectral dependencies of principal refractive indices $n_x(\lambda)$, $n_y(\lambda)$ and $n_z(\lambda)$, so that at least one difference of principal refractive indices $\Delta_v(\lambda)$ defining the optical anisotropy satisfies the condition $\partial\Delta_v(\lambda)/\partial\lambda \geq 0$ in the visible spectral range, wherein subscript v is selected from the list comprising in and out;

b) numerical designation and variation of principal absorption coefficient spectra $k_{x,cal}(\lambda)$, $k_{y,cal}(\lambda)$, and $k_{z,cal}(\lambda)$ until the spectral dependencies $n_x(\lambda)=KK(k_x(\lambda))$, $n_y(\lambda)=KK(k_y(\lambda))$ and $n_z(\lambda)=KK(k_z(\lambda))$ evaluated according to Kramers-Kronig relation satisfy the spectral dependencies for the refractive indices as specified in the step (a);

c) selection of at least one organic compound substantially transparent to electromagnetic radiation in the visible spectral range which serves as a host component capable of forming an optically anisotropic host matrix with normal spectral dispersion in the visible range that is characterized by the absorption coefficients $k_{x,h}(\lambda)$, $k_{y,h}(\lambda)$ and $k_{z,h}(\lambda)$ in the UV spectral range;

d) selection of at least one type of guest particles capable of absorbing electromagnetic radiation in at least one subrange of the wavelength range from 250 to 2500 nm, to fit into the host matrix as a guest component, and which are characterized by the absorption coefficients $k_{x,g}(\lambda)$, $k_{y,g}(\lambda)$ and $k_{z,g}(\lambda)$;

e) optimization of the guest-components quantity which minimizes inconsistence between the calculated absorption spectra $k_{x,cal}(\lambda)$, $k_{y,cal}(\lambda)$ and $k_{z,cal}(\lambda)$ according to step b) and appropriate functions $k_{x,h}(\lambda)+k_{x,g}(\lambda)$, $k_{y,h}(\lambda)+k_{y,g}(\lambda)$, and $k_{z,h}(\lambda)+k_{z,g}(\lambda)$ in the wavelength range from 250 to 2500 nm;

f) formation of a coating solution according to previous steps, wherein at least one organic compound transparent to electromagnetic radiation in the visible spectral range and at least one type of particles capable of absorbing electromagnetic radiation in at least one subrange of the wavelength range from 250 to 2500 nm are used;

g) application of the coating solution onto a substrate to form a liquid layer;

h) application of an external alignment action upon the liquid layer, i) drying with formation of a solid guest-host layer, and j) measurements of experimental spectra $k_x(\lambda)$, $k_y(\lambda)$, and $k_z(\lambda)$ for the solid guest-host layer and repeating steps c) to i) until an inconsistence between the measured and calculated absorption spectra $k_{x,cal}(\lambda)$, $k_{y,cal}(\lambda)$ and $k_{z,cal}(\lambda)$ is minimal.

In one embodiment of the disclosed method, the organic compound has a general structural formula I

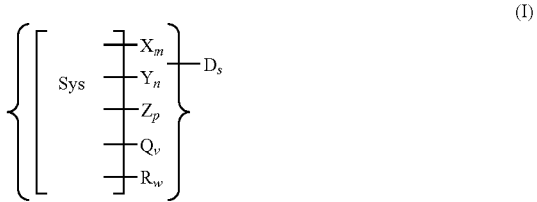

(I)

where Sys is an at least partially conjugated substantially planar polycyclic molecular system, X is a carboxylic group —COOH, m is 0, 1, 2, 3 or 4; Y is a sulfonic group —SO$_3$H, n is 0, 1, 2, 3 or 4; Z is a carboxamide, p is 0, 1, 2, 3 or 4; Q is a sulfonamide, v is 0, 1, 2, 3 or 4; D is a counterion; s is the number of counterions providing electrically neutral state of the molecule; R is a substituent selected from the list comprising CH$_3$, C$_2$H$_5$, Cl, Br, NO$_2$, F, CF$_3$, CN, OH, OCH$_3$, OC$_2$H$_5$, OCOCH$_3$, OCN, SCN, NH$_2$, and NHCOCH$_3$, and w is 0, 1, 2, 3 or 4. In another embodiment of the disclosed method, the polycyclic molecular system Sys is substantially transparent in the visible spectral range. In still another embodiment of the disclosed method, the polycyclic molecular system Sys has a general structural formula from the list comprising structures II to XLIX shown in the Table 1. In still another embodiment of the disclosed method, the counterion is selected from the list comprising H$^+$, NH$_4^+$, Na$^+$, K$^+$, Li$^+$, Ba$^{++}$, Ca$^{++}$, Mg$^{++}$, Sr$^{++}$, Cs$^+$, Pb$^{++}$, and Zn$^{++}$.

In yet another embodiment of the disclosed method, the organic compound is an oligophenyl derivative. The examples of the oligophenyl derivative of a general structural formula corresponding to structures 1 to 7 are given in Table 2.

In another embodiment of the disclosed method, the organic compound is selected from the list comprising derivatives of 1H,1′H-2,2′-bibenzimidazole, derivatives of 2,2′-bi-1,3-benzoxazole, and derivatives of 2,2′-bi-1,3-benzothiazole. In yet another embodiment of the present invention, the organic compound has general structural formulas shown in Table 3.

In still another embodiment of the disclosed method, the organic compound is a "triazine" derivative and has a general structural formula corresponding to one of structures 27 to 29 shown in Table 4.

In one preferred embodiment of the disclosed method, the organic compound is acenaphthoquinoxaline derivative comprising a carboxylic group. Examples of the acenaphthoquinoxaline derivative comprising carboxylic group and/or sulfonic groups and having general structural formulas corresponding to structures 30-48 are given in Table 5.

In another preferred embodiment of the disclosed method, the organic compound is a 6,7-dihydrobenzimidazo[1,2-c]quinazolin-6-one derivative. In one embodiment the 6,7-dihydrobenzimidazo[1,2-c]quinazolin-6-one derivative comprises carboxylic and/or sulfonic groups and has a general structural formula from the group comprising structures 49 to 70. The examples are given in Table 6.

The dispersion of refractive indexes can be evaluated using the known Kramers-Kronig relation. The Kramers-Kronig (KK) relation is one of fundamental principles. It puts restrictions on response functions of the physical systems being in an equilibrium state. The KK relation is based on a causality principle, when the current event can not influence on an event in the past. The last makes the Fourier component of the response to be the analytical function in the positive half-plane of the complex frequency and leads to relations between its real and imaginary parts. The generality of the KK principle is in that it does not need any assumptions regarding the structure of a system or media. In the present case, the real part of the refractive index can be expressed in terms of the absorption coefficient (imaginary part) as follows:

$$n(\omega) = 1 + \frac{2}{\pi} P \int_0^\infty \frac{x\alpha(x)}{x^2 - \omega^2} dx, \tag{78}$$

Symbol P means that the integral should be calculated in a sense of its main value. The formula (78) is a generalized formula of the Kramers-Kronig relation. In the optical applications each separate absorption band contributes into the value of refractive indices. In the optical spectral range the central frequencies of the absorption bands have values substantially higher than their widths. In this particular case one can easily simplify and calculate the individual band contributions in the integral (78), so the local shape of the dispersion curve can be quite well approximated by a constant plus the integral over a finite spectral range of the closest absorption bands:

$$n(\omega) = n_o + \frac{2}{\pi} P \int_{\omega_1}^{\omega_2} \frac{x\alpha(x)}{x^2 - \omega^2} dx. \tag{79}$$

The value $n_0$ can be found if the refractive index is measured somewhere in the range $(\omega_1, \omega_2)$, for instance, where the absorption is small. Namely $n_0$ value contains the contributions from the integrals outside of the spectral range of $(\omega_1, \omega_2)$. The spectral dependence of the absorption coefficient $\alpha(x)$ in (79) can also be extracted from the experimental data.

The KK relation for the absorption coefficient is:

$$\alpha(\omega) = -\frac{2\omega}{\pi} P \int_0^\infty \frac{n(x)}{x^2 - \omega^2} dx \tag{80}$$

The complex refractive index is defined as:

$$\bar{n}(\omega) = n(\omega) - i\alpha(\omega) \tag{81}$$

The $\alpha(\omega)$ is an imaginary part and has no dimension. In practice it is convenient to use another definition of the absorption coefficient (more accurately absorption index), which is defined as $$k(\omega) = -\frac{2\omega}{c} \alpha(\omega), \tag{82}$$

where c is light velocity, and the absorption index has a dimension of inverse length. The value $k(\omega)$ is used in a well-known Bouguer-Lambert law, which shows the attenuation of the light intensity I in absorbing media:

$$I = I_0 \exp(-k(\omega)l) \tag{83}$$

Replacing the frequency variable $\omega$ by wavelength $\lambda$ the equations 1 and 2 can be rewritten as:

$$n(\lambda) = 1 + \frac{1}{2\pi^2} P \int_0^\infty \frac{k(y)}{1-\left(\frac{y}{\lambda}\right)^2} dy. \tag{84}$$

$$n(\lambda) = n_0 + \frac{1}{2\pi^2} P \int_{\lambda_1}^{\lambda_2} \frac{k(y)}{1-\left(\frac{y}{\lambda}\right)^2} dy. \tag{85}$$

For the derivation of formulas (84) and (85) we used the following replacements, $\omega=2\pi c/\lambda$ and $x=2\pi c/y$. The equation (84) is useful for the experimental data when an absorption index spectrum is measured versus wavelength.

In one embodiment of the disclosed method, the guest particles are selected from the list comprising single atom, single organic molecule, single inorganic molecule, macromolecule, polymer molecule, group of atoms, inorganic nano-crystal, group of molecules, molecular nano-crystal, and non-ordered nano-particle. In another embodiment of the disclosed method, the guest particles are made of at least one inorganic material. In still another embodiment, the guest particles are made of at least one organic material. In yet another preferred embodiment of the disclosed method, the guest particles are pigments. In still another embodiment, the guest particles are dye molecules. In one preferred embodiment of the disclosed method, the guest particles are optically isotropic particles. In another preferred embodiment of the disclosed method, the guest particles are optically anisotropic particles. In yet another preferred embodiment of the disclosed method, at least one dye molecule has a general structural formula corresponding to structures 71 to 79 shown in Table 7.

In one preferred embodiment of the disclosed method, the substrate is made of one or several materials of the group comprising diamond, quartz, plastics, glasses, ceramics, and comprises at least one element of the group comprising color filter substrate, circuit features, multilevel interconnects, and TFT-array substrate. In another preferred embodiment of the disclosed method, the said liquid layer further comprises a solvent selected from the group comprising water, water-miscible solvent, alcohol-based solvent, and any combination thereof. In the preferred embodiment the solvent is water.

In yet another preferred embodiment of the disclosed method, the drying is executed in airflow. In one preferred embodiment, the disclosed method further comprises a pre-treatment step before the application onto the substrate. In one preferred embodiment of the disclosed method, the pre-treatment comprises the step of making the surface of the substrate hydrophilic. In another preferred embodiment, the pretreatment further comprises application of a planarization layer.

In still another embodiment, the disclosed method further comprises a post-treatment step with a solution of any aqueous-soluble inorganic salt with a cation selected from the group containing $H^+$, $NH_4^+$, $Na^+$, $K^+$, $Li^+$, $Cs^+$, $Ba^{++}$, $Ca^{++}$, $Mg^{++}$, $Sr^{++}$, $La^{3+}$, $Zn^{++}$, $Zr^{4+}$, $Ce^3$, $Y^{3+}$, $Yb^{3+}$, $Gd^{3+}$ and any combination thereof. In yet another embodiment of the disclosed method, the application step and post-treatment step are carried out simultaneously. In one embodiment of the present invention, the drying and post-treatment steps are carried out simultaneously. In another embodiment of the present invention, post-treatment step is carried out after drying. In still another embodiment of the present invention, the application is made using an isotropic solution. In yet another embodiment of the present invention, the application is made using a lyotropic liquid crystal solution. In one embodiment of the present invention, the application step is made of a gel. In another embodiment of the present invention, the application step is made of a viscous liquid phase. In still another embodiment of the present invention, the alignment action applied onto said liquid layer simultaneously with the application step.

The present invention also provides the color liquid crystal display comprising a liquid crystal cell, first and second polarizers arranged on each side of the liquid crystal cell, and at least one compensation panel located between said polarizers. The compensation panel comprises at least one optically anisotropic layer based on an ordered guest-host system, wherein the guest-host system comprising an anisotropic host matrix comprising organic compounds transparent for electromagnetic radiation in the visible spectral range, and a guest component comprising guest particles, wherein the guest particles provide an absorption additional to the absorption of the anisotropic host matrix, and wherein said additional absorption is realized in at least one principal direction of the anisotropic host matrix in at least one subrange of the wavelength range from approximately 250 to 2500 nm.

In one embodiment of the present invention, the color liquid crystal display further comprises a color filter. In another embodiment of the disclosed color liquid crystal display, the color filter has a configuration selected from the list comprises stripe, mosaic and delta configurations.

In still another embodiment of the disclosed color liquid crystal display, the organic compound has a general structural formula I

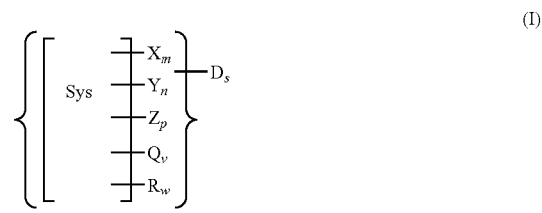

where Sys is an at least partially conjugated substantially planar polycyclic molecular system, X is a carboxylic group —COOH, m is 0, 1, 2, 3 or 4; Y is a sulfonic group —SO$_3$H, n is 0, 1, 2, 3 or 4; Z is a carboxamide, p is 0, 1, 2, 3 or 4; Q is a sulfonamide, v is 0, 1, 2, 3 or 4; D is a counterion; s is the number of counterions providing electrically neutral state of the molecule; R is a substituent selected from the list comprising CH$_3$, C$_2$H$_5$, Cl, Br, NO$_2$, F, CF$_3$, CN, OH, OCH$_3$, OC$_2$H$_5$, OCOCH$_3$, OCN, SCN, NH$_2$, and NHCOCH$_3$, and w is 0, 1, 2, 3 or 4. In yet another embodiment of the disclosed color liquid crystal display, the polycyclic molecular system Sys is substantially transparent in the visible spectral range.

In one embodiment of the disclosed color liquid crystal display, the polycyclic molecular system Sys has a general structural formula from the list comprising structures II to XLIX as shown in Table 1. In another embodiment of the disclosed color liquid crystal display, the counterion is selected from the list comprising H$^+$, NH$_4^+$, Na$^+$, K$^+$, Li$^+$, Ba$^{++}$, Ca$^{++}$, Mg$^{++}$, Sr$^{++}$, Cs$^+$, Pb$^{++}$, and Zn$^{++}$.

In still another embodiment of the disclosed display, the organic compound is an oligophenyl derivative. Examples of the oligophenyl derivatives having a general structural formula corresponding to one of structures 1 to 7 are shown in Table 2.

In yet another embodiment of the disclosed display, the organic compound is a bibenzimidazole derivative and has a general structural formula corresponding to one of structures 8 to 26 of Table 3.

In one embodiment of the disclosed display, the organic compound is a "triazine" derivative and has a general structural formula corresponding to any of structures 27 to 29 shown in Table 4.

In another embodiment of the disclosed display, the organic compound is an acenaphthoquinoxaline derivative. Examples of the acenaphthoquinoxaline derivatives comprising carboxylic group and/or sulfonic groups and having a general structural formula corresponding to one of structures 30 to 48 are shown in Table 5.

In still another embodiment of the disclosed display, the organic compound is a 6,7-dihydrobenzimidazo[1,2-c] quinazolin-6-one derivative. Examples of the 6,7-dihydrobenzimidazo[1,2-c]quinazolin-6-one derivatives comprising carboxylic and/or sulfonic groups and having a general structural formula from the group comprising structures 49 to 70 are shown in Table 6.

In one embodiment of the disclosed display, the optically anisotropic layer is characterized by three principal refractive indices ($n_x$, $n_y$ and $n_z$) at least one of which satisfies the condition (relation) $\partial n_u(\lambda)/\partial \lambda \geq 0$ in at least one subrange of the visible spectral range, wherein the inferior index u is selected from the list comprising x, y and z.

In another embodiment of the disclosed display the optically anisotropic layer possesses biaxial properties of $B_A$-type. This optically anisotropic layer is characterized by an in-plane difference of refractive indices $\Delta_{in}(\lambda)=|n_y(\lambda)-n_x(\lambda)|$ which satisfies the condition $\partial \Delta_{in}(\lambda)/\partial \lambda \geq 0$ in at least one subrange of the visible spectral range. In this embodiment, the optically anisotropic layer may be further characterized by an out-of-plane difference of refractive indices $\Delta_{out}(\lambda)=|n_z(\lambda)-n_x(\lambda)|$ which satisfies the condition $\Delta_{out}(\lambda)/\partial \lambda \geq 0$ in at least one wavelength subrange of the visible spectral range.

In still another embodiment of the disclosed display, the optically anisotropic layer possesses biaxial properties of $B_A$-type. This optically anisotropic layer is characterized by an out-of-plane difference of refractive indices $\Delta_{out}(\lambda)=|n_z(\lambda)-n_x(\lambda)|$ which satisfies the condition $\partial \Delta_{out}(\lambda)/\partial \lambda \geq 0$ in at least one wavelength subrange of the visible spectral range.

In yet another embodiment of the disclosed display, the optically anisotropic layer possesses uniaxial properties of negative A-type. This optically anisotropic layer is characterized by an in-plane difference of refractive indices $\Delta_{in}(\lambda)=|n_y(\lambda)-n_x(\lambda)|$ which satisfies the condition $\partial \Delta_{in}(\lambda)/\partial \lambda \geq 0$ in at least one subrange of the visible spectral range.

In one embodiment of the disclosed display, the optically anisotropic layer possesses uniaxial properties of positive A-type. This optically anisotropic layer is characterized by an in-plane difference of refractive indices $\Delta_{in}(\lambda)=|n_y(\lambda)-n_x(\lambda)|$ which satisfies the condition $\partial \Delta_{in}(\lambda)/\partial \lambda \geq 0$ in at least one wavelength subrange of the visible spectral range.

In another embodiment of the disclosed display, the optically anisotropic layer possesses biaxial properties of $A_C$-type. This optically anisotropic layer is characterized by an in-plane difference of refractive indices $\Delta_{in}(\lambda)=|n_y(\lambda)-n_x(\lambda)|$ which satisfies the condition $\theta \Delta_{in}(\lambda)/\partial \lambda \geq 0$ in at least one subrange of the visible spectral range. In this embodiment, the optically anisotropic layer may be further characterized by an out-of-plane difference of refractive indices $\Delta_{out}(\lambda)=|n_x(\lambda)-n_z(\lambda)|$ which satisfies the condition $\partial \Delta_{out}(\lambda)/\partial \lambda \geq 0$ in at least one subrange of the visible spectral range.

In still another embodiment of the disclosed display, the optically anisotropic layer possesses biaxial properties of $A_C$-type. This optically anisotropic layer is characterized by an out-of-plane difference of refractive indices $\Delta_{out}(\lambda)=|n_x(\lambda)-n_z(\lambda)|$ which satisfies the condition $\partial \Delta_{out}(\lambda)/\partial \lambda \geq 0$ in at least one wavelength subrange of the visible spectral range.

In yet another embodiment of the disclosed display, the optically anisotropic layer possesses uniaxial properties of negative C-type. This optically anisotropic layer is characterized by an out-of-plane difference of refractive indices $\Delta_{out}(\lambda)=|n_x(\lambda)-n_z(\lambda)|$ which satisfies the condition $\partial \Delta_{out}(\lambda)/\partial \lambda \geq 0$ in at least one subrange of the visible spectral range.

In one embodiment of the disclosed display, the optically anisotropic layer possesses uniaxial properties of positive C-type. This optically anisotropic layer is characterized by an out-of-plane difference of refractive indices $\Delta_{out}(\lambda)=|n_z(\lambda)-n_x(\lambda)|$ which satisfies the condition $\partial \Delta_{out}(\lambda)/\partial \lambda \geq 0$ in at least one wavelength subrange of the visible spectral range.

In another embodiment of the disclosed display, the in-plane difference of refractive indices $\Delta_{in}(\lambda)$ obeys the following condition: spectral dispersion factors $(\Delta_{in,450}/\Delta_{in,550})$ and $(\Delta_{in,550}/\Delta_{in,650})$ are in a range of 0.4-1.0, wherein $\Delta_{in,450}$, $\Delta_{in,550}$ and $\Delta_{in,650}$ are values of the in-plain differences of refractive indices $\Delta_{in}(\lambda)$ at wavelengths of 450 nm, 550 nm and 650 nm respectively.

In still another embodiment of the disclosed display, the out-of-plane difference of refractive indices $\Delta_{out}(\lambda)$ obeys the following condition: spectral dispersion factors $(\Delta_{out,450}/\Delta_{out,550})$ and $(\Delta_{out,550}/\Delta_{out,650})$ are in a range of 0.4-1.0, wherein $\Delta_{out,450}$, $\Delta_{out,550}$ and $\Delta_{out,650}$ are values of the out-of-plane differences of the refractive indices $\Delta_{out}(\lambda)$ at wavelengths of 450 nm, 550 nm and 650 nm respectively.

In one embodiment of the disclosed display, the guest particles are selected from the list comprising single atom, single organic molecule, single inorganic molecule, macromolecule, polymer molecule, group of atoms, inorganic nano-crystal, group of molecules, molecular nano-crystal, and non-ordered nano-particle. In another embodiment of the disclosed display, the guest particles are made of at least one inorganic material.

In still another embodiment of the disclosed display, the guest particles are made of at least one organic material. In yet another embodiment, the guest particles are pigments. In still another embodiment, the guest particles are dye molecules. In one embodiment of the disclosed display, the guest particles are optically isotropic particles. In another embodiment of the disclosed display, the guest particles are optically anisotropic particles. In another embodiment, at least one dye molecule has a general structural formula corresponding to structures 71 to 79 as shown in Table 7.

In still another embodiment of the disclosed display, the compensation panel further comprises a substrate. In yet another embodiment, the substrate is made of one or several materials of the group comprising diamond, quartz, plastics, glasses, ceramics, and comprises at least one element of the group comprising the color filter substrate, circuit features, multilevel interconnects, and a TFT-array substrate.

In one embodiment of the disclosed display, the liquid crystal cell is an in-plane switching mode liquid crystal cell. In another embodiment of the disclosed display, the liquid crystal cell is a vertically-aligned mode liquid crystal cell. In still another embodiment of the disclosed display, the compensation panel is located inside the liquid crystal cell. In yet another embodiment of the disclosed display, the compensation panel is located outside the liquid crystal cell.

A more complete assessment of the present invention and its advantages will be readily achieved as the same becomes better understood by reference to the following detailed description, considered in connection with the accompanying drawings and detailed specification, all of which forms a part of the disclosure.

Figure 5:
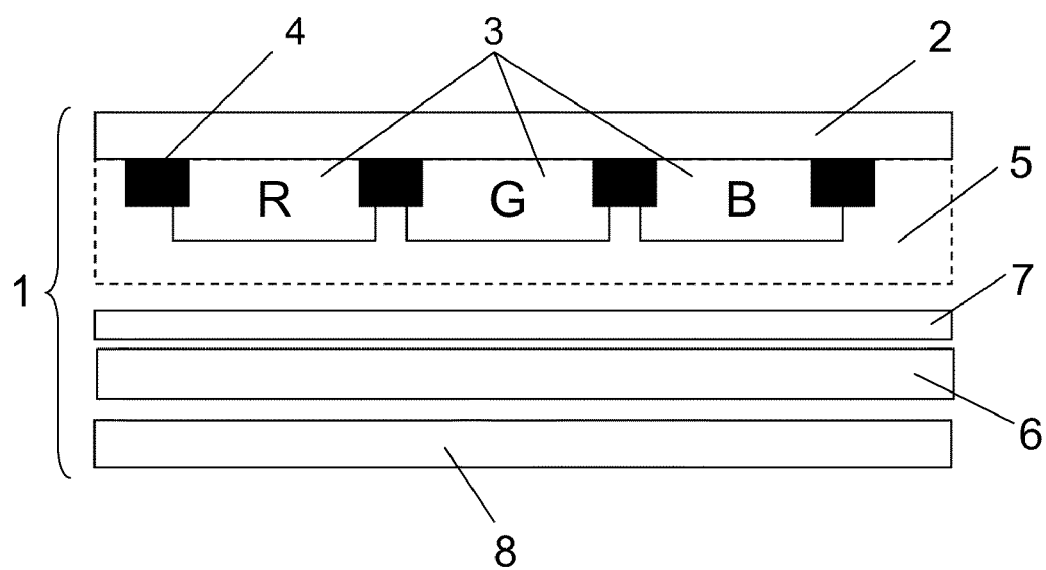
Figure 6:
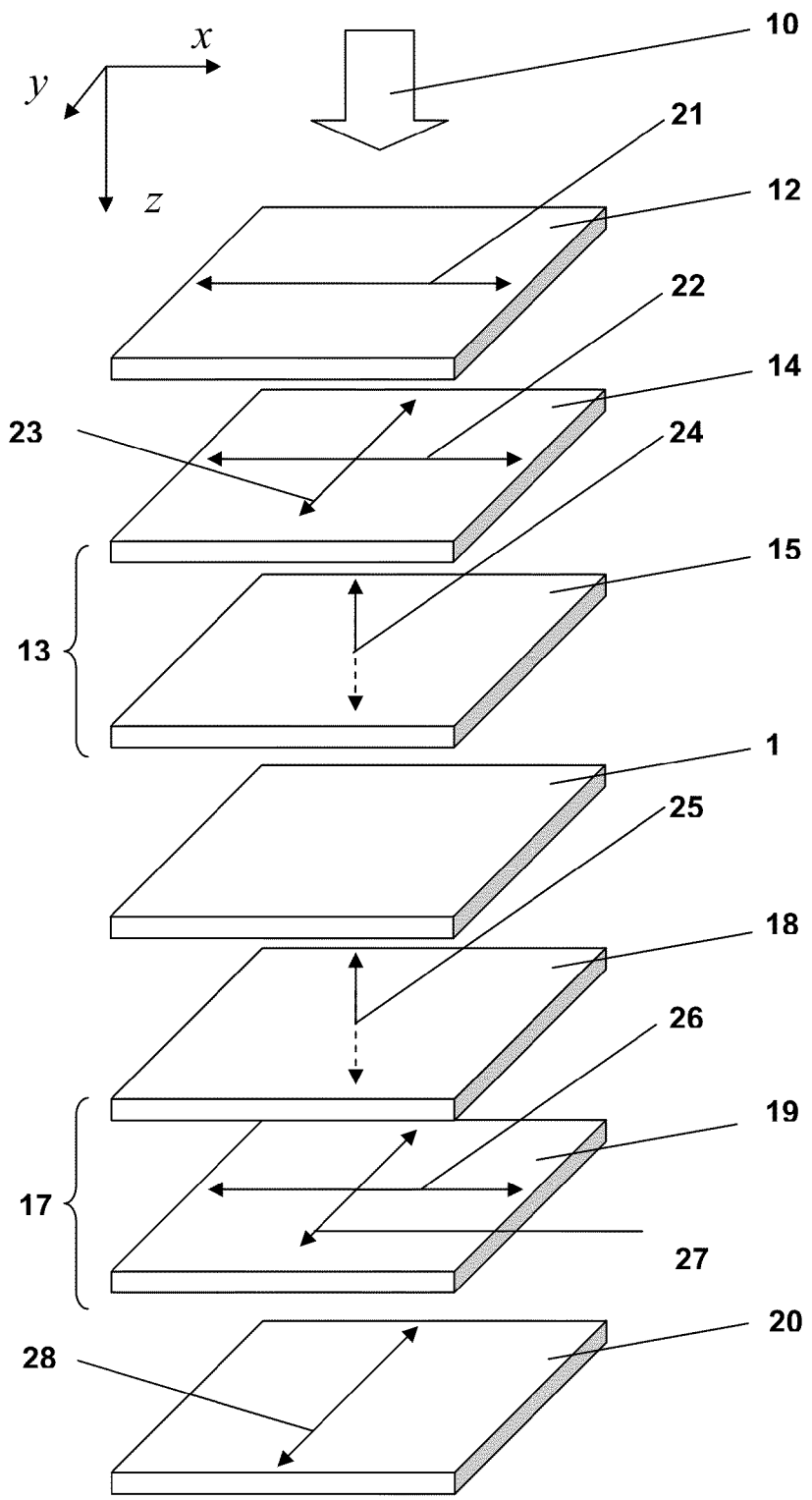
FIG. 6 is a diagram showing a construction of a liquid crystal display according to a first embodiment of the present invention.

FIG. 6 schematically shows a light beam 10 and a color liquid crystal display according to the present invention which comprises a liquid crystal cell 1, a pair of polarizers 12 and 20, arranged on each side of the liquid crystal cell, and two compensating panels 13 and 17, disposed between the liquid crystal cell and the first polarizer 12, and the liquid crystal cell and the second polarizer 20, consequently. The liquid crystal cell is schematically shown in FIG. 5. In one embodiment of the disclosed display, the liquid crystal cell is an in-plane switching mode liquid crystal cell. In another embodiment of the disclosed display, the liquid crystal cell is a vertically-aligned mode liquid crystal cell. The transmission axis 21 of the first polarizer is perpendicular to the transmission axis 28 of the second polarizer. The first compensation panel 13 comprises an anisotropic layer of the first type 14, having slow 22 and fast 23 principal axes (the principal axes correspond to the principal axes of the dielectric tensor) lying substantially in the plane of said anisotropic layer 14, and an anisotropic layer of the second type 15, as a negative C-panel with the optical axis 24 directed substantially perpendicularly to the plane of said anisotropic layer 15. The anisotropic layer 14 is arranged in such a way that the fast principal axis 23, corresponding to lowest dielectric permittivity, of said anisotropic layer is perpendicular to the transmission axis 21 of the polarizer 12. The anisotropic layer 14 is an uniaxial anisotropic layer of negative A-type and it is characterized by three principal refractive indices ($n_x$, $n_y$, and $n_z$) and an in-plane difference of refractive indices $\Delta_{in}(\lambda)=|n_y(\lambda)-n_x(\lambda)|$ which satisfies the condition $\partial \Delta_{in}(\lambda)/\partial \lambda \geqq 0$ in the visible spectral range. Two principal directions for refractive indices $n_x$ and $n_y$ belong to xy-plane, one refractive index ($n_z$) corresponds to the normal direction, and the refractive indices $n_x$, $n_y$, and $n_z$ obey the following condition in the visible spectral range: $n_z=n_x>n_y$.

In still another embodiment of the disclosed display, the anisotropic layer of the second type 15 is an optically anisotropic layer possessing uniaxial properties of negative C-type and it is characterized by three principal refractive indices ($n_x$, $n_y$, and $n_z$) and the out-of-plane difference of refractive indices $\Delta_{out}(\lambda)=|n_x(\lambda)-n_z(\lambda)|$ which satisfies the condition $\partial \Delta_{out}(\lambda)/\partial \lambda \geqq 0$ in the visible spectral range. The refractive indices $n_x$, $n_y$, and $n_z$ obey the following condition in the visible spectral range: $n_x=n_y>n_z$. The second compensation panel 17 comprises an anisotropic layer of the first type 19 having slow 27 and fast 26 principal axes lying substantially in the plane of said anisotropic layer 19, and an anisotropic layer of the second type 18 as a negative C-panel with the optical axis 25 directed substantially perpendicularly to the plane of said anisotropic layer 18. The retardation layer of the first type 19 is arranged in such a way that the fast principal axis 26 of said anisotropic layer is perpendicular to the transmission axis 28 of the polarizer 20. The anisotropic layer of the first type 19 is a layer of negative A-type and characterized by three principal refractive indices ($n_x$, $n_y$, and $n_z$) and a difference of the in-plane difference of refractive indices $\Delta_{in}(\lambda)=|n_y(\lambda)-n_x(\lambda)|$ which satisfies the condition $\partial \Delta_{in}(\lambda)/\partial \lambda \geqq 0$ in the visible spectral range. Two principal directions for refractive indices $n_x$ and $n_y$ belong to xy-plane, one refractive index ($n_z$) corresponds to the normal direction, and the refractive indices $n_x$, $n_y$, and $n_z$ obey the following condition in the visible spectral range: $n_z=n_y>n_x$.

Thus in this embodiment of the color display, the compensation panels 13 and 17 are located outside the liquid crystal cell.

Figure 7:
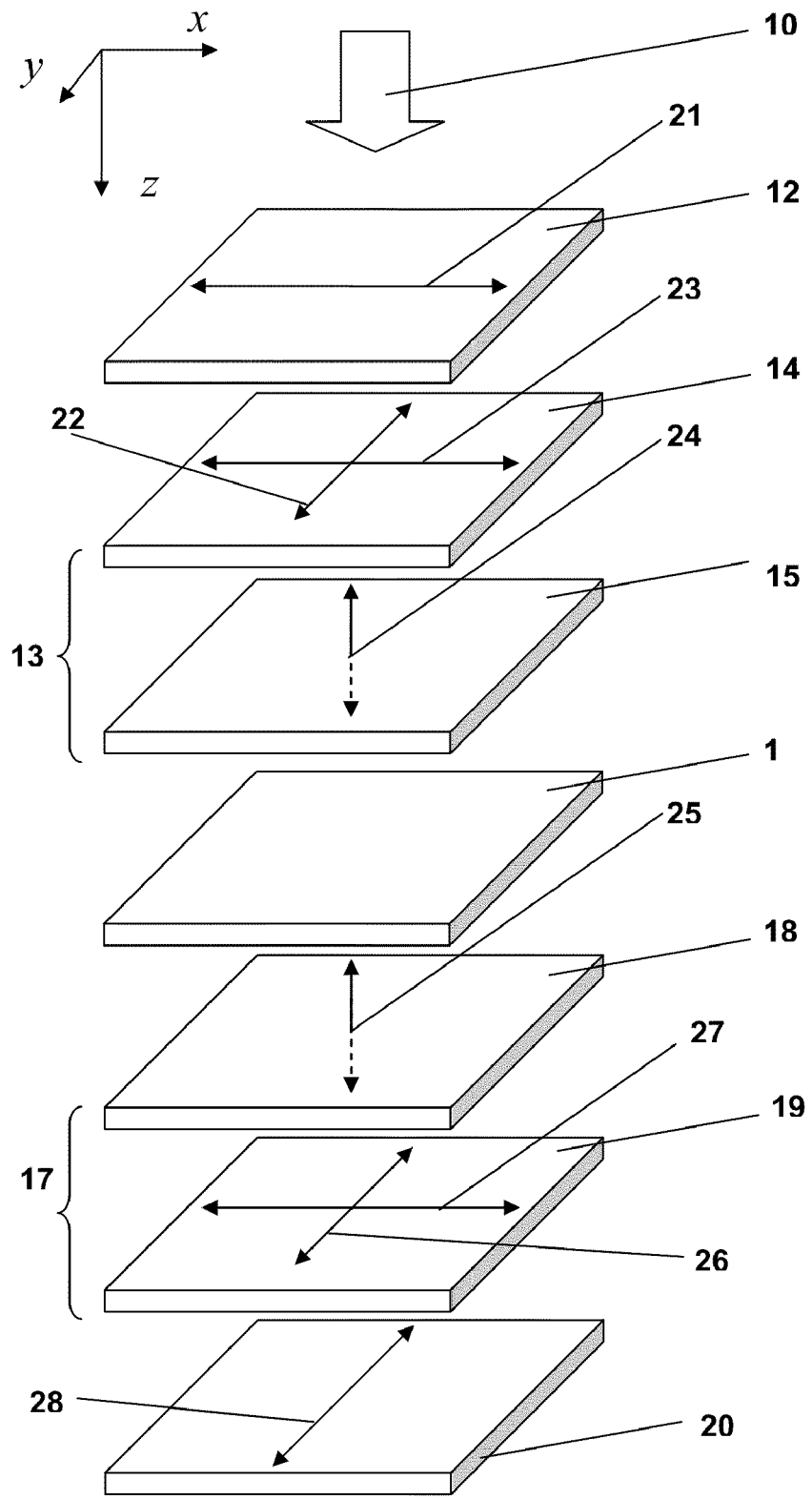
FIG. 7 is a diagram showing a construction of a liquid crystal display according to a second embodiment of the present invention.

FIG. 7 schematically shows another embodiment of the disclosed color liquid crystal display similar to the display shown in FIG. 6. The liquid crystal cell is schematically shown in FIG. 5. In one embodiment of the disclosed display, the liquid crystal cell is an in-plane switching mode liquid crystal cell. In another embodiment of the disclosed display, the liquid crystal cell is a vertically-aligned mode liquid crystal cell. The difference is in an orientation of principal axes (slow and fast) of the anisotropic layers of the first type—14 and 19, respectively. The anisotropic layer 14 is arranged in such a way that the slow principal axis 22 of said anisotropic layer is perpendicular to the transmission axis 21 of the polarizer 12, and the anisotropic layer 19 is arranged in such a way that the slow principal axis 27 of said anisotropic layer is perpendicular to the transmission axis 28 of the polarizer 20. In this embodiment of the color display, the compensation panels 13 and 17 are located outside the liquid crystal cell.

Figure 8:
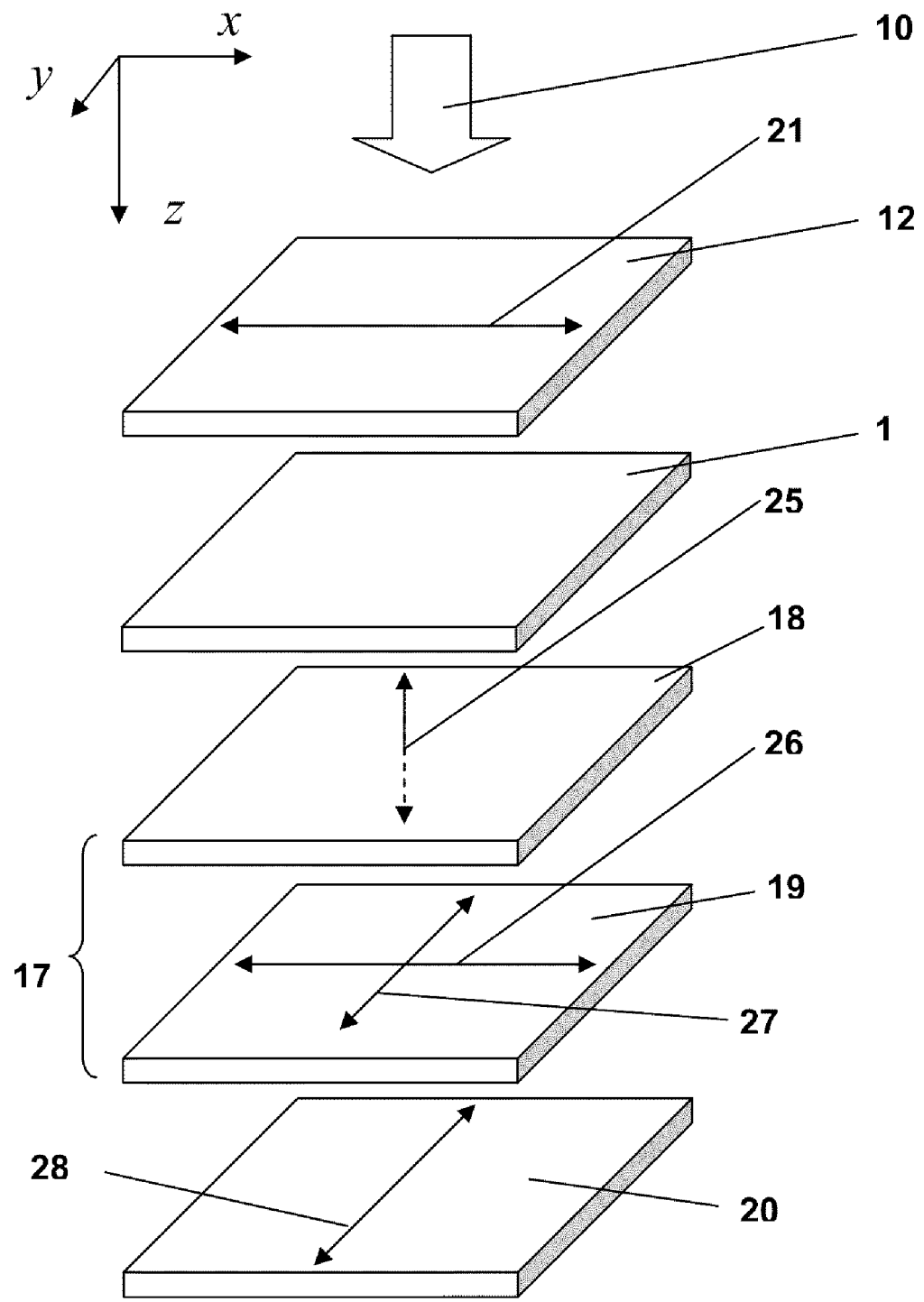
FIG. 8 is a diagram showing a construction of a liquid crystal display according to a third embodiment of the present invention.

FIG. 8 schematically shows a light beam 10 and a liquid crystal display according to the present invention. The liquid crystal display comprises a liquid crystal cell 1, two polarizers—12 and 20, arranged on each side of the liquid crystal cell, and one compensation panel 17 disposed between the liquid crystal cell and the second polarizer 20. The liquid crystal cell is schematically shown in FIG. 5. In this embodiment of the color display, the compensation panel 17 is located outside the liquid crystal cell. In one embodiment of the disclosed display, the liquid crystal cell is an in-plane switching mode liquid crystal cell. In another embodiment of the disclosed display, the liquid crystal cell is a vertically-aligned mode liquid crystal cell. The compensation panel 17 comprises an anisotropic layer of the first type 19 having slow 27 and fast 26 axes lying substantially in the layer plane, and an anisotropic layer of the second type 18 as a negative C-panel with the optical axis 25 directed substantially perpendicular to the layer plane. The anisotropic layer 19 is arranged such that the fast principal axis 26 of said anisotropic layer is perpendicular to the transmission axis 28 of the polarizer 20. The anisotropic layer of the first type 19 is a layer of negative A-type and characterized by three principal refractive indices ($n_x$, $n_y$, and $n_z$) and a difference of the in-plane difference of refractive indices $\Delta_{in}(\lambda)=|n_y(\lambda)-n_x(\lambda)|$ possessing anomalous spectral dispersion ($\partial \Delta_{in}(\lambda)/\partial \lambda >0$) in the visible spectral range. Two principal directions for refractive indices $n_x$ and $n_y$ belong to xy-plane, one refractive index ($n_z$) corresponds to the normal direction, and the refractive indices $n_x$, $n_y$, and $n_z$ obey the following condition in the visible spectral range: $n_z=n_y>n_x$.

Figure 9:
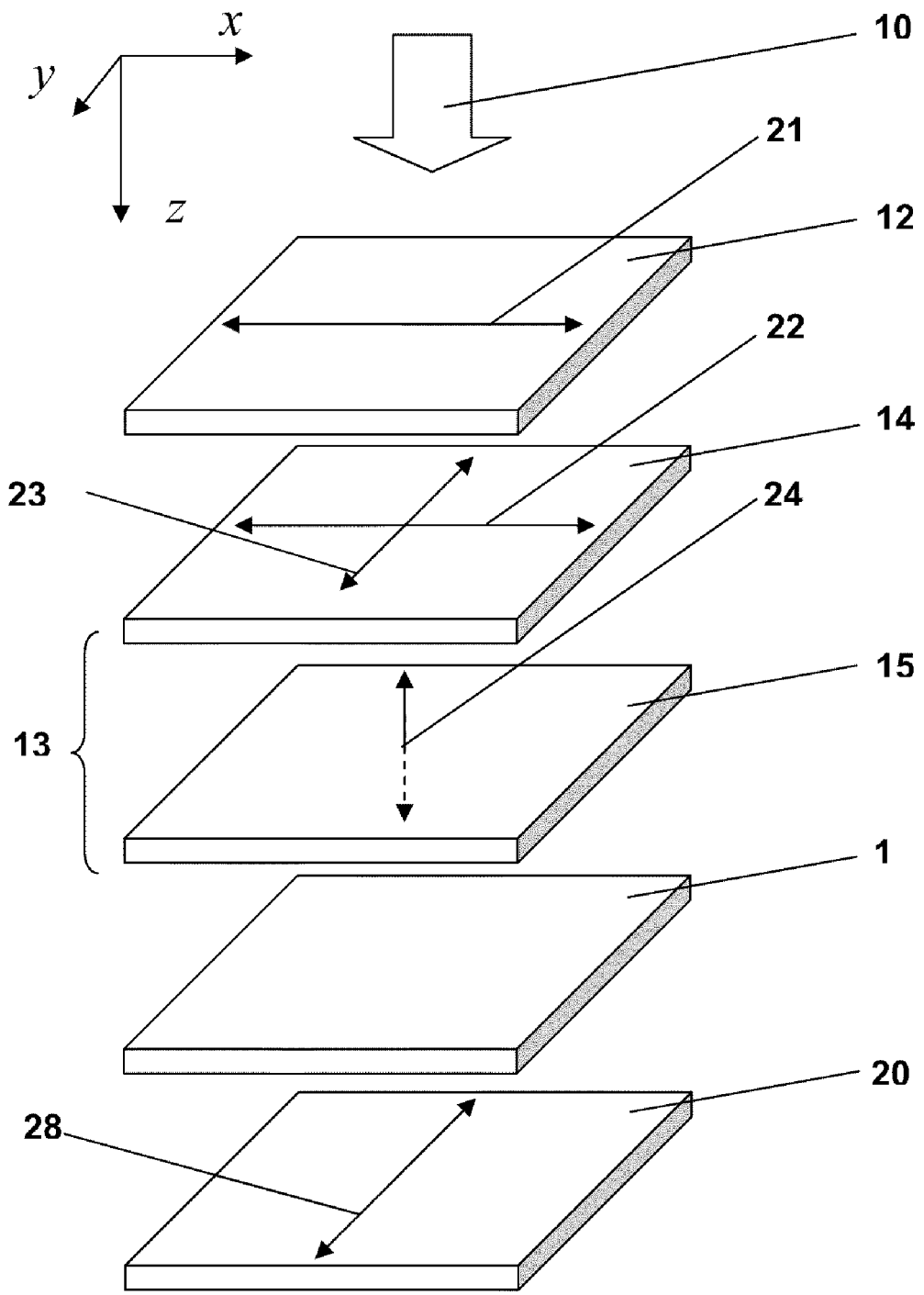
FIG. 9 is a diagram showing a construction of a liquid crystal display according to a fourth embodiment of the present invention.

FIG. 9 schematically shows a light beam 10 and a liquid crystal display according to the present invention. The liquid crystal display comprises a liquid crystal cell 1, a pair of polarizers—12 and 20, arranged on each side of the liquid crystal cell, and one compensation panel 13 disposed between the liquid crystal cell and the first polarizer 12. The liquid crystal cell 1 is schematically shown in FIG. 5. In this embodiment of the display, the compensation panel 13 is located outside the liquid crystal cell. In one embodiment of the disclosed display, the liquid crystal cell is an in-plane switching mode liquid crystal cell. In another embodiment of the disclosed display, the liquid crystal cell is a vertically-aligned mode liquid crystal cell. The transmission axis (21) of the first polarizer is perpendicular to the transmission axis (28) of the second polarizer. The first compensation panel (13) comprises an anisotropic layer of the first type (14) having slow (22) and fast (23) axes lying substantially in the layer plane, and an anisotropic layer of the second type (15) as a negative C-panel with the optical axis (24) directed substantially perpendicular to the anisotropic layer plane. The anisotropic layer (14) is arranged such that the fast principal axis (23) of said anisotropic layer is perpendicular to the transmission axis (21) of the polarizer (12). The anisotropic layer (14) is a uniaxial anisotropic layer of negative A-type and characterized by three principal refractive indices ($n_x$, $n_y$, and $n_z$) and the in-plane difference of refractive indices $\Delta_{in}(\lambda)=|n_y(\lambda)-n_x(\lambda)|$ which satisfies the condition $\partial\Delta_{in}(\lambda)/\partial\lambda \geqq 0$ in the visible spectral range. Two principal directions for refractive indices $n_x$ and $n_y$ belong to xy-plane, one refractive index ($n_z$) corresponds to the normal direction, and the refractive indices $n_x$, $n_y$, and $n_z$ obey the following condition in the visible spectral range: $n_z=n_x>n_y$.

Figure 10:
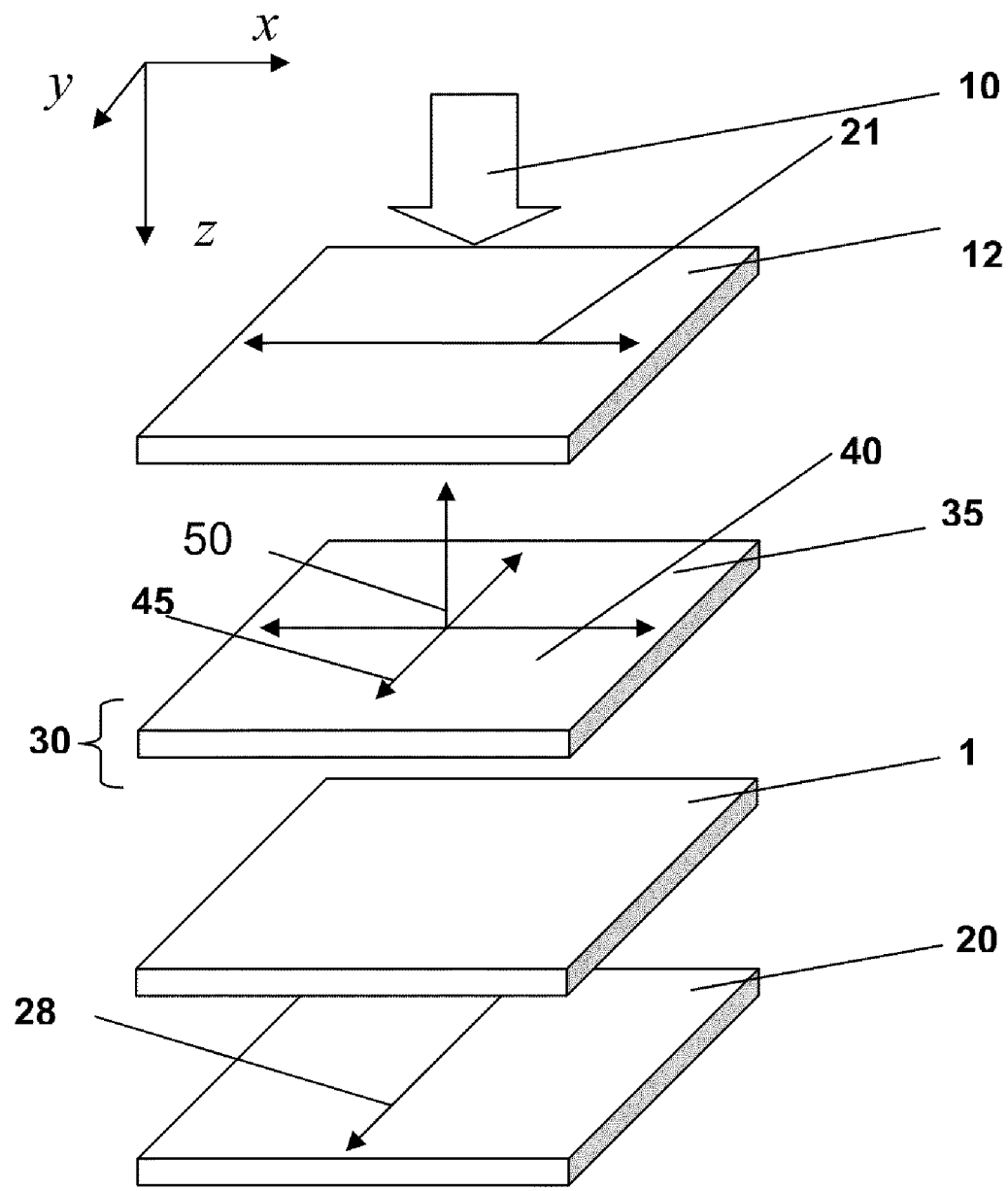
FIG. 10 is a diagram showing a construction of a liquid crystal display according to a fifth embodiment of the present invention.

FIG. 10 schematically shows a light beam 10 and a color liquid crystal display according to the present invention. The liquid crystal display comprises a liquid crystal cell 1, a pair of polarizers—12 and 20, arranged on each side of the liquid crystal cell, and one compensation panel 30 disposed between the liquid crystal cell and the first polarizer 12. The liquid crystal cell 1 is schematically shown in FIG. 5. Thus in this embodiment of the display, the compensation panel 30 is located outside the liquid crystal cell. In one embodiment of the disclosed display, the liquid crystal cell is an in-plane switching mode liquid crystal cell. In another embodiment of the disclosed display, the liquid crystal cell is a vertically-aligned mode liquid crystal cell. The transmission axis 21 of the first polarizer is perpendicular to the transmission axis 28 of the second polarizer. The compensation panel 30 comprises at least one optically anisotropic layer possessing biaxial properties of $B_A$-type and characterized by 1) three principal refractive indices ($n_x$, $n_y$, and $n_z$), 2) an in-plane difference of refractive indices $\Delta_{in}(\lambda)=|n_y(\lambda)-n_x(\lambda)|$ possessing anomalous spectral dispersion ($\partial\Delta_{in}(\lambda)/\partial\lambda>0$) in the visible spectral range, and 3) an out-of-plane difference of the refractive indices in thickness direction $\Delta_{out}(\lambda)=|n_z(\lambda)-n_x(\lambda)|$ possessing anomalous spectral dispersion ($\partial\Delta_{out}(\lambda)/\partial\lambda>0$) in the visible spectral range. Two principal directions for refractive indices $n_x$ and $n_y$ belong to xy-plane, one refractive index ($n_z$) corresponds to the normal direction, and the refractive indices $n_x$, $n_y$, and $n_z$ obey the following condition in the visible spectral range: $n_x>n_z>n_y$. The anisotropic layer 35 is arranged such that the fast principal axis 45 of said anisotropic layer is perpendicular to the transmission axis 21 of the polarizer 12. For the biaxial anisotropic layer 35 all of the three principal refractive indices $n_x$, $n_y$, and $n_z$ are different. In still another embodiment of the liquid crystal display, the compensation panel comprising at least one biaxial anisotropic layer may be disposed between the liquid crystal call and the second polarizer 20.

In yet another embodiment of the present invention, the liquid crystal display comprises two compensation panels. Each of the panels comprises at least one biaxial anisotropic layer and they are located on each side of the liquid crystal cell.

Figure 11:
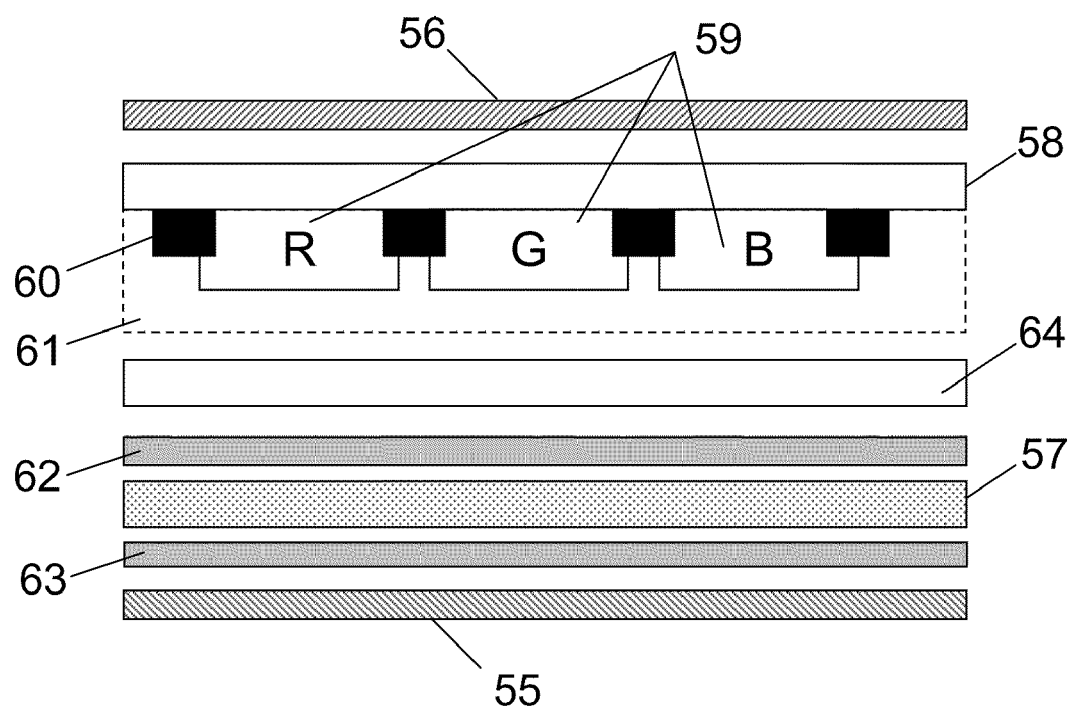
FIG. 11 is a diagram showing a construction of a liquid crystal display according to a sixth embodiment of the present invention, wherein the compensation panel is located inside the liquid crystal cell.

Another embodiment of the present invention is schematically shown in FIG. 11. The IPS LCD—the liquid crystal display with the IPS-mode liquid crystal cell, comprises the first polarizer 55, the second polarizer 56, liquid crystal cell 57 situated between said first and second polarizers, the front substrate 58 with a color filter 59 (RGB-type), black matrix 60 and planarization layer 61, other functional layers 62 comprising electrode and alignment layers, the back substrate 63 with electrodes, driving elements and alignment layers. The compensation panel 64 is located between the liquid crystal layer 57 and the second polarizer 56. Thus in this embodiment of the disclosed color display, the compensation panel is located inside the liquid crystal cell. The first and second polarizers have absorption axes, which are perpendicular to each other. In another embodiment of the disclosed color display, the liquid crystal cell may be a vertically-aligned mode liquid crystal cell (VA LCD).

For the liquid crystal display designs with an RGB color filter one pixel comprises three subpixels of red, green and blue colors. In this case the compensation panel comprises at least one optically anisotropic layer possessing biaxial properties of $B_A$-type and characterized by 1) three principal refractive indices ($n_x$, $n_y$, and $n_z$), 2) an in-plane difference of refractive indices $\Delta_{in}(\lambda)=|n_y(\lambda)-n_x(\lambda)|$ possessing anomalous spectral dispersion ($\partial\Delta_{in}(\lambda)/\partial\lambda>0$) in the visible spectral range, and 3) the out-of-plane difference of refractive indices $\Delta_{out}(\lambda)=|n_z(\lambda)-n_x(\lambda)|$ possessing anomalous spectral dispersion ($\partial\Delta_{out}(\lambda)/\partial\lambda>0$) in the visible spectral range. Two principal directions for refractive indices $n_x$ and $n_y$ belong to xy-plane, one refractive index ($n_z$) corresponds to the normal direction, and the refractive indices $n_x$, $n_y$, and $n_z$ obey the following condition in the visible spectral range: $n_x>n_z>n_y$.

In order that the invention may be more readily understood, reference is made to the following examples, which are intended to be illustrative of the invention, but are not intended to be limiting in scope.

EXAMPLES

Example 1

This example describes the preparation of polycyclic organic compound—Table 2, structural formula 1:

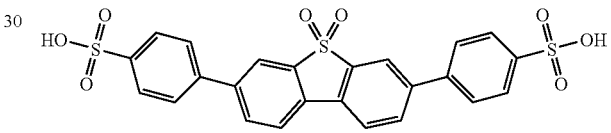

4,4'-(5,5-Dioxidodibenzo[b,d]thiene-3,7-diyl)dibenzenesulfonic acid (II) was prepared by sulfonation of 1,1':4',1":4",1'''-quaterphenyl. 1,1':4',1":4",1'''-Quaterphenyl (10 g) was charged into 20% oleum (100 ml). Reaction mass was agitated for 5 hours at ambient conditions. After that the reaction mixture was diluted with water (170 ml). The final sulfuric acid concentration was around 55%. The precipitate was filtered and rinsed with glacial acetic acid (~200 ml). Filter cake was dried in oven at ~110° C. The process yielded 8 g of 4,4'-(5,5-Dioxidodibenzo[b,d]thiene-3,7-diyl)dibenzenesulfonic acid.

The product was analyzed with $^1$H NMR (Brucker Avance-600, DMSO-$d_6$, δ, ppm) and showed the following results: 7.735 (d, 4H, 4CH$^{Ar}$(3,3',5,5')); 7.845 (d, 4H, 4CH$^{Ar}$(2,2',6,6')); 8.165 (dd, 2H, 2CH$^{Ar}$(2,8)); 8.34 (m, 4H, 4CH$^{Ar}$(1,9,4,6)). The electronic absorption spectrum of the product measured in an aqueous solution with Spectrometer UV/VIS Varian Cary 500 Scan showed the absorption maxima at $\lambda_{max1}$=218 nm (∈=3.42*10$^4$), $\lambda_{max2}$=259 nm (∈=3.89*10$^4$), and $\lambda_{max3}$=314 nm (∈=4.20*10$^4$). Mass spectrum of the product recorded using a Brucker Daltonics Ultraflex TOF/TOF is as follows: molecular ion (M$^-$=529), FW=528.57.

Example 2

The example describes synthesis of the mixture of bisbenzimidazo[1',2':3,4;1",2":5,6][1,3,5]triazino[1,2-a]benzimidazole-tricarboxylic acids, the heterocyclic molecular system of which is presented in Table 4, structural formula 27:

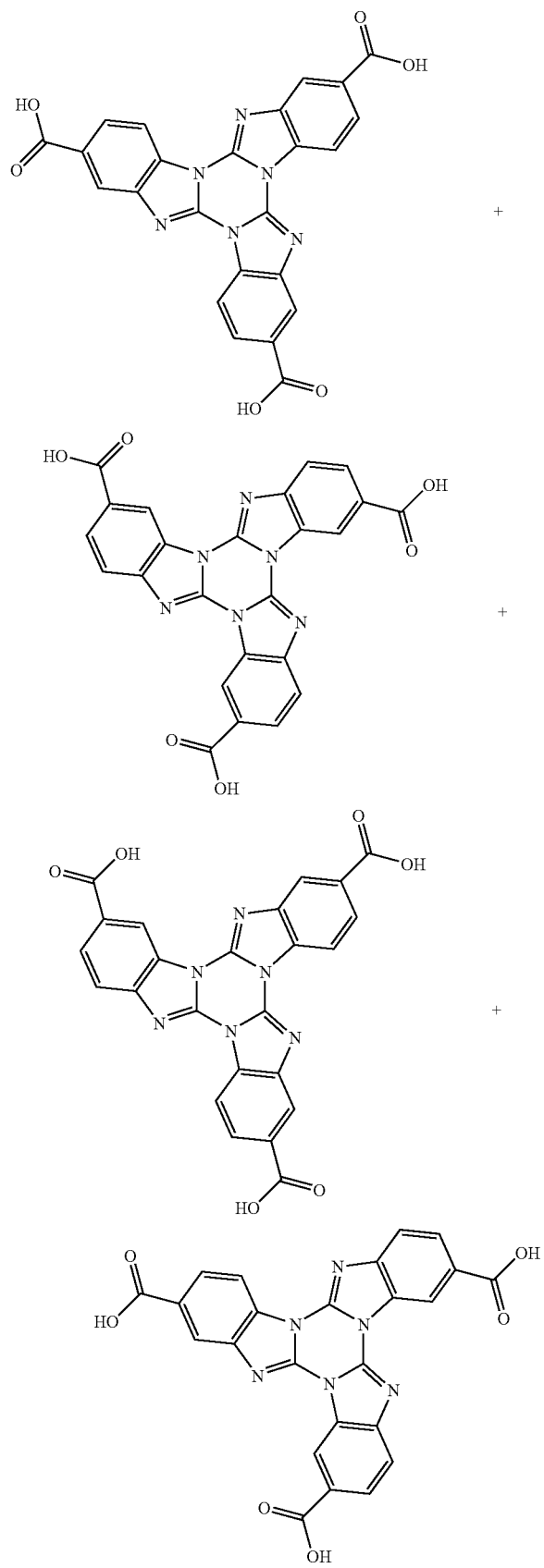

A. 5-methyl-1,3-dihydro-2H-benzimidazol-2-one

4-Methyl-1,2-phenylenediamine dihydrochloride (20.75 g, 106 mmol) was ground with urea (7.64 g, 127 mmol). The mixture was charged to a heat-resistant beaker and heated up to 150° C. After 1.5 hours reaction mixture was cooled to room temperature. The solid material was triturated and charged to heat-resistant beaker and it still was heated at 150° C. for 1.5 hours. Then reaction mixture was dissolved in the boiling 1-1.5% aqueous solution of sodium hydroxide (1.5 L). Obtained solution was filtered from undissolved solid, boiled with activated black carbon (BAU-A, 2 g) for 20-30 min and filtered. Filtrate was acidified by concentrated hydrochloric acid till pH~6. White precipitate was filtered, washed with water (100 ml) and dried in desiccator under phosphorous oxide in vacuo. Yield: 13.1 g (83.5%).

Methyl 2-oxo-2,3-dihydro-1H-benzimidazole-6-carboxylate (43 g, 0.22 mol) was charged into phosphorus oxychloride (286 ml). Dry hydrogen chloride was bubbled through the boiling reaction mass for 12 hours. After cooling reaction mass was poured in mixture of ice and water (2 kg). Precipitate was filtered out. Filtrate was diluted with water (1.25 litres) and ammonia solution (~800 ml). After that pH was adjusted to 5.6 with ammonia solution. Precipitate was filtered and rinsed with water. Yield 39.5 g (84%).

B. 2-chloro-6-methyl-1H-benzimidazole

5-Methyl-1,3-dihydro-2H-benzimidazol-2-one (13.1 g, 88.5 mmol) and phosphorus oxychloride (130 ml, freshly distillated) was charged into three-neck round-bottom flask. The mixture was heated up to boiling point till homogeneous solution was formed. After that the dried hydrogen chloride was bubbled through inlet gas-pipe into the reaction mixture. The mixture was boiled for 15 hours. Excess of phosphorus oxychloride was distillated in vacuo. Mixture of ice and water (250 ml) was added to residue. The obtained suspension was cooled to the room temperature and filtered. Filtrate was alkalinized by aqueous ammonia solution till pH 8, cooled by cold water and filtered crude 2-chloro-6-methyl-1H-benzimidazole. White powder was crystallized from aqueous methanol (water-methanol: 1:1, 200 ml), washed by aqueous methanol and dried in a desiccator under phosphorous oxide in vacuo. Yield: 8.17 g (55%).

C. Trimethyl-bisbenzimidazo[1',2':3,4;1'',2'':5,6][1,3,5]triazino[1,2-a]benzimidazoles 2-Chloro-6-methyl-1H-benzimidazole (2.7 g, 16.2 mmol) was charged into round-bottom flask and heated up to 200-205° C. for about 1 hour. Reaction mixture was cooled to the room temperature. Solid material (2.2 g) was dissolved in the boiling dioxane (70 ml), resulted solution was cooled to the room temperature. Solution was filtered, filtrate was washed by dioxane (25 ml) and washing dioxane was combined with main solution. Water (40 ml) was added dropwise to obtained solution. Precipitate was filtered, washed with acetone and dried in vacuo under phosphorous oxide at about 70° C. Yield: 1.16 g (54%).

D. Bisbenzimidazo[1',2':3,4;1'',2'':5,6][1,3,5]triazino[1,2-a]benzimidazole-tricarboxylic acids 2,8,14-Trimethyl-bisbenzimidazo[1',2':3,4;1'',2'':5,6][1,3,5]triazino[1,2-a]benzimidazole (1.03 g, 2.6 mmol) was added to mixture (20 ml) of concentrated sulfuric acid and glacial acid (ratio 8:12). Then powder of chromium trioxide (3.5 g)

was added slowly with cooling of reaction mixture. The mixture was stirred for 3 hours at room temperature. Water (20 ml) was added dropwise to the reaction mixture with cooling (20-40° C.). Precipitate was filtered and washed with a large volume of water and diluted hydrogen chloride solution (30 ml). Then a precipitate was dried in vacuo under phosphorous oxide. Yield: 0.72 g (57.6%).

Example 3

The example describes synthesis of the mixture of bisbenzimidazo[1',2':3,4;1'',2'':5,6][1,3,5]triazino[1,2-a]benzimidazole-trisulfonic acids, the heterocyclic molecular system of which is presented in Table 4, structural formula 29:

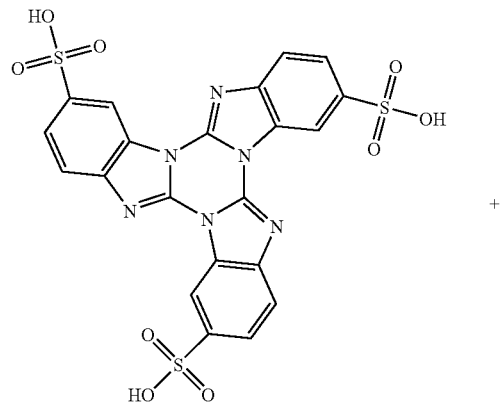

+

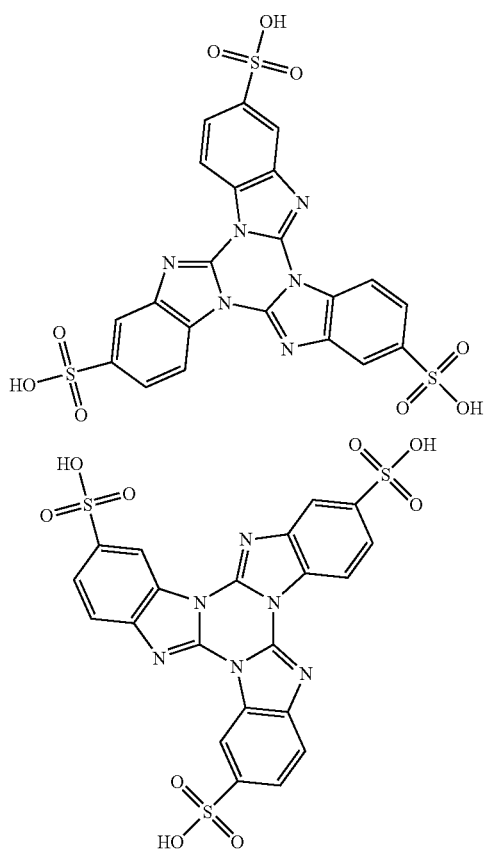

+

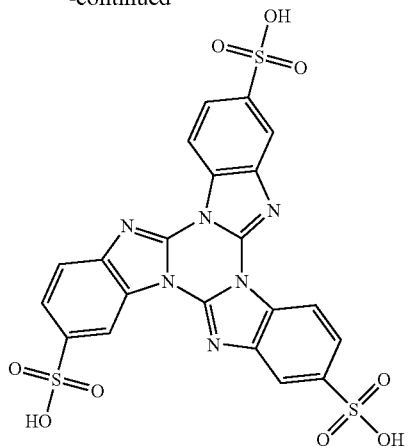

A. Synthesis of bisbenzimidazo[1',2':3,4;1'',2'':5,6][1,3,5]triazino[1,2-a]benzimidazole 2-Chloro-1H-Benzimidazole (4 g, 0.026 mol) was heated up to 200-220° C. and agitated for half hour (until hydrogen chloride stopped to evolve). Nitrobenzene was added into reaction mass and boiled for 25 minutes with agitation. After self cooling down to 80° C. it was filtered and rinsed with acetone. Filter cake was dried at ~100° C. Yield 2.1 g (70%).

B. Synthesis of the mixture of bisbenzimidazo[1',2':3,4;1'',2'':5,6][1,3,5]triazino[1,2-a]benzimidazole-trisulfonic acids Bisbenzimidazo[1',2':3,4;1'',2'':5,6][1,3,5]triazino[1,2-a]benzimidazole (2.0 g, 0.006 mol) was charged into 20% oleum (20 ml) and agitated overnight. After that the reaction mass was diluted with water (28.2 ml). Precipitate was filtered and rinsed with concentrated hydrochloric acid, 1,4-dioxane and acetone. The product was dried in a desiccator. Yield 1.32 g (40%).

Example 4

The example describes synthesis of 2,2'-bibenzheteroazole heterocyclic compounds represented by the Table 3, structural formula 8:

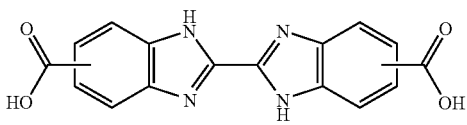

1H,1'H-2,2'-bibenzimidazole-5,5'-dicarboxylic acid

O-methyl-1,1,1-trichloroacetimidate was added (0.4 ml, 0.57 g, 3.2 mmol) to a suspension of 3,4-diaminobenzoic acid (1.0 g, 6.6 mmol) in anhydrous methanol (100 ml). The reaction mixture was stirred for 48 h at ambient conditions. Resultant yellow solid material was filtered off, dried in vacuum to a constant weight. Yield 0.43 g (41%).

For further purification 1H,1'H-2,2'-bibenzimidazole-5,5'-dicarboxylic acid was dissolved in dimethylsulfoxide taken in a ratio of 0.85 g/37 ml and water was added slowly (5 ml)

to resultant solution. The mixture was stirred for 30 min., solid material formed was filtered off, washed with ethanol (2×30 ml) and dried in vacuum to a constant weight. NMR $^1$H spectrum (Brucker Avance 600 instrument; solvent $d_6$-dimethyl sulfoxide; δ, ppm; J, Hz): 7.74 d.d (2H$^b$, $^3J_{ba}$=7.5), 7.93 d (2H$^a$, $^3J_{ab}$=7.5), 8.28 d (2H$^x$), 12.89 br.s (2NH and 2COOH), 13.94 br.s (2NH and 2COOH). Mass-spectrum (MALDI positive mode, Ultraflex TOF/TOF Bruker Daltonics instrument): 322 (100%) [M$^{+•}$], 304 (45%) [M$^{+•}$-H$_2$O], 277 (50%) [M$^{+•}$-CO$_2$H].

Example 5

The example describes syntheses of 2,2'-bibenzheteroazole heterocyclic compounds shown in Table 3, sructural formula 11:

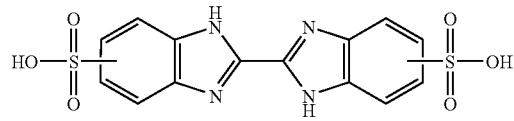

1H,1'H-2,2'-bibenzimidazole-5,5'-disulfonic acid

A round-bottom 3 neck flask was charged with 3,4-diaminobenzenesulfonic acid (8.0 g, 42.5 mmol) and anhydrous MeOH (0.85 L). O-Methyl-1,1,1-trichloroacetimidate was added (2.8 mL, 3.74 g, 21.2 mmol). The resultant suspension was stirred for 24 h at ambient conditions. Additional amount of O-methyl-1,1,1-trichloroacetimidate was added (1.4 mL, 1.87 g, 10.5 mmol) after this time, then reaction mixture was stirred for 72 h at ambient conditions, heated for 3 h at 50° C. and triethylamine (14 mL, 9.4 g, 93.5 mmol) was added. Stirring was continued at this temperature for 18 hours. Then reaction mixture was cooled to 30° C., and an intensive flow of dry HCl was passed through the solution until a precipitate was formed. The suspension was filtered off at 40° C., precipitate was washed with MeOH (4×150 mL, stirring of suspension for 10-15 min each turn) and with MeOH—HCl 3.5% solution (100 mL, 1 h of stirring). Product 1H,1'H-2,2'-bibenzimidazole-5,5'-disulfonic acid was pale yellow or colorless, weight 3.5 g, yield 42%. It may contain own hydrochloride as a salt. NMR $^1$H spectrum (Brucker Avance 300 instrument; solvent $d_6$-dimethyl sulfoxide; δ, ppm; J, Hz): 5.27 br.s (—SO$_3$H in exchange with H$_2$O and NH) 7.73 m (2H$^a$, 2H$^b$), 8.01 br.s (2H$^x$). NMR $^{13}$C {$^1$H} spectrum (Brucker Avance 300 instrument; solvent $d_6$-dimethyl sulfoxide; δ, ppm): 113.00, 115.41, 123.27, 136.44, 137.60, 142.24, 145.34.

Example 6

The example describes syntheses of a mixture of 9-carboxy-acenaphthoquinoxaline-2-sulfonamide and 9-carboxy-acenaphthoquinoxaline-5-sulfonamide shown in Table 5, structural formula 30

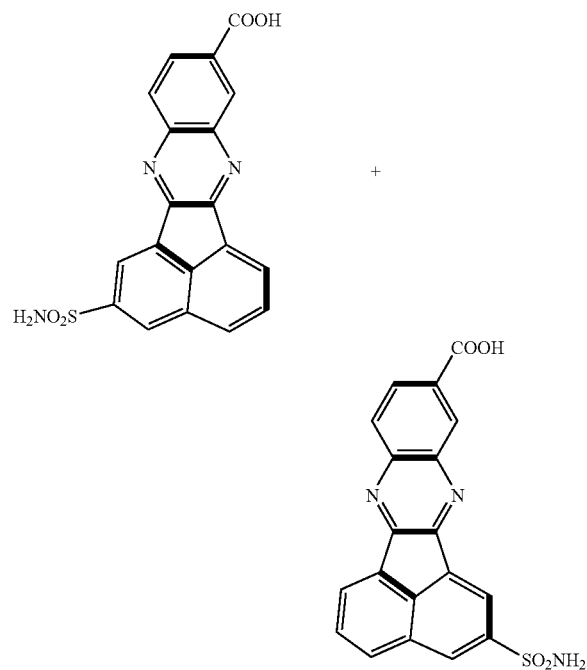

A. Synthesis of 9-carboxy-acenaphthoquinoxaline

A solution of 3,4-diaminobenzoic acid hydrochloride (1.88 g, 0.01 mol) in 75 ml of water was added to the suspension of acenaphthoquinone (1.82 g, 0.01 mol) in 80 ml of acetic acid. The reaction mixture was heated to 95-100° C., treated at this temperature for 15 min with stirring, and cooled. The precipitate was separated by filtration and washed with acetic acid. The final product yield was 2.6 g (87%). Mass spectrum (VISION 2000 spectrometer, negative ion reflection mode): m/z, 298.5; mol. wt., 298.29; electronic absorption spectrum (Ocean PC 2000 spectrometer, aqueous solution of ammonium salt): $\lambda_{max1}$=235 nm, and $\lambda_{max2}$=320 nm.

B. Synthesis of the Mixture of 9-carboxy-acenaphthoquinoxaline-2-sulfonic acid and 9-carboxy-acenaphthoquinoxaline-5-sulfonic acid 9-Carboxy-acenaphthoquinoxaline (2.0 g, 0.0067 mol) was added to 20 ml of 30% oleum and kept with stirring for 3.5 h at 80-90° C. Then, the reaction mixture was diluted with 36 ml of water and the precipitate was separated by filtration, reprecipitated from acetic acid (100 ml), filtered, and washed with acetone. The final product yield was 1.92 g (76%). Mass spectrum (VISION 2000 spectrometer, negative ion reflection mode): m/z, 377.1; mol. wt., 378.36; electronic absorption spectrum (Ocean PC 2000 spectrometer, aqueous solution of ammonium salt): $\lambda_{max1}$=235 nm, and $\lambda_{max2}$=320 nm.

C. Synthesis of the Mixture of chlorides of 9-carboxy-acenaphthoquinoxaline-2-sulfonic acid and 9-carboxy-acenaphthoquinoxaline-5-sulfonic acid A mixture of 9-carboxy-acenaphthoquinoxaline-2-sulfonic acid and 9-carboxy-acenaphthoquinoxaline-5-sulfonic acid (1.8 g, 0.0047 mol) was added to chlorosulfonic acid (18 ml). Then, 0.3 g of NaCl was added and the reaction mixture was kept with stirring for 3 hours at 80-85° C., cooled, and poured into 350 g of ice. The precipitate was separated by filtration and washed until neutral pH with ice-cold water. The final product yield was 8-9 g of a filter-cake.

D. Synthesis of the Mixture of 9-carboxy-acenaphthoquinoxaline-2-sulfonamide and 9-carboxy-acenaphthoquinoxaline-5-sulfonamide The filter-cake of the mixture of chlorides of 9-carboxy-acenaphthoquinoxaline-2-sulfonic acid and 9-carboxy-acenaphthoquinoxaline-5-sulfonic acid (8-10 g) was added to 20 ml of ammonia and the mixture was kept at 3-5° C. for 0.5 hour and then stirred under ambient conditions for 0.5 hour. The obtained ammonia solution was filtered and diluted with isopropanol (~30 ml). The precipitate was separated by filtration and washed on a filter with isopropanol. The final product yield was 1.2 g (67%). Mass spectrum (VISION 2000 spectrometer): m/z, 377.2; mol. wt., 377.37; electron absorption spectrum (Ocean PC 2000 spectrometer, aqueous solution of ammonium salt): $\lambda_{max1}$=235 nm, and $\lambda_{max2}$=320 nm. Elemental analysis: C, 60.22; H, 2.91; N, 11.11. anal calcd. for $C_{18}H_{10}N_2O_3S$: C, 60.47; H, 2.94; N, 11.13; O, 16.96; S, 8.50.

Example 7

This example describes the synthesis of a mixture of sulfonamide-carboxylic acids of 6,7-dihydrobenzimidazo[1,2-c]quinazoline-6-one shown in Table 6 structural formula 50, which was performed according to the following scheme:

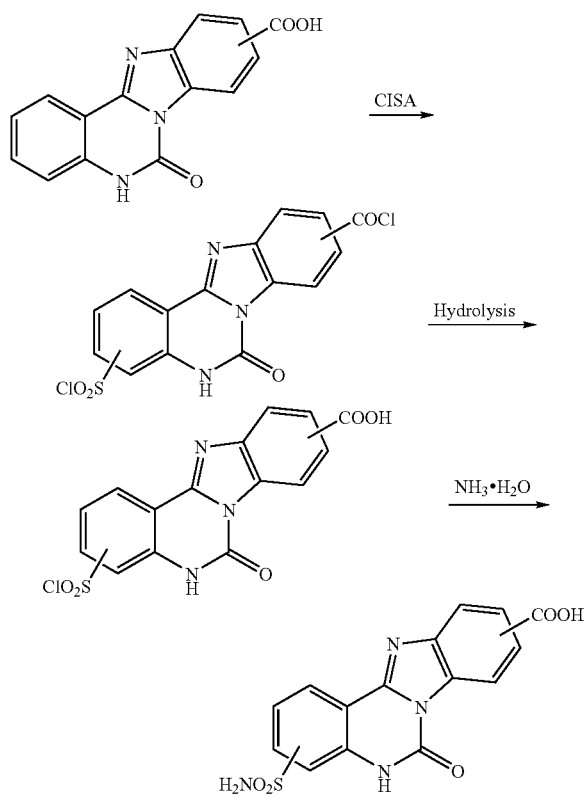

A mixture of 6,7-dihydrobenzimidazo[1,2-c]quinazoline-6-one-9-carboxylic acid and 6,7-dihydrobenzimidazo[1,2-c]quinazoline-6-one-10-carboxylic acid (5.0 g) was stirred with chlorosulfonic acid (50 ml) at 95° C. for 4 hours. Then, the reaction mass was poured into ice (150 g). The precipitate was separated by filtration and washed with ice-cold water (100 ml) until neutral reaction of the wash water. According to HPLC data, the residue on the filter contained 91.5% of the target product and 5% of a carboxysulfonic acid derivative.

This residue was introduced by small portions into aqueous ammonia solution (50 ml), and the mixture was stirred for about one hour at room temperature. Then, the ammonia solution was acidified to pH 2.5 by adding sulfuric acid. The precipitate was filtered, suspended in 3% hydrochloric acid (100 ml), and filtered again. The residue was washed with water (60 ml). This procedure yielded 3.9 g of 2(3)-sulfonamide-6,7-dihydrobenzimidazo[1,2-c]quinazoline-6-one-9-carboxylic acid and 2(3)-sulfonamide-6,7-dihydrobenzimidazo[1,2-c]quinazoline-6-one-10-carboxylic acid mixture (the product comprises 87% of the target compound and 5% of a carboxysulfonic acid derivative). The precipitate was air dried at 105° C.

The mass spectrum of the product recorded using a Vision 2000 spectrometer was as follows: m/z, 358.6; mol. wt., 358.04. The electronic absorption spectrum of an aqueous solution of the product measured using an Ocean PC 2000 UV/VIS spectrophotometer showed the absorption maxima at $\lambda_{max1}$=325 nm and $\lambda_{max2}$=335-340 nm. The elemental analyses gave the following results (%): C, 50.28; H, 2.81; N, 15.64; S, 8.95 (anal. calcd. for $C_{15}H_{10}N_4O_5S$); C, 50.63; H, 2.88; N, 16.01 (found).

Example 8

This example describes the synthesis of a (4a,5a,16b,16d-tetrahydroanthra[9,1,2-cde]benzo[rst]pentaphene-5,10-dione, disulfonic acid shown in Table 7, #71. Violanthrone was added to chlorosulfonic acid (50 ml) at ambient conditions. Then reaction mass was agitated at 85-90° C. for 15 hours. After self cooling the reaction mass was added by parts to water (600 ml). Precipitate was filtered and rinsed with water until filtrate became colored. Filter cake was agitated in the boiling water for two hours. The filter cake was dissolved. The product was precipitated by addition of concentrated hydrochloric acid (600 ml). Precipitate was filtered, washed with 6 N hydrochloric acid (200 ml) and dried in oven (~100° C.).

Yield 11.8 g.

Example 9

This example describes the synthesis of a (bisbenzimidazo[1,2-c:2',1'-i]benzo[lmn]-3,8-phenanthroline-6,9-dione, disulfonic acid shown in Table 7, #74.

Cis-dibenzimidazole of 1,4,5,8-naphtalentetracarboxylic acid (10 g) was added to 20% Oleum (30 ml) at room temperature. The reaction mixture was stirred for 4 hrs at 40-45° C. Then water (60 ml) was added followed by 25% aqueous ammonia (49 ml) at <30° C. and the resulting precipitated material filtered out. This acid filter cake was dissolved in water (1 liter), neutralized with ammonia to pH=5.5 and desalted with ultrafiltration. Yield 12.0 g (per dry).

Example 10

This example describes the preparation of an optically anisotropic layer from a solution comprising a binary mixture of a host compound (4,4'-(5,5-dioxidodibenzo[b,d]thiene-3,7-diyl)dibenzenesulfonic acid) denoted hereafter as H1 (see Table 2, structure 1) and guest particles ((bisbenzimidazo[1,2-c:2',1'-i]benzo[lmn]-3,8-phenanthroline-6,9-dione, disulfonic acid) denoted hereafter as G1 (see Table 7, structure 74). Said mixture is capable of forming a guest-host system. The organic compound H1 is capable of forming a host matrix of the guest-host system. The stack (columns) comprised of organic compound G1 molecules serve as guest, can align together with stacks (columns) of H1 molecules. Thus, G1 as guest provides additional absorption spectrum for at least one principal direction of the anisotropic host matrix in at least one subrange.

H1/G1=75/25 mole % mixture was prepared as follows: 0.595 g of H1 was dissolved in 100 g of de-ionized water (conductivity ~5 μSm/cm); suspension was mixed with a magnet stirrer. While stirring, 25 ml of 20% wt. KOH was gradually (during 15 min) added drop-by-drop into suspension until a clear solution was formed. Separately, 0.105 g of G1 was dissolved in 20 g of de-ionized water. While stirring a G1 water suspension, 5 ml of 20% wt. KOH was gradually added until a clear solution was formed. Clear solutions of H1 and G1 were mixed together to form 150.7 g of a clear solution. This mixture was concentrated on a rotary evaporator to remove an excess of water and form 10 g of a binary mixture representing a Lyotropic Liquid Crystal (LLC) solution. The total concentration of mixture (H1+G1) $C_{TOT}$ was equal to 10%.

Fisherbrand microscope glass slides were prepared for coating by treating in a 10% NaOH solution for 30 min, rinsing with deionized water, and drying in airflow with the compressor. The obtained LLC solution was applied at a temperature of 22° C. and a relative humidity of 55% onto the glass panel surface with a Buschman® microgrooved stainless steel rod #1.5 which was moved at a linear velocity of 100 mm/s. The film was dried at the same humidity and temperature.

Figure 12:
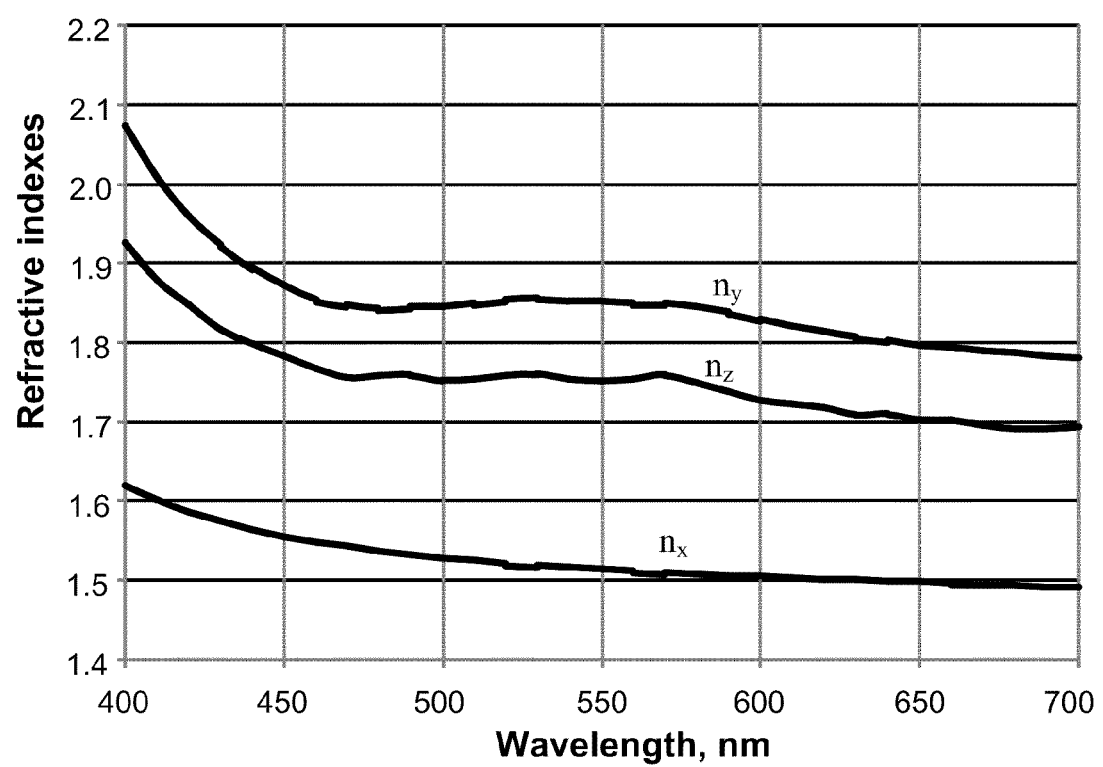
FIG. 12 shows the calculated refractive indices ($n_x$, $n_y$, and $n_z$) of the optically anisotropic layer according to the first embodiment of the disclosed anisotropic layer.

In order to determine the optical characteristics of the optically anisotropic layer, thickness, optical retardation and transmission spectra were measured in a wavelength range from approximately 320 to 700 nm using Dectak³ST electromechanical profilometer, Axometrics Axoscan Mueller Matrix spectropolarimeter and Cary 500 Scan spectrophotometer respectively. Optical transmission of the optically anisotropic layer was measured using light beams linearly polarized parallel and perpendicular to the coating direction ($T_{par}$ and $T_{per}$, respectively). The obtained data were used to calculate the refractive indices ($n_x$, $n_y$, and $n_z$) presented in FIG. 12. Two principal directions for refractive indices $n_x$ and $n_y$ belong to xy-plane coinciding with a plane of the compensation panel and one principal direction for refractive index (nz) coincides with a normal line to the compensation panel. The obtained optically anisotropic layer is characterized by the thickness equal to 250 nm and two principal refractive indices ($n_y$ and $n_z$) which possess anomalous spectral dispersion in a subrange approximately from 350 nm to 450 nm.

Figure 13:
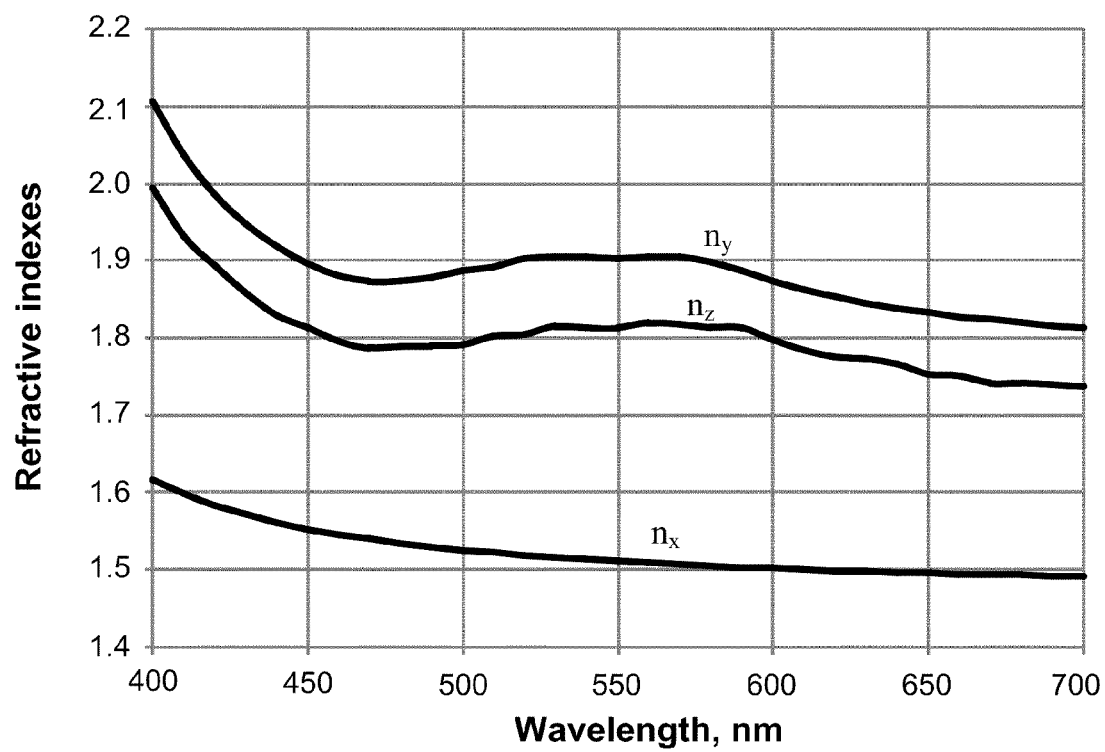
FIG. 13 shows the calculated refractive indices ($n_x$, $n_y$, and $n_z$) of the optically anisotropic layer according to the second embodiment of the disclosed anisotropic layer.

FIG. 13 shows refractive indices ($n_x$, $n_y$, and $n_z$) of an optically anisotropic layer prepared from a solution comprising a binary mixture of the same host compound and guest particles. In this case the ratio H1/G1 was equal to 08/02 and total concentration of mixture (H1+G1)$C_{TOT}$ was equal to 7%. The refractive indexes $n_y$, and $n_z$ possess anomalous spectral dispersion in a subrange approximately from 475 nm to 575 nm.

Example 11

This example describes preparation of an optically anisotropic layer from a solution comprising a threefold mixture of host compound (4,4'-(5,5-dioxidodibenzo[b,d]thiene-3,7-diyl)dibenzenesulfonic acid) denoted hereafter as H1 (see Table 2, structure 1); first guest particles (bisbenzimidazo[1,2-c:2',1'-i]benzo[lmn]-3,8-phenanthroline-6,9-dione, disulfonic acid, 22 mole %) denoted hereafter as G1 (see Table 7, structure 74), and second guest particles (4a,5a,16b,16d-tetrahydroanthra[9,1,2-cde]benzo[rst]pentaphene-5,10-dione, disulfonic acid, 8 mole %) denoted hereafter as G2 (see Table 7, structure 71, where k=2), Said mixture is capable of forming a guest-host system. The organic compound H1 is capable of forming a host matrix of the guest-host system. The stack (columns) comprising organic compounds G1 and G2 molecules serve as a guest capable to align together with stacks (columns) of H1 molecules. Thus, G1 and G2 as a guest provide additional absorption spectrum for at least one principal direction of the anisotropic host matrix in at least one subrange.

H1/G1/G2=70/22/8 mole % mixture was prepared as follows: 0.523 g of H1 was dissolved in 100 g of de-ionized water (conductivity ~5 μm/cm); suspension was mixed with a magnet stirrer. While stirring, 23 ml of 20% wt. KOH was gradually (during 15 min) added drop-by-drop into suspension until a clear solution was formed. Separately, 0.96 g of G1 and 0.15 g of G2 were dissolved in 20 g of de-ionized water. While stirring a G1 and G2 combined suspension in water, 6 ml of 20% wt. KOH was gradually added until a clear solution was formed. Clear solutions of H1 and G1+G2 were mixed together to form 145 g of another clear solution. This mixture was concentrated on a rotary evaporator to remove an excess of water and form 10 g of a threefold mixture representing a Lyotropic Liquid Crystal (LLC) solution.

Fisherbrand microscope glass slides were prepared for coating by treating in a 10% NaOH solution for 30 min, rinsing with deionized water, and drying in airflow with the compressor. The obtained LLC solution was applied at a temperature of 22° C. and a relative humidity of 55% onto the glass panel surface with a Buschman® microgrooved stainless steel rod #1.5 which was moved at a linear velocity of 100 mm/s. The film was dried at the same humidity and temperature.

Figure 14:
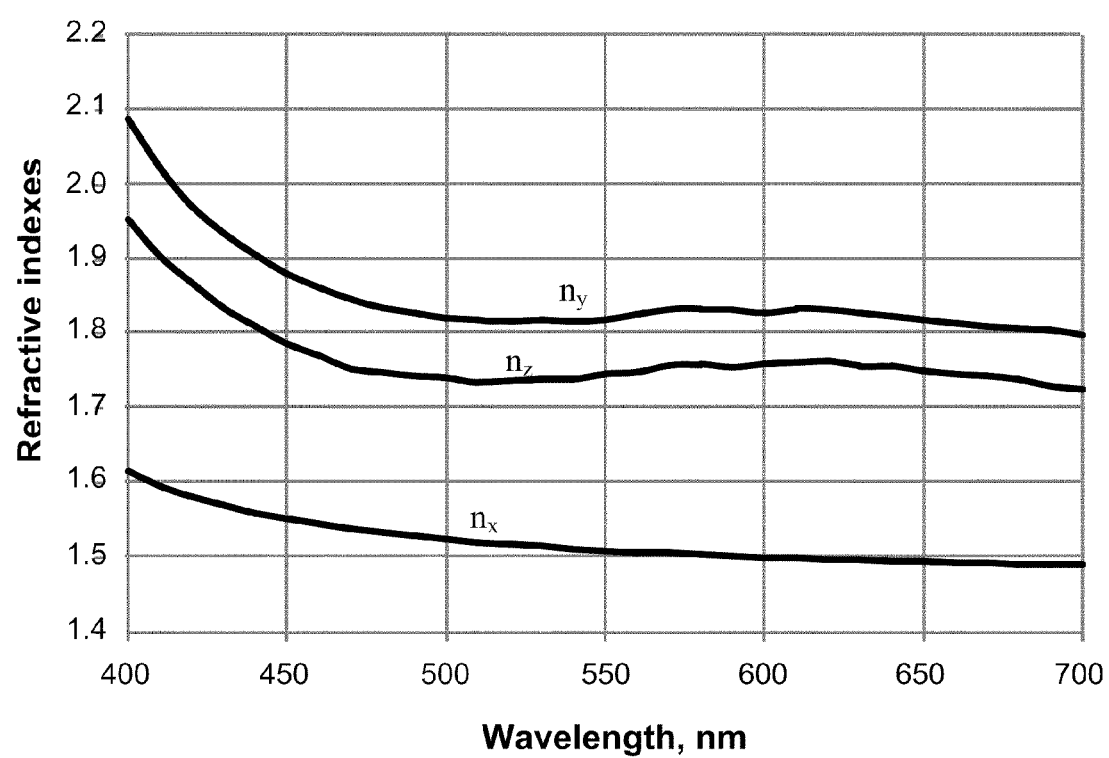
FIG. 14 shows the calculated refractive indices ($n_x$, $n_y$, and $n_z$) of the optically anisotropic layer according to the third embodiment of the disclosed anisotropic layer.

In order to determine the optical characteristics of the optically anisotropic layer, thickness, optical retardation and transmission spectra were measured in a wavelength range from approximately 400 to 700 nm using Dectak³ST electromechanical profilometer, Axometrics Axoscan Mueller Matrix spectropolarimeter and Cary 500 Scan spectrophotometer respectively. The optical transmission of the optically anisotropic layer was measured using light beams linearly polarized parallel and perpendicular to the coating direction ($T_{par}$ and $T_{per}$, respectively). The obtained data were used to calculate the refractive indices ($n_x$, $n_y$, and $n_z$) presented in FIG. 14. Two principal directions for refractive indices $n_x$ and $n_y$ belong to xy-plane and one refractive index (nz) corresponds to the thickness direction. The obtained optically anisotropic layer is characterized by the thickness equal to 250 nm and two principal refractive indices ($n_y$ and $n_z$) which possess anomalous spectral dispersion in a subrange approximately from 500 nm to 625 nm.

Figure 15:
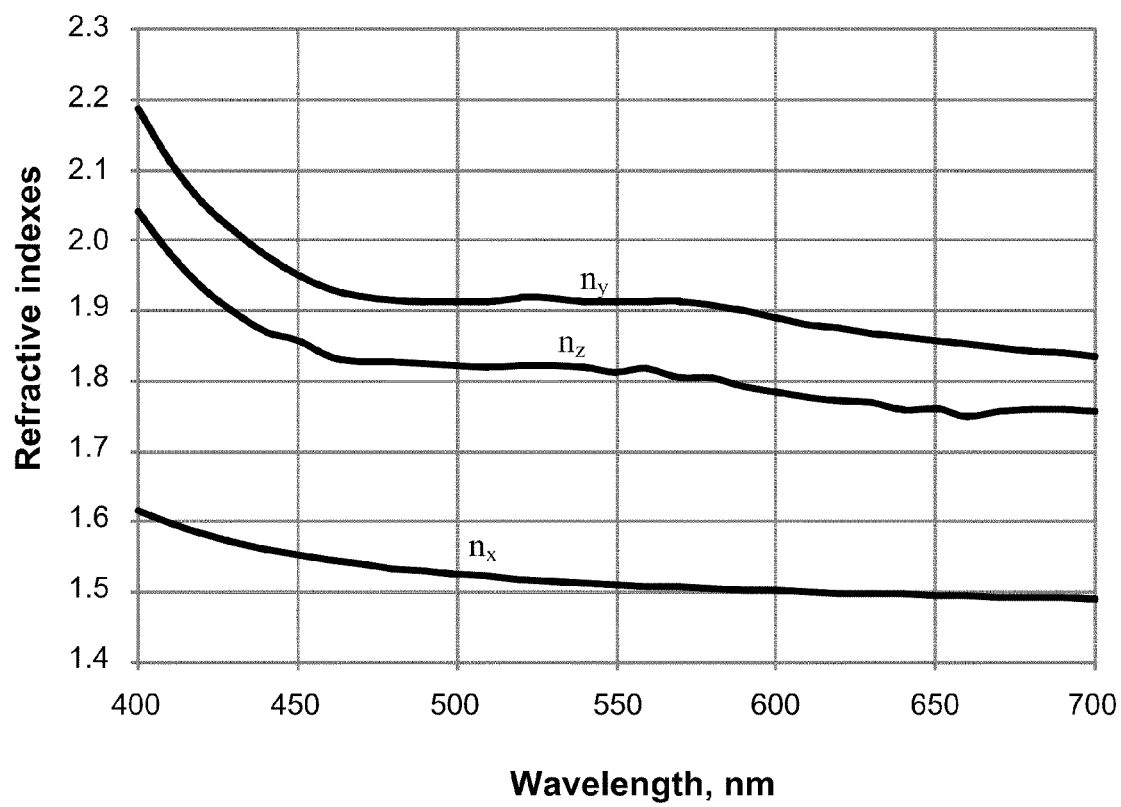
FIG. 15 shows the calculated refractive indices ($n_x$, $n_y$, and $n_z$) of the optically anisotropic layer according to the fourth embodiment of the disclosed anisotropic layer.

FIG. 15 shows refractive indices ($n_x$, $n_y$, and $n_z$) of an optically anisotropic layer prepared from a solution comprising a threefold mixture of the same host compound (H1) and guest particles of two types (G1 and G2). In this case the ratio H1/G1/G2 was equal to 0.75/0.15/0.1 and total concentration of mixture (H1+G1+G2)$C_{TOT}$ was equal to 8%. The refractive indexes $n_y$, and $n_z$ possess anomalous spectral dispersion in a subrange approximately from 475 nm to 575 nm of the visible spectral range.

Figure 16:
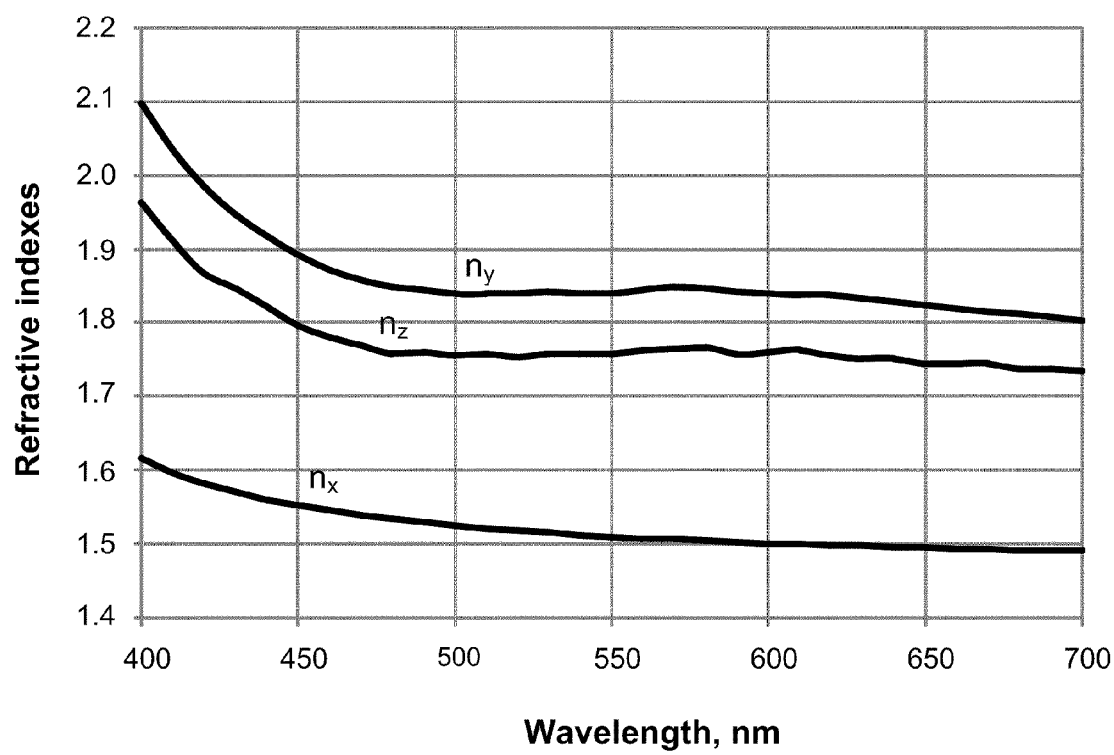
FIG. 16 shows the calculated refractive indices ($n_x$, $n_y$, and $n_z$) of the optically anisotropic layer according to the fifth embodiment of the disclosed anisotropic layer.

FIG. 16 shows refractive indices ($n_x$, $n_y$, and $n_z$) of an optically anisotropic layer prepared from a solution comprising a threefold mixture of the same host compound (H1) and guest particles of two types (G1 and G2). In this case the ratio H1/G1/G2 was equal to 0.75/0.18/0.07 and total concentration of mixture (H1+G1+G2)$C_{TOT}$ was equal to 12%. The refractive indexes $n_y$, and $n_z$ possess anomalous spectral dispersion in a subrange approximately from 475 nm to 625 nm of the visible spectral range.

Figure 17:
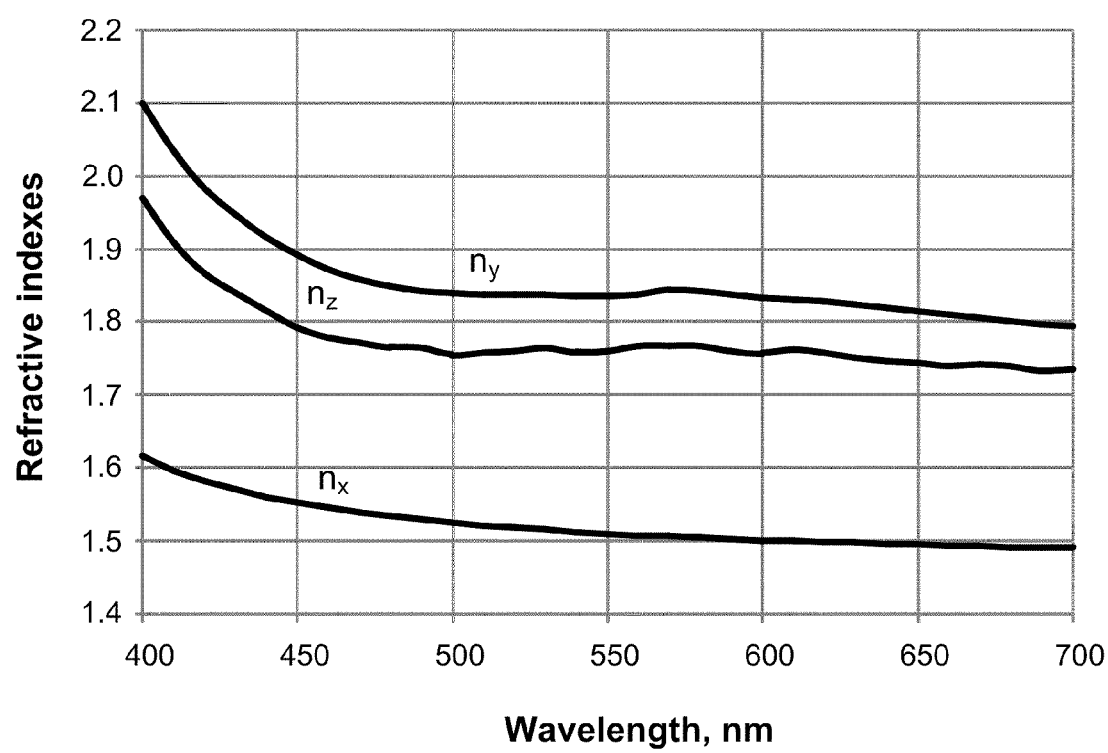
FIG. 17 shows the calculated refractive indices ($n_x$, $n_y$, and $n_z$) of the optically anisotropic layer according to the sixth embodiment of the disclosed anisotropic layer.

FIG. 17 shows refractive indices ($n_x$, $n_y$, and $n_z$) of an optically anisotropic layer prepared from a solution comprising a threefold mixture of the same host compound (H1) and guest particles of two types (G1 and G2). In this case the ratio H1/G1/G2 was equal to 0.70/0.22/0.08 and total concentration of mixture (H1+G1+G2)$C_{TOT}$ was equal to 12%. The refractive indexes $n_y$, and $n_z$ possess anomalous spectral dispersion in a subrange approximately from 500 to 625 nm of the visible spectral range.

Figure 18:
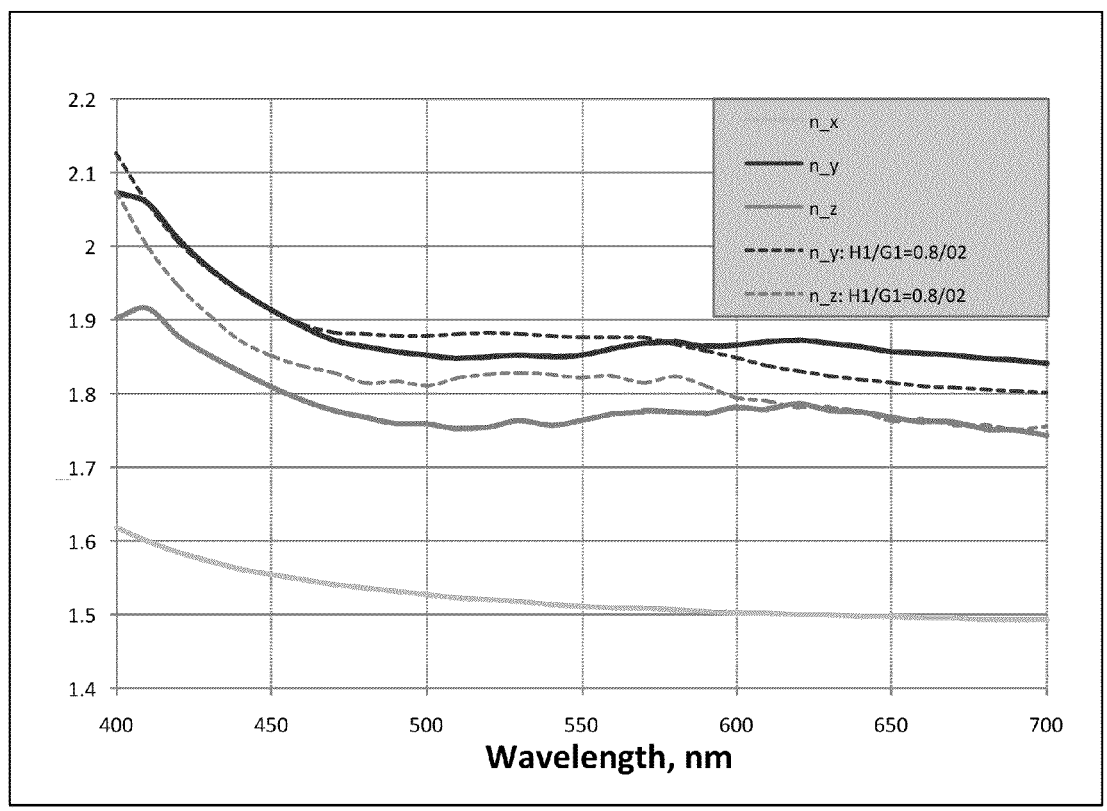
FIG. 18 shows a comparison of refractive indices ($n_x$, $n_y$, and $n_z$) of two optically anisotropic layers, wherein one of them (see, dashed line) was prepared from a solution comprising a binary mixture of host compound and guest particles and another (see, continuous line) was prepared from a solution comprising a threefold mixture of a host compound and guest particles of two types.

FIG. 18 shows a comparison of refractive indices ($n_x$, $n_y$, and $n_z$) of two optically anisotropic layers, wherein one of the layers (the dashed line in FIG. 18) was prepared from a solution comprising a binary mixture of a host compound (H1) and guest particles (G1), and another layer (the continuous line in FIG. 18) was prepared from a solution comprising a threefold mixture of a host compound (H1) and guest particles of two types (G1 and G2). For the case shown in FIG. 18 the ratio H1/G1 was equal to 0.8/0.2 and total concentration of mixture (H1+G1)$C_{TOT}$ was equal to 10%. The ratio H1/G1/G2 was equal to 0.75/0.15/0.1 and total concentration of mixture (H1+G1+G2)$C_{TOT}$ was equal to 10%.

Example 12

Figure 19:
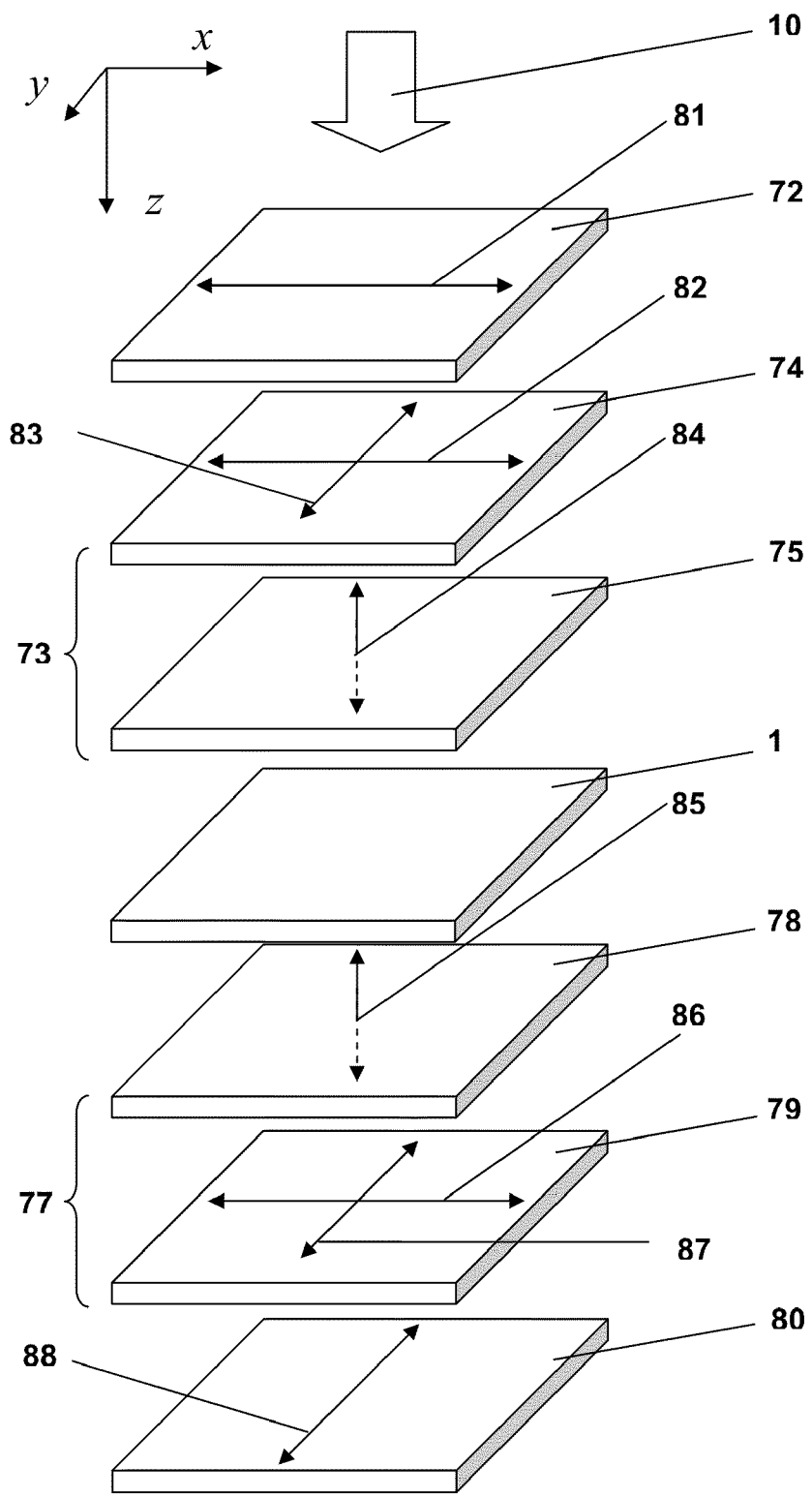
FIG. 19 is a diagram showing a construction of a liquid crystal display according to a seventh embodiment of the present invention, wherein the compensation panel is located outside the liquid crystal cell.

The example describes the color-compensated vertically-aligned mode liquid crystal display (VA LCD) according to the present invention. FIG. 19 schematically shows a light beam 10 and a color liquid crystal display according to the present invention. The liquid crystal display comprises a liquid crystal cell 1, a pair of polarizers—72 and 80, arranged on each side of the liquid crystal cell, and two compensating panels, of which the panel 73 is disposed between the liquid crystal cell and the first polarizer 72, and the panel 77 is disposed between the liquid crystal cell and the second polarizer 80, consequently. The liquid crystal cell is schematically shown in FIG. 5. The transmission axis 81 of the first polarizer is perpendicular to the transmission axis 88 of the second polarizer.

The first compensation panel 73 comprises an anisotropic layer of the first type 74 having slow 82 and fast 83 principal axes (the principal axes correspond to the principal axes of the dielectric tensor) lying substantially in the plane of said anisotropic layer 74, and an anisotropic layer of the second type 75 being a negative C-panel, for which the optical axis 84 is directed substantially perpendicularly to the plane of said anisotropic layer 75. The anisotropic layer 74 is arranged in such a way that the fast principal axis 83, corresponding to the lowest dielectric permittivity, of said anisotropic layer is perpendicular to the transmission axis 81 of the polarizer 72. The anisotropic layer 74 is a biaxial anisotropic layer of negative $A_B$-type and it is characterized by three principal refractive indices ($n_x$, $n_y$ and $n_z$). The principal directions for refractive indices $n_x$ and $n_y$ belong to xy-plane coinciding with a plane of the compensation panel, and one principal direction for refractive index ($n_z$) coincides with a normal line to the compensation panel. The refractive indices $n_x$, $n_y$, and $n_z$ obey the following condition in the visible spectral range: $n_y > n_z > n_x$. The optically anisotropic layer 75 made of triacetyl cellulose (TAC) possesses uniaxial properties of negative C-type and it is characterized by three principal refractive indices ($n_x$, $n_y$, and $n_z$).

The second compensation panel 77 comprises an anisotropic layer of the first type 79 having slow 87 and fast 86 principal axes lying substantially in the plane of said anisotropic layer 79, and an anisotropic layer of the second type 78 made of triacetyl cellulose (TAC) as a negative C-panel, for which the optical axis 85 is directed substantially perpendicularly to the plane of said anisotropic layer 78. The retardation layer of the first type 79 is arranged in such a way that the fast principal axis 86 of said anisotropic layer is perpendicular to the transmission axis 88 of the polarizer 80. The anisotropic layer 79 is of negative $A_B$-type and it is characterized by three principal refractive indices ($n_x$, $n_y$ and $n_z$). Two principal directions for refractive indices $n_x$ and $n_y$ belong to xy-plane coinciding with a plane of the compensation panel, and one principal direction for refractive index ($n_z$) coincides with a normal line to the compensation panel. The refractive indices $n_x$, $n_y$, and $n_z$ obey the following condition in the visible spectral range: $n_y > n_z > n_x$.

Figure 20:
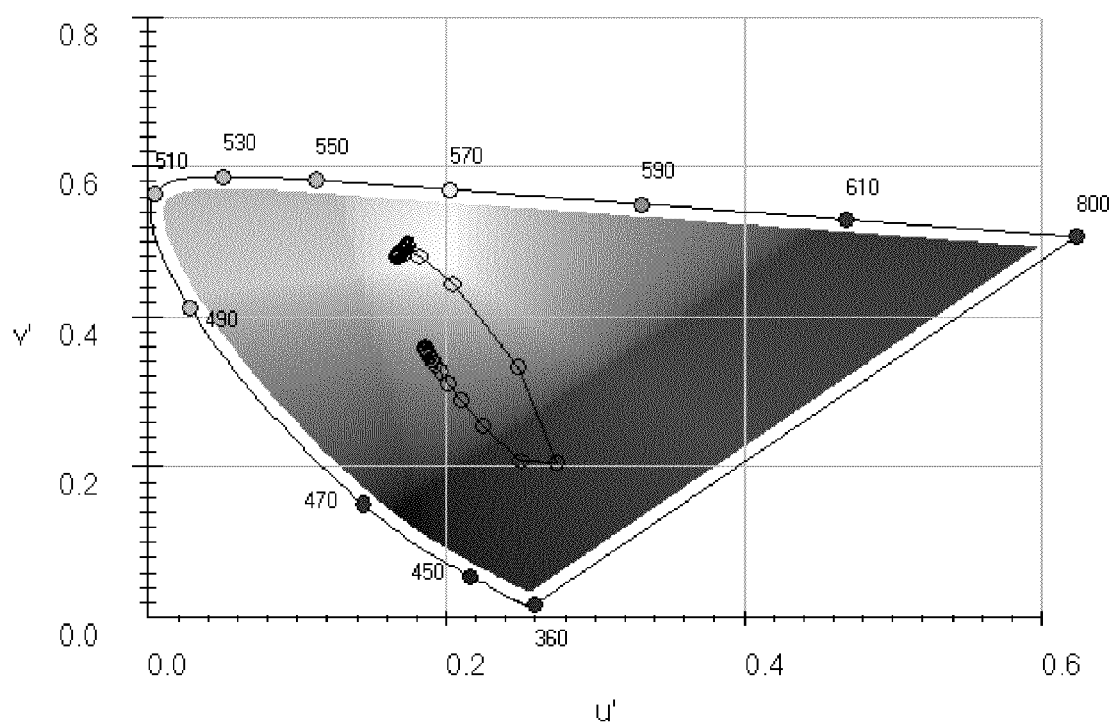
FIG. 20 shows a change of the color state of VA-LCD without dispersion compensation versus time during field-driven switching from BLACK to WHITE states.
Figure 21:
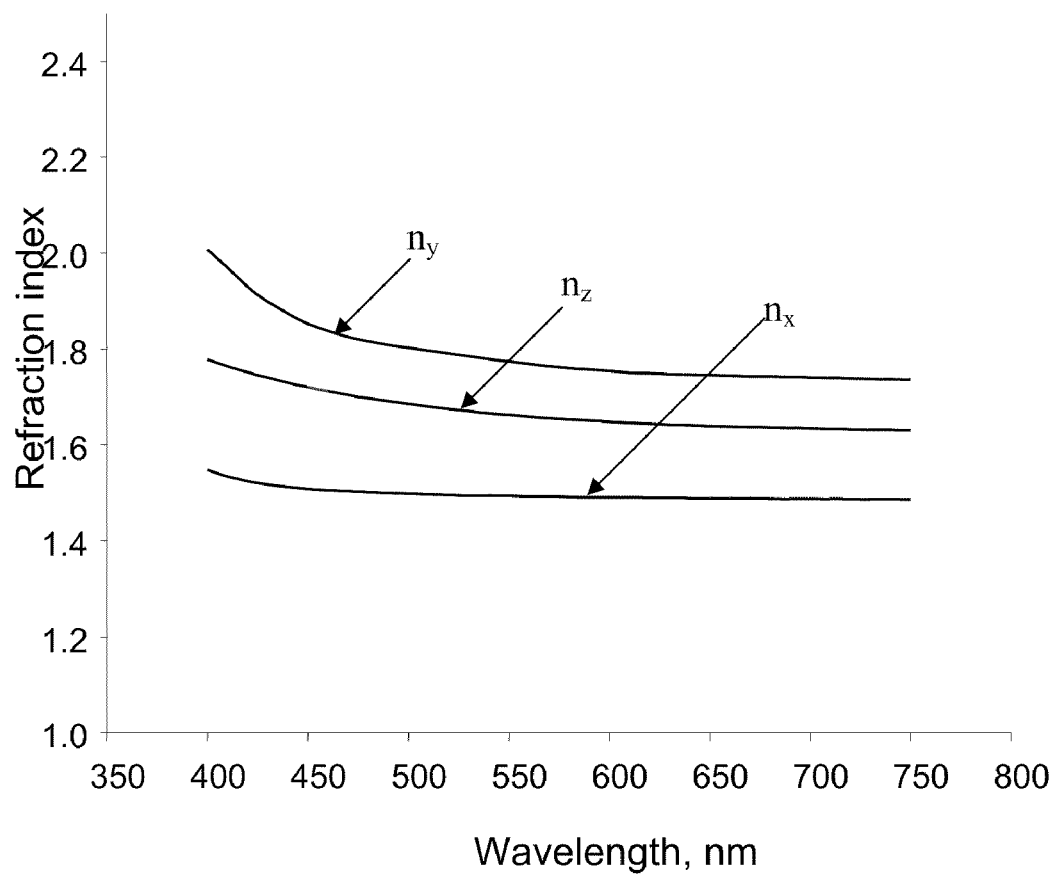
FIG. 21 shows the refractive indices $n_x$, $n_y$, and $n_z$ having normal spectral dispersion.

FIG. 20 shows a change of the color state versus time during field-driven switching from Black to White states at a viewing angle of $(\phi, \theta)=(-45°, 60°)$ when thickness of each layer 74 and 79 is equal to 350 nm, and retardation of each of TAC-layers (layers 75 and 78) is equal to 50 nm. This design provides rather high photopic $CR \cong 40$ at large viewing angles ~60°. The refractive indices $n_x$, $n_y$, and $n_z$ are shown in FIG. 21; they have normal spectral dispersion. In case of normal spectral dispersion the principal refractive indices increase with a decreasing of the wavelength. Also the in-plane difference of refractive indices $\Delta_{in}(\lambda)=|n_y(\lambda)-n_x(\lambda)|$ typically shows similar behavior. Back light source is presented by three equal spectral components at 450, 550 and 650 nm. FIG. 20 shows that the switching from Black to White states is accompanied by a significant change of the color state.

Figure 22:
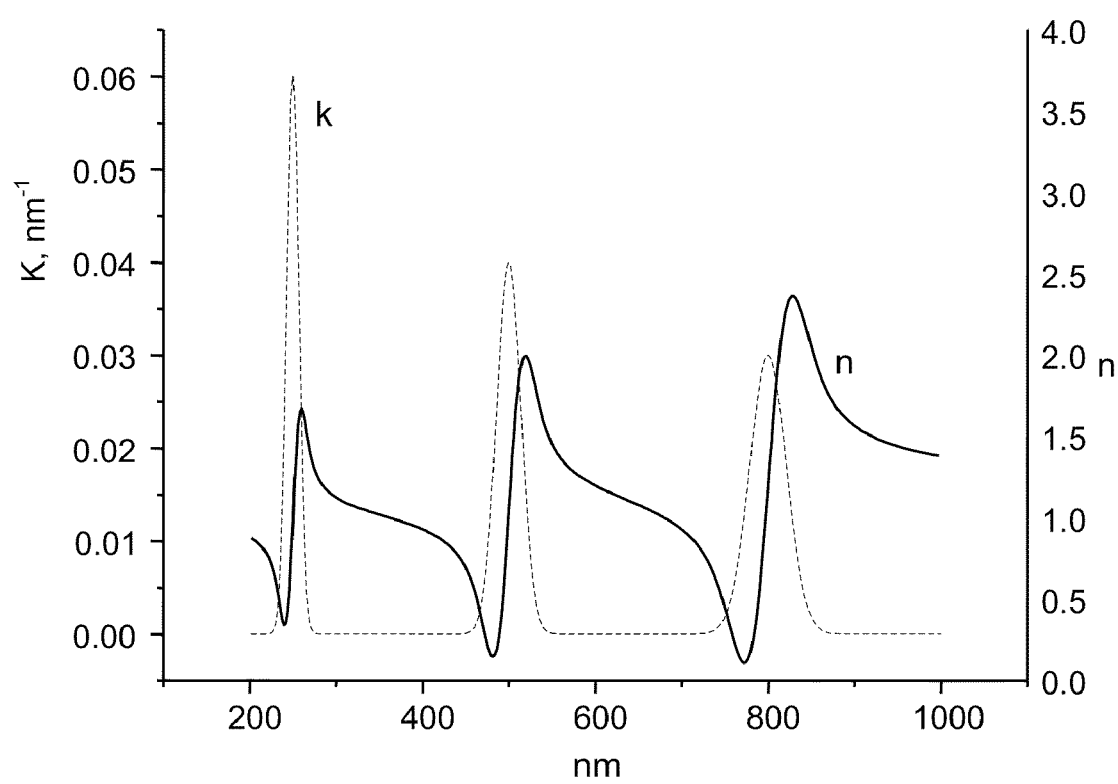
FIG. 22 illustrates the mechanism of formation of an anomalous dispersion.
Figure 23:
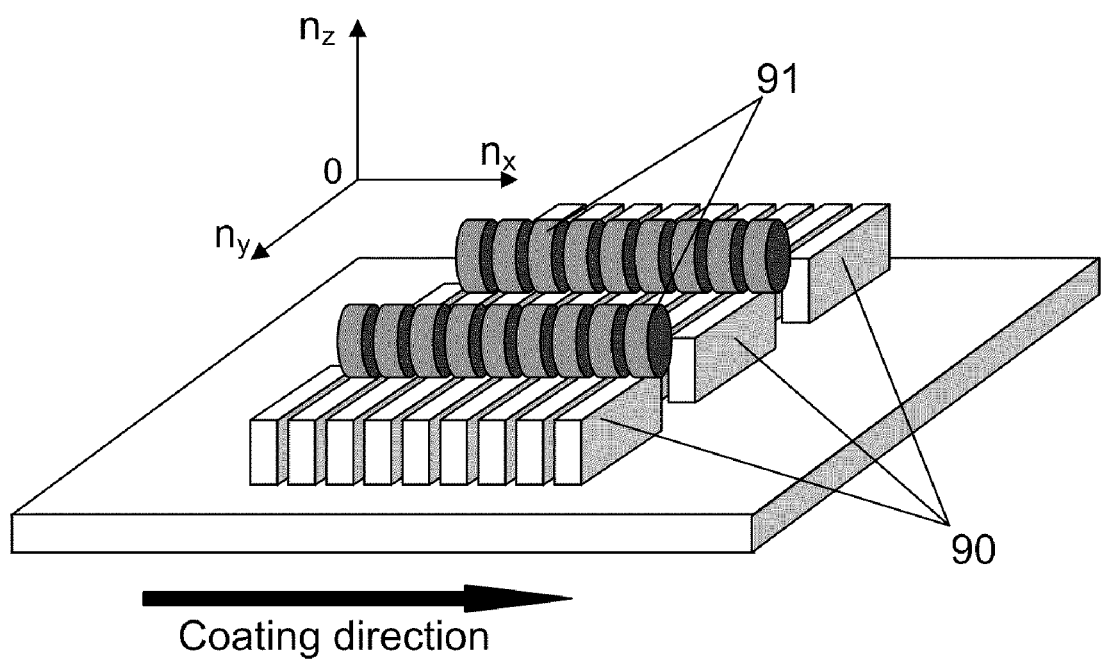
FIG. 23 schematically shows the mixture is capable to form a guest-host system according to the present invention.
Figure 24:
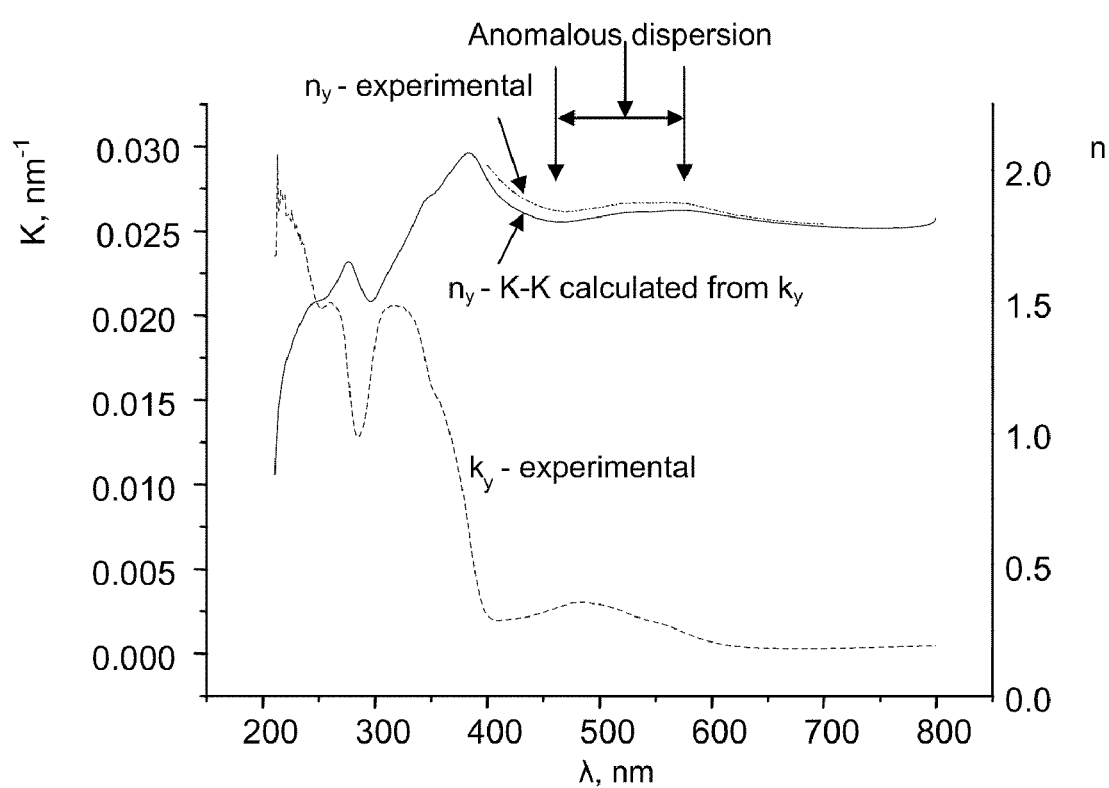
FIG. 24 shows the principal refractive index $n_y$ possessing anomalous spectral dispersion ($\partial n_y(\lambda)/\partial \lambda \geqq 0$) in the subrange from 450 nm to 575 nm.
Figure 25:
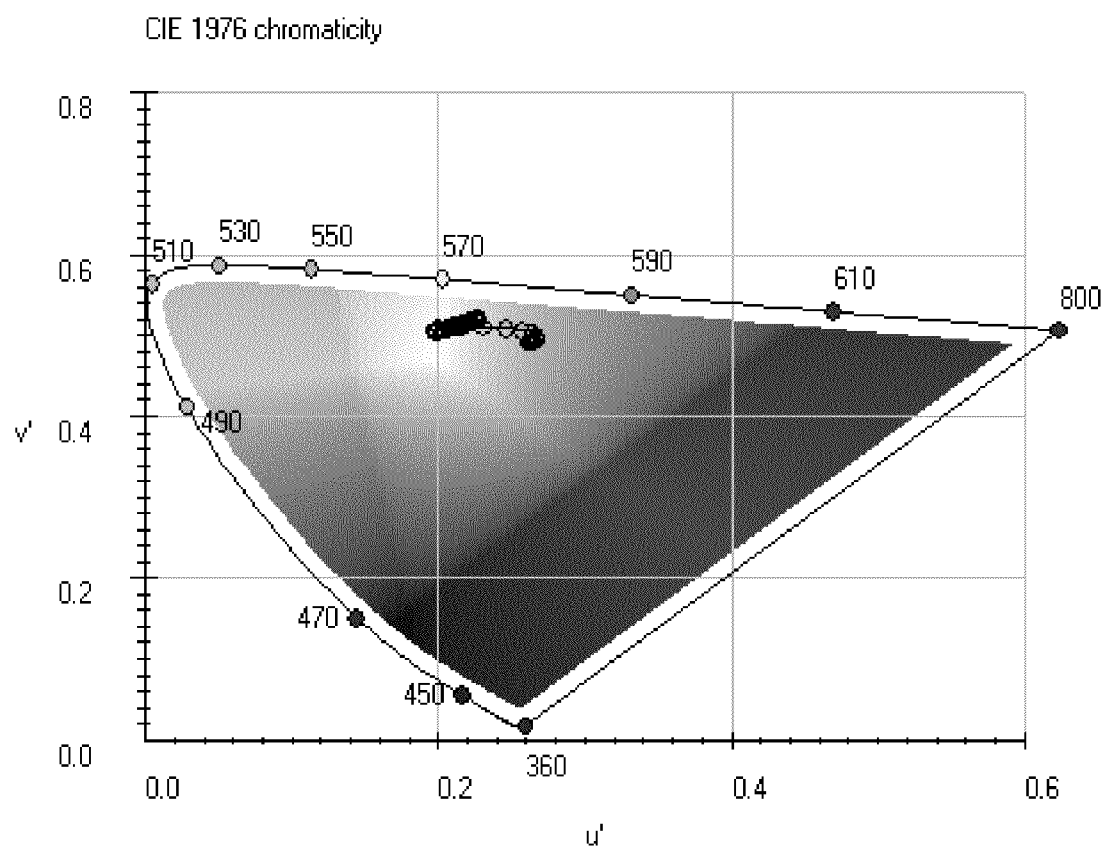
FIG. 25 shows a change of the color state of VA-LCD with dispersion compensation versus time during field-driven switching from BLACK to WHITE states.

In order to solve the color state problem the spectral dispersion of the principal refractive indices must be corrected. It is known that the refraction is a consequence of absorption. Every absorption band makes a contribution to a value of refraction coefficient. In a spectral band of the absorption one can get an anomalous dispersion in case when the refraction coefficient increases with increasing the wavelength as shown in FIG. 22. The spectral dispersion is controlled by choosing the optimal spectral dependence of absorption. In this example the optically anisotropic layers are formed from a solution comprising a binary mixture of 1,1':4',1":4",1'"-quaterphenyl, disulfonic acid (the first organic compound) and (bisbenzimidazo[1,2-c:2',1'-i]benzo[lmn]-3,8-phenanthroline-6,9-dione, disulfonic acid (the second organic compound). Said mixture is capable to form a guest-host system as shown in FIG. 23. The first organic compound is capable to form a host matrix 90 of the guest-host system. The stacks comprised of the molecules of the second organic compound 91 serve as a guest, capable to align together with stacks of host-molecules of the host matrix. Thus, the second compound as a guest provides an additional absorption spectrum for at least one principal direction of the anisotropic host matrix in at least one subrange. FIG. 24 shows the principal refractive index $n_y$ possessing an anomalous spectral dispersion $(\partial n_y(\lambda)/\partial \lambda \geq 0)$ in the subrange from 450 nm to 575 nm. The continuous curve shown in FIG. 24 is the refractive index calculated from an experimental absorption spectrum $k_y$ using Kramers-Kronig (K-K) relation. Deviation from the experimental measurements of the refractive indices can be explained with the fact that for the calculations the experimental data for absorption below 200 nm cannot be measured. Correction of a refractive index spectral dispersion allows significant suppressing variations of the color state during LC switching as shown in FIG. 25.

Example 13

Figure 26A:
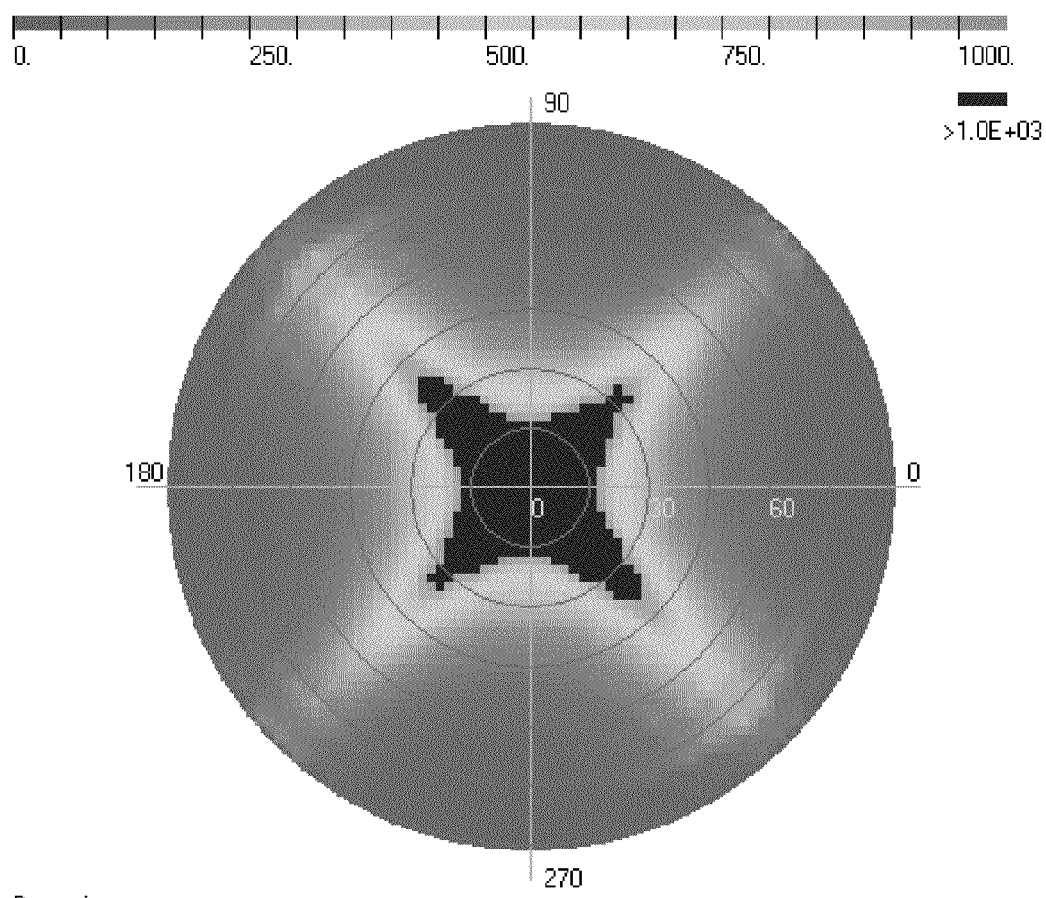
FIGS. 26a-26c show computer simulated viewing angle contrast-ratio map for IPS LCD design without dispersion compensation for three wavelength: $\lambda$=450 nm—FIG. 26 (a), $\lambda$=550 nm—FIG. 26 (b), $\lambda$=630 nm—FIG. 26 (c).
Figure 26B:
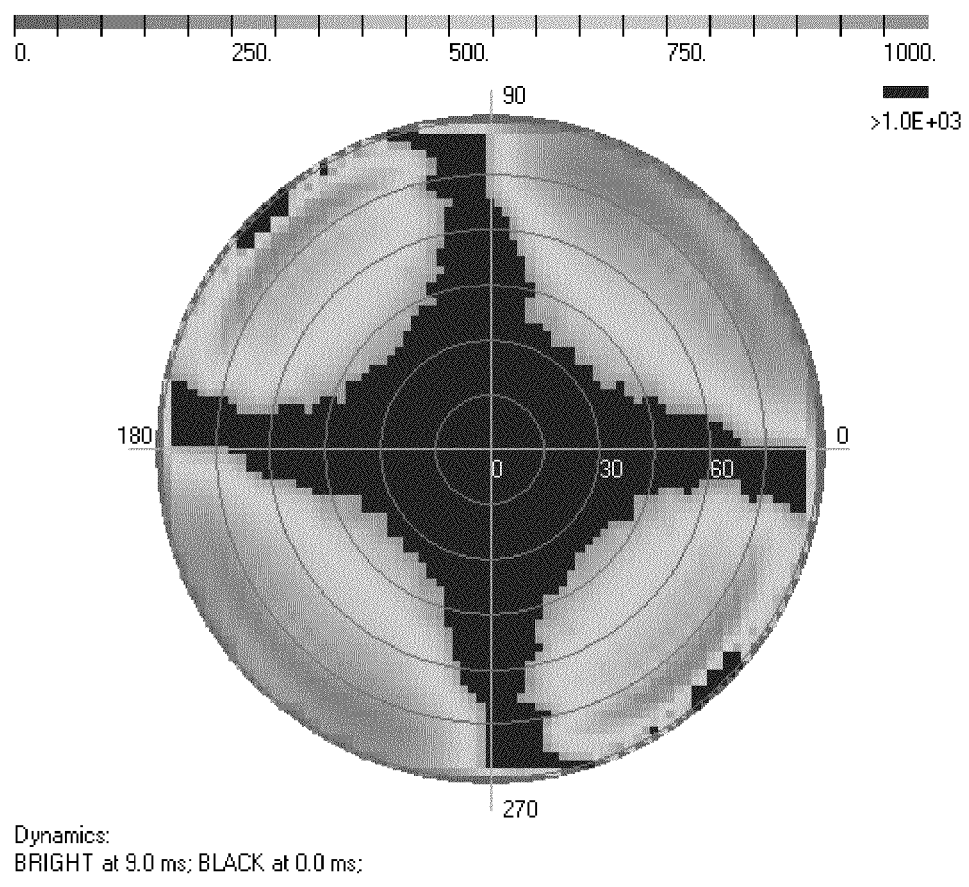
Figure 26C:
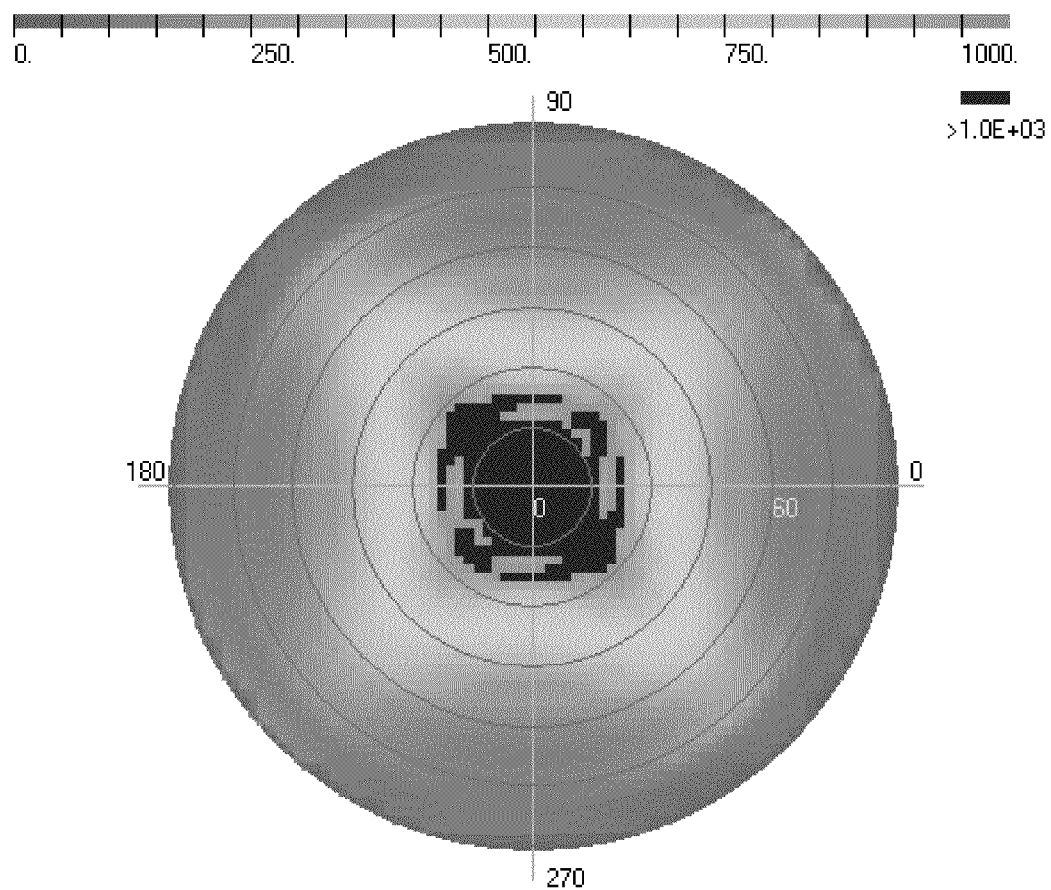

The example describes the color-compensated in-plane switching liquid crystal display (IPS LCD) according to the present invention. The display has the following design—$P_{45}$ $LC_{-45}$ $A_{B-45}$ $P_{-45}$, wherein $P_{45}$ is a polarizer with the transmission axis at 45°; $LC_{-45}$ is a planar LC layer aligned with the director at −45°; $A_{B-45}$ is a negative biaxial $A_B$-panel with the fast axis at −45°; $P_{-45}$ is a polarizer with the transmission axis at −45°. The performance of this optimized IPS LCD design without dispersion compensation is illustrated in FIGS. 26(a)-(c). Figures show computer simulated dependencies for three wavelength: $\lambda$=450 nm (a), $\lambda$=550 nm (b), $\lambda$=630 nm (c).

Figure 27:
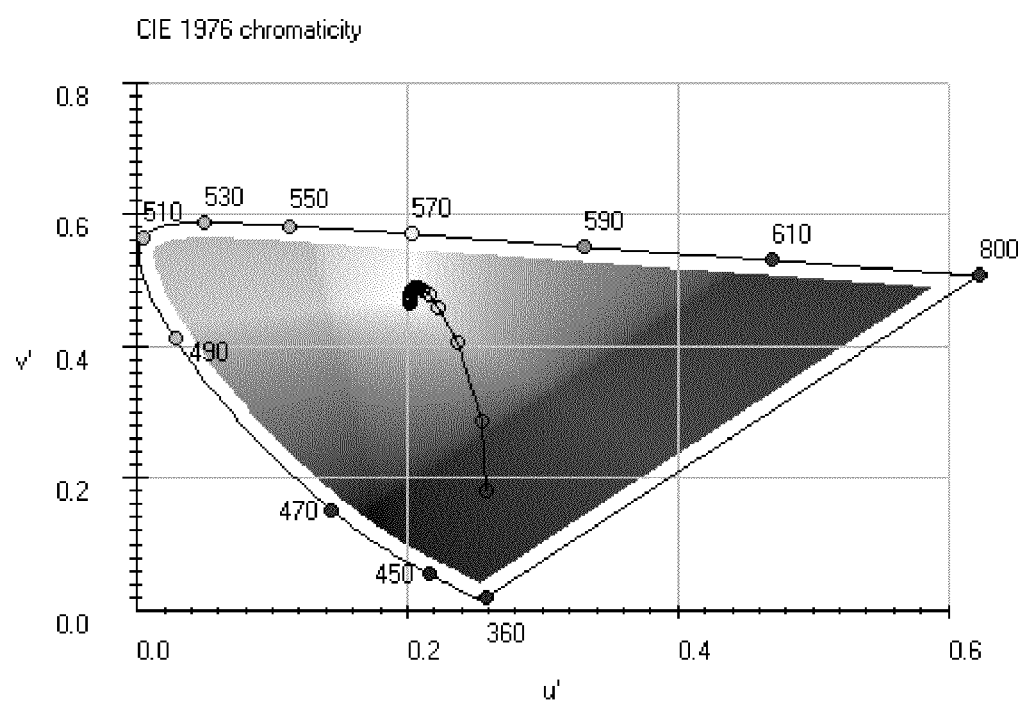
FIG. 27 shows a change of the color state of IPS-LCD without dispersion compensation versus time during field-driven switching from BLACK to WHITE states.
Figure 28A:
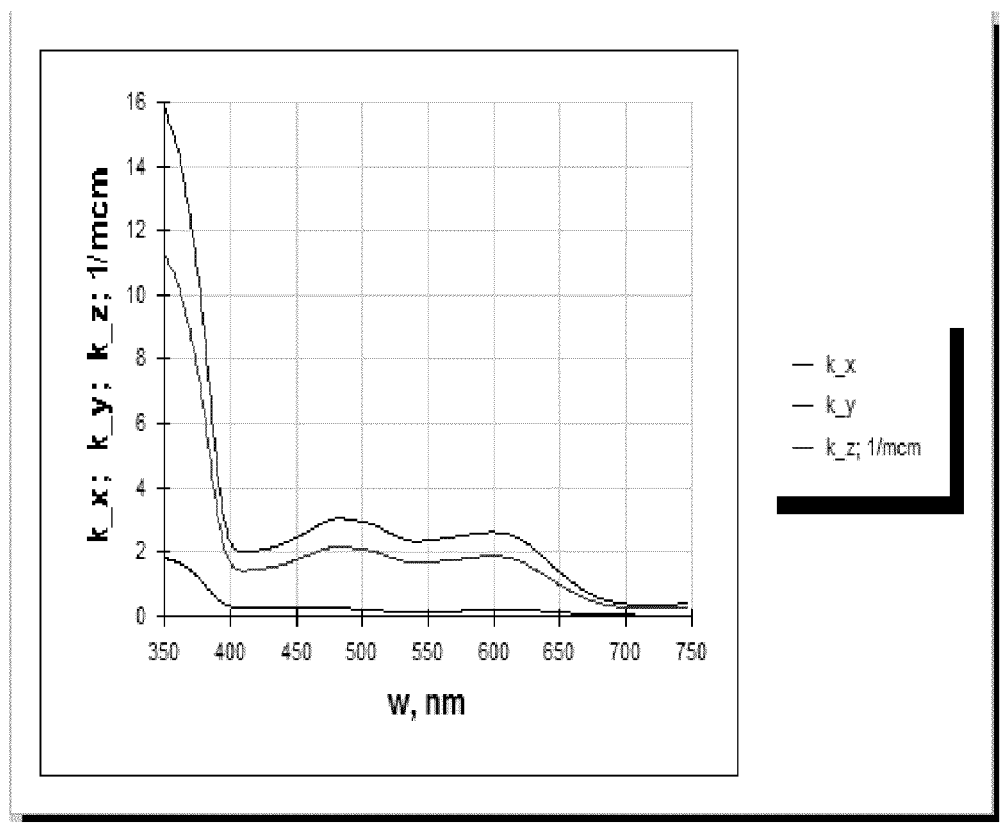
FIG. 28 shows the spectral absorption (FIG. 28a) and spectral refractive indices (FIG. 28b) of modified $A_B$ panel.
Figure 28B:
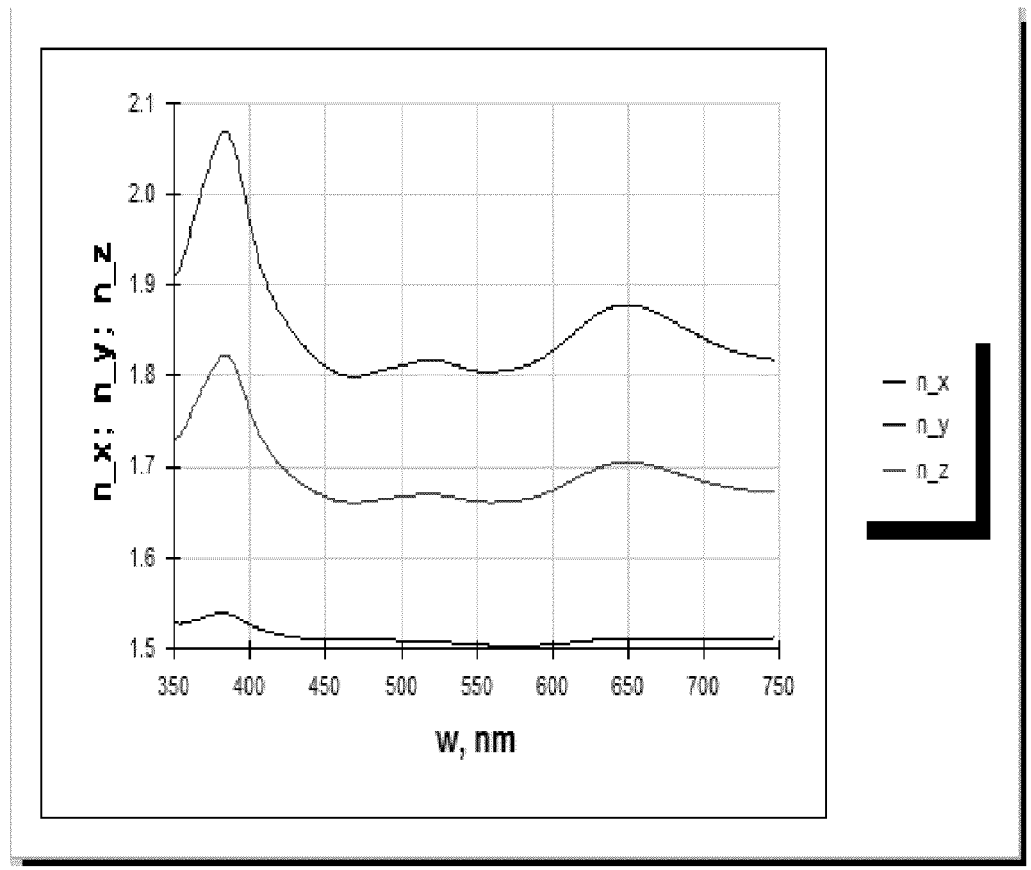

FIG. 27 shows a change of the color state versus time during field-driven switching from Black to White states in this case. The refractive indices $n_x$, $n_y$, and $n_z$ are shown in FIG. 21 and have normal spectral dispersion. FIG. 27 illustrates that luminance ratio at 60 deg viewing angle may be good (approximately equal to 325), however at low levels of output intensities the change in color is significant: Du'v'=0.29. In order to modify the spectral dispersion it is necessary to make the AB-panel with partial absorption along the y-direction. FIG. 28(a) shows the spectral absorption, and FIG. 28(b) shows the spectral refractive indices of a modified $A_B$-panel.

Figure 29A:
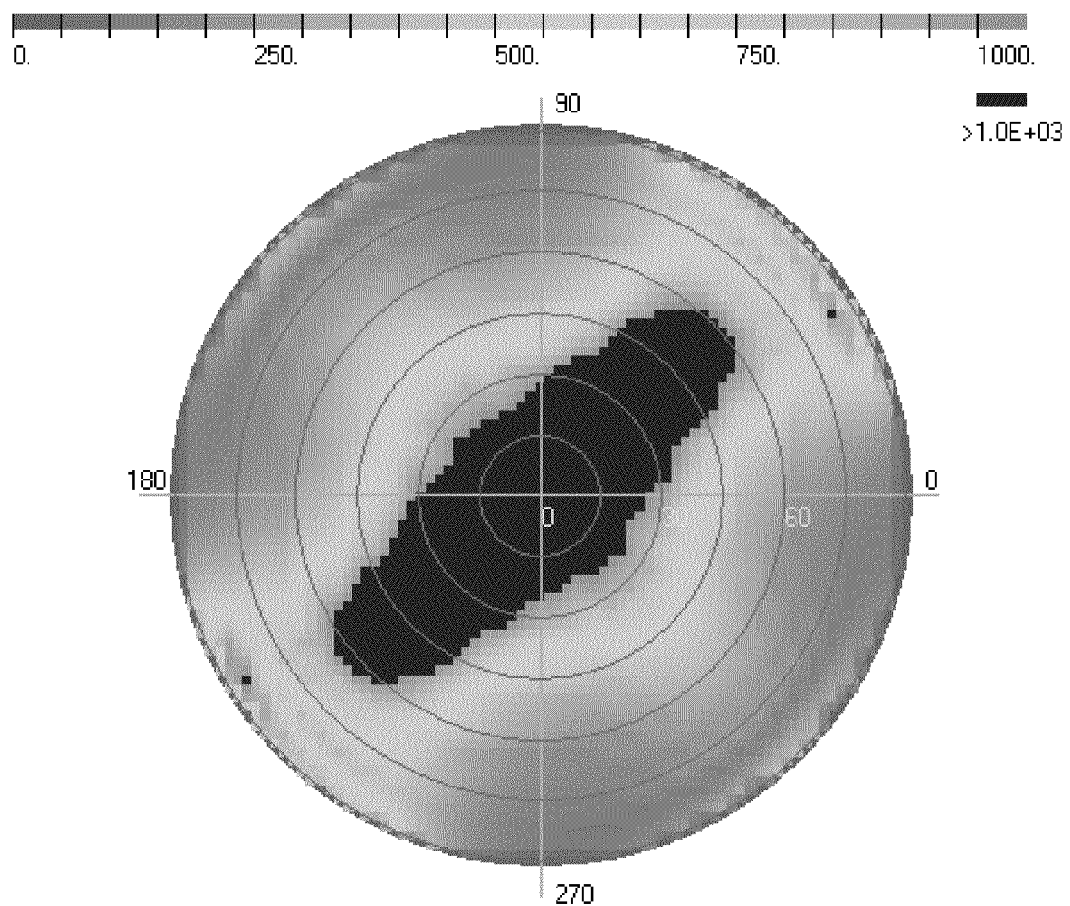
FIG. 29 shows a computer simulated viewing angle contrast-ratio map of color-compensated IPS LCD design for three wavelengths: $\lambda$=450 nm—FIG. 29 (a), $\lambda$=550 nm—FIG. 29 (b), $\lambda$=630 nm—FIG. 29 (c).
Figure 29B:
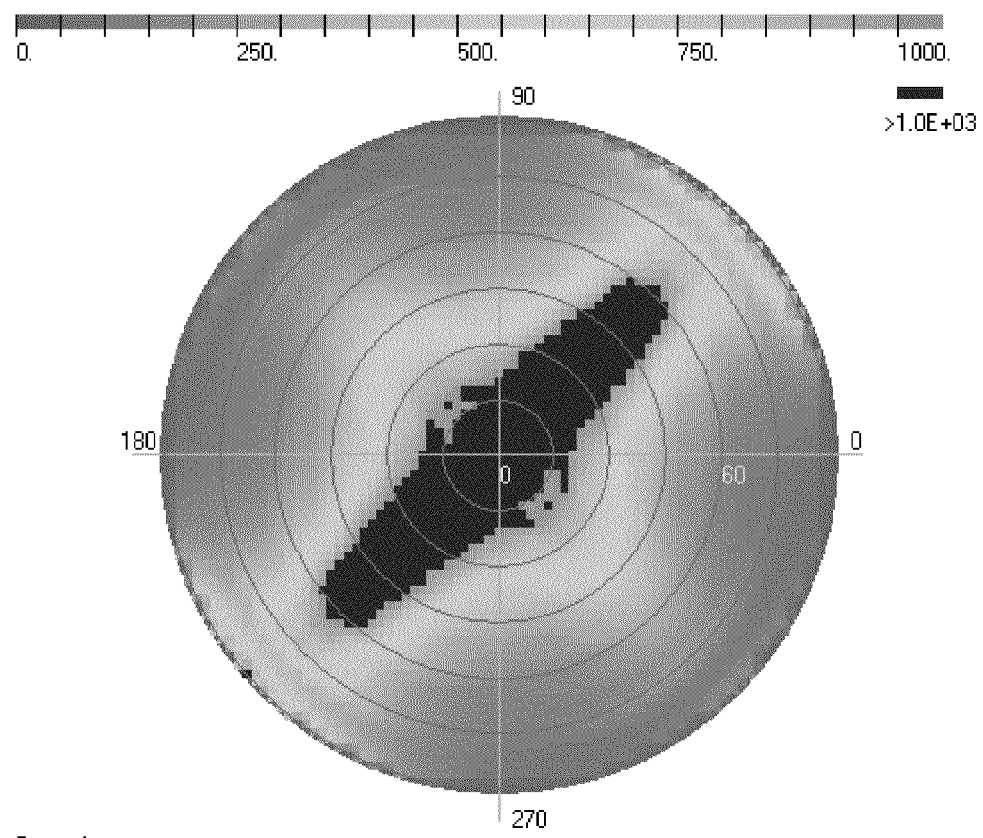
Figure 29C:
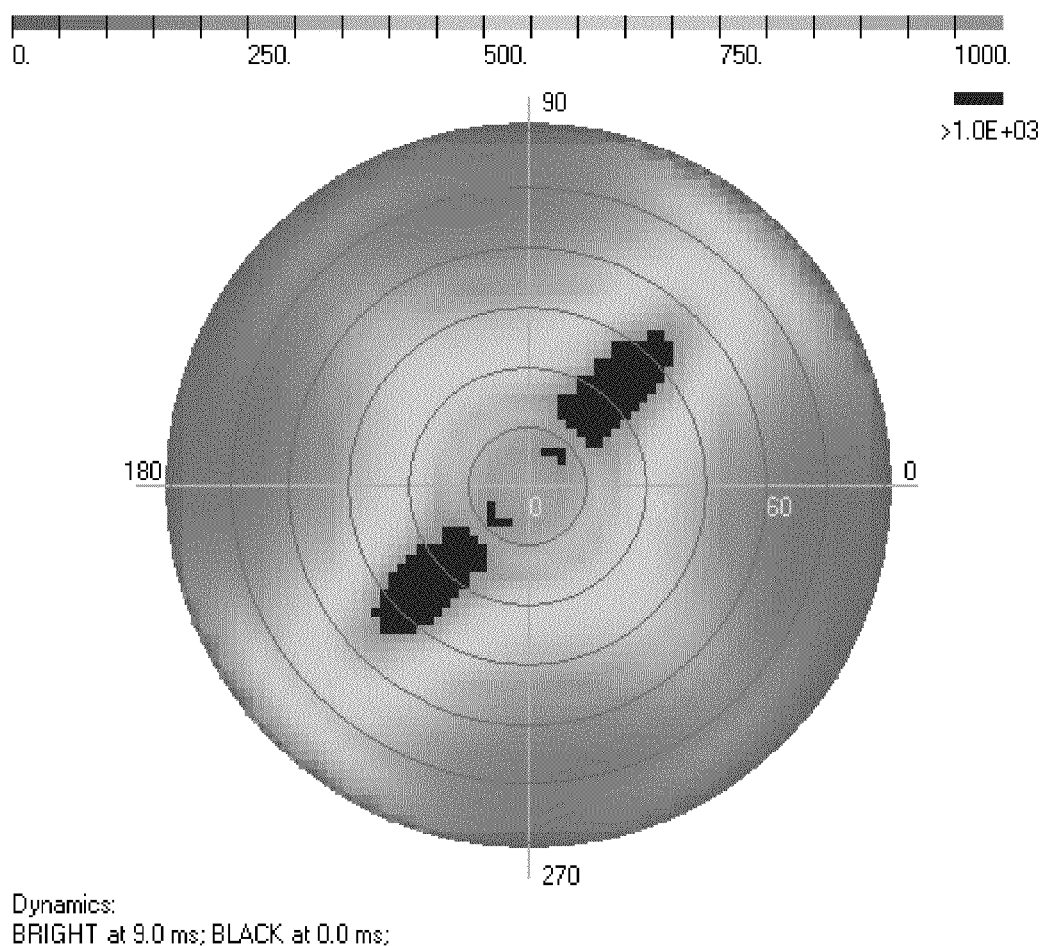

FIGS. 29(a)-(c) show that dispersion is significantly compensated. FIG. 29 shows computer simulated dependencies of color-compensated IPS LCD design for three wavelengths: $\lambda$=450 nm (a), $\lambda$=550 nm (b), $\lambda$=630 nm (c).

Figure 30:
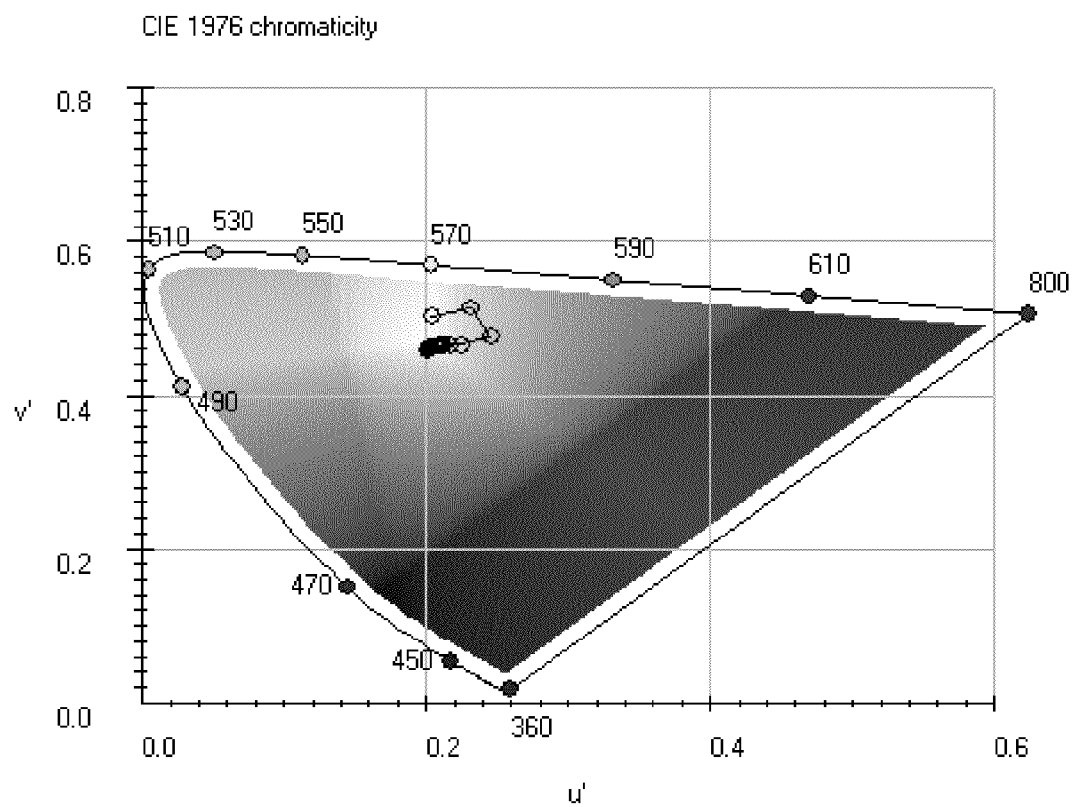
FIG. 30 shows a change of the color state of IPS-LCD with dispersion compensation versus time during field-driven switching from BLACK to WHITE states.

Correction of a refractive index spectral dispersion allows significant suppressing variations of the color state during LC switching as shown in FIG. 30. Luminance ratio at 60 deg viewing angle may be good (approximately equal to 420), and even at low levels of output intensities the variation in color is small: Du'v'=0.06. For this embodiment of the liquid crystal design the thickness of the experimental $A_B$-panel was 0.7 microns and the absorption coefficient $k_y \sim 2$ mm$^{-1}$ results in significant absorption (T~15%) along the y-axis at normal incidence. However, in this design this absorption axis coincides with the absorption axis of the output polarizer. Thus the resultant absorption was basically defined by $k_x$, which is small and provides transmission of approximately 90%. Even at large incidence angles ~60° the transmission remains at level higher than 70%.

What is claimed is:

1. An optically anisotropic compensation panel comprising at least one optically anisotropic layer based on an ordered guest-host system comprising
an anisotropic host matrix, and
a guest component comprising guest particles,
wherein the anisotropic host matrix comprises an organic compound transparent to electromagnetic radiation in the visible spectral range,
the guest particles provide an absorption additional to an absorption of the anisotropic host matrix, and
said additional absorption is realized in at least one principal direction of the anisotropic host matrix in at least one subrange of the wavelength range from approximately 250 to 2500 nm;
wherein the organic compound for the host matrix has a general structural formula I

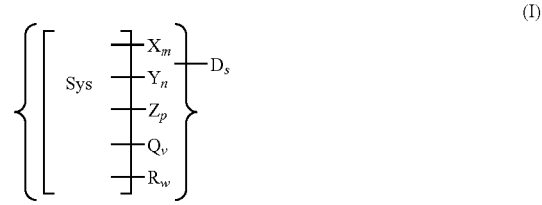

where Sys is an at least partially conjugated substantially planar polycyclic molecular system, X is a carboxylic group —COOH, m is 0, 1, 2, 3 or 4; Y is a sulfonic group —SO$_3$H, n is 0, 1, 2, 3 or 4; Z is a carboxamide, p is 0, 1, 2, 3 or 4; Q is a sulfonamide, v is 0, 1, 2, 3 or 4; D is a counterion; s is the number of counterions providing electrically neutral state of the molecule; R is a substituent selected from the list comprising CH$_3$, C$_2$H$_5$, Cl, Br, NO$_2$, F, CF$_3$, CN, OH, CH$_3$, OC$_2$H$_5$, OCOCH$_3$, OCN, SCN, NH$_2$, and NHCOCH$_3$, and w is 0, 1, 2, 3 or 4; and wherein the compensation panel possesses a spectrally controllable dispersion of refractive indices.

2. An optically anisotropic compensation panel according to claim 1, wherein the optically anisotropic layer is characterized by three principal refractive indices ($n_x$, $n_y$ and $n_z$), at least one of which satisfies the following condition where $\partial n_u(\lambda)/\partial \lambda \geqq 0$ in at least one subrange of the visible spectral range, and wherein the subscript u is selected from the list comprising x, y and z.

3. An optically anisotropic compensation panel according to claim 1, wherein the optically anisotropic layer possesses biaxial properties of $B_A$-type and is characterized by an in-plane difference of refractive indices $\Delta_{in}(\lambda)=|n_y(\lambda)-n_x(\lambda)|$, which satisfies the condition $\partial \Delta_{in}(\lambda)/\partial \lambda \geqq 0$ in at least one subrange of the visible spectral range.

4. An optically anisotropic compensation panel according to claim 3, wherein the optically anisotropic layer is further characterized by an out-of-plane difference of refractive indices $\Delta_{out}(\lambda)=|n_z(\lambda)-n_x(\lambda)|$ which satisfies the condition $\partial \Delta_{out}(\lambda)/\partial \lambda \geqq 0$ in at least one wavelength subrange of the visible spectral range.

5. An optically anisotropic compensation panel according to claim 1, wherein the optically anisotropic layer possesses biaxial properties of $B_A$-type and is characterized by an out-of-plane difference of refractive indices $\Delta_{out}(\lambda)=|n_z(\lambda)-n_x(\lambda)|$ which satisfies the condition $\partial \Delta_{out}(\lambda)/\partial \lambda \geqq 0$ in at least one wavelength subrange of the visible spectral range.

6. An optically anisotropic compensation panel according to claim 1, wherein the optically anisotropic layer possesses uniaxial properties of negative A-type and is characterized by an in-plane difference of refractive indices $\Delta_{in}(\lambda)=|n_y(\lambda)-n_x(\lambda)|$ which satisfies the condition $\partial \Delta_{in}(\lambda)/\partial \lambda \geqq 0$ in at least one wavelength subrange of the visible spectral range.

7. An optically anisotropic compensation panel according to claim 1, wherein the optically anisotropic layer possesses uniaxial properties of positive A-type and is characterized by an in-plane difference of refractive indices $\Delta_{in}(\lambda)=|n_y(\lambda)-n_x(\lambda)|$ which satisfies the condition $\partial \Delta_{in}(\lambda)/\partial \lambda \geqq 0$ in at least one wavelength subrange of the visible spectral range.

8. An optically anisotropic compensation panel according to claim 1, wherein the optically anisotropic layer possesses biaxial properties of $A_C$-type and is characterized by an in-plane difference of refractive indices $\Delta_{in}(\lambda)=|n_y(\lambda)-n_x(\lambda)|$ which satisfies the condition $\partial \Delta_{in}(\lambda)/\partial \lambda \geqq 0$ in at least one wavelength subrange of the visible spectral range.

9. An optically anisotropic compensation panel according to claim 8, wherein the optically anisotropic layer is further characterized by an out-of-plane difference of refractive indices $\Delta_{out}(\lambda)=|n_x(\lambda)-n_z(\lambda)|$ which satisfies the condition $\partial\Delta_{out}(\lambda)/\partial\lambda \geqq 0$ in at least one wavelength subrange of the visible spectral range.

10. An optically anisotropic compensation panel according to claim 1, wherein the optically anisotropic layer possesses biaxial properties of $A_C$-type and is characterized by an out-of-plane difference of refractive indices $\Delta_{out}(\lambda)=|n_x(\lambda)-n_z(\lambda)|$ which satisfies the condition $\partial\Delta_{out}(\lambda)/\partial\lambda \geqq 0$ in at least one wavelength subrange of the visible spectral range.

11. An optically anisotropic compensation panel according to claim 1, wherein the optically anisotropic layer possesses uniaxial properties of negative C-type and is characterized by an out-of-plane difference of refractive indices $\Delta_{out}(\lambda)=|n_x(\lambda)-n_z(\lambda)|$ which satisfies the condition $\partial\Delta_{out}(\lambda)/\partial\lambda \geqq 0$ in at least one wavelength subrange of the visible spectral range.

12. An optically anisotropic compensation panel according to claim 1, wherein the optically anisotropic layer possesses uniaxial properties of positive C-type and is characterized by an out-of-plane difference of refractive indices $\Delta_{out}(\lambda)=|n_z(\lambda)-n_x(\lambda)|$ which satisfies the condition $\partial\Delta_{out}(\lambda)/\partial\lambda \geqq 0$ in at least one wavelength subrange of the visible spectral range.

13. An optically anisotropic compensation panel according to any of claims 3 to 4 or 6 to 9, wherein the in-plane difference of refractive indices $\Delta_{in}(\lambda)$ obeys the following condition: spectral dispersion factors $(\Delta_{in,450}/\Delta_{in,550})$ and $(\Delta_{in,550}/\Delta_{in,650})$ are in a range of 0.4-1.0, wherein $\Delta_{in,450}$, $\Delta_{in,550}$ and $\Delta_{in,650}$ are values of the in-plain differences of refractive indices at wavelengths of 450 nm, 550 nm and 650 nm respectively.

14. An optically anisotropic compensation panel according to any of claims 4 to 5 or 9 to 12, wherein the out-of-plane difference of refractive indices $\Delta_{out}(\lambda)$ obeys the following condition: spectral dispersion factors $(\Delta_{out,450}/\Delta_{out,550})$ and $(\Delta_{out,550}/\Delta_{out,650})$ are in a range of 0.4-1.0, wherein $\Delta_{out,450}$, $\Delta_{out,550}$ and $\Delta_{out,650}$ are values of the out-of-plane differences of refractive indices $\Delta_{out}(\lambda)$ at wavelengths of 450 nm, 550 nm and 650 nm respectively.

15. An optically anisotropic compensation panel according to claim 1, wherein polycyclic molecular system Sys is substantially transparent in the visible spectral range.

16. An optically anisotropic compensation panel according to claim 1, wherein Sys has a general structural formula from the list comprising structures II to XLVI:

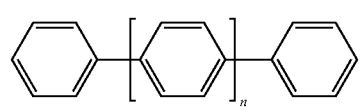
(II)

where n is a number in the range from 1 to 8

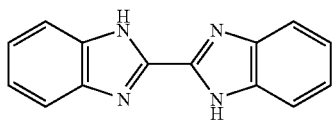
(III)

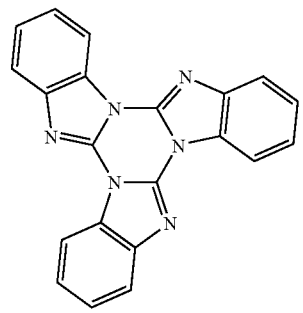
(IV)

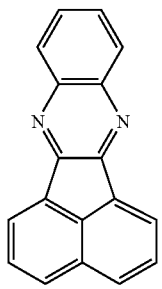
(V)

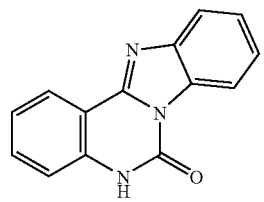
(VI)

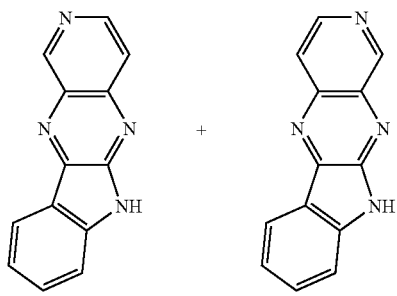
(VII)

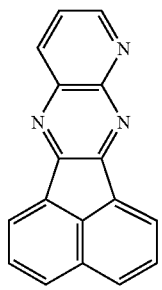
(VIII)

-continued
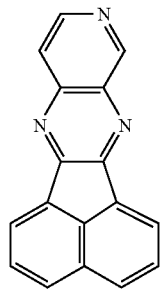
(IX)
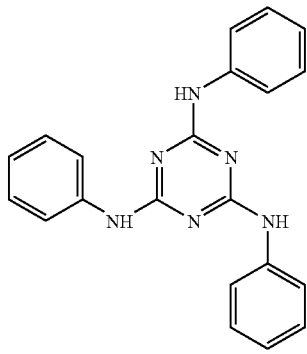
(X)
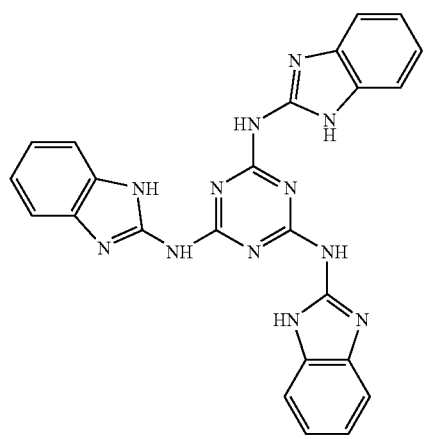
(XI)
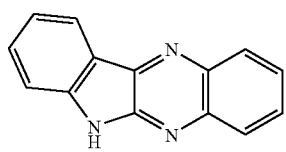
(XII)
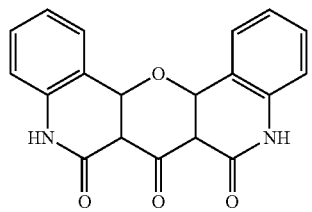
(XIII)
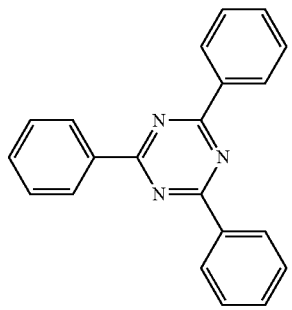
(XIV)
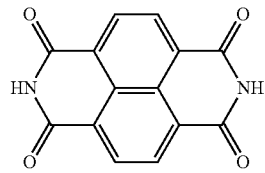
(XV)
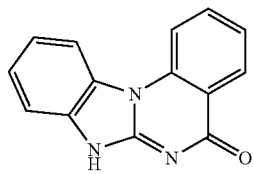
(XVI)
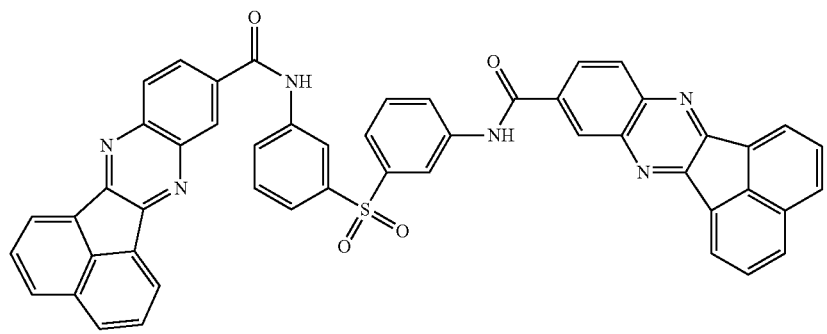
(XVII)

-continued
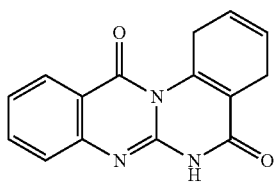
(XVIII)
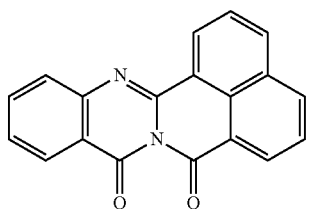
(XIX)
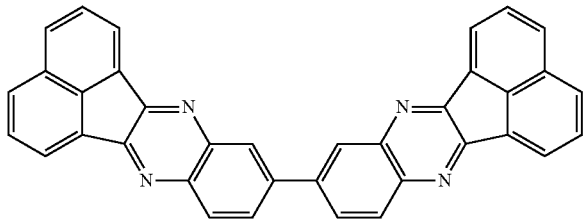
(XX)
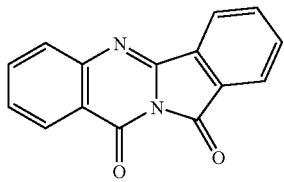
(XXI)
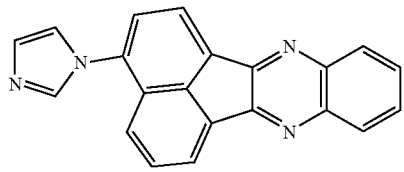
(XXII)
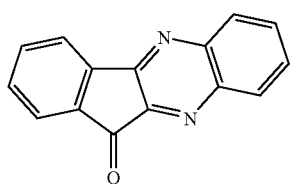
(XXIII)
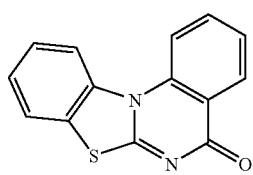
(XXIV)
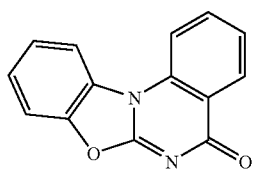
(XXV)
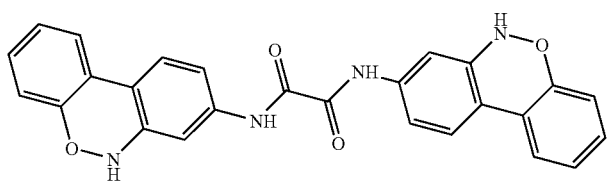
(XXVI)
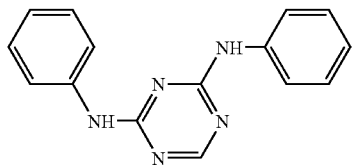
(XXVII)
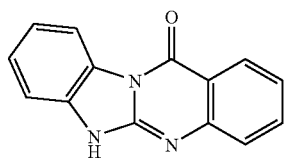
(XXVIII)

-continued
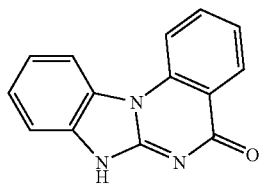
(XXIX)
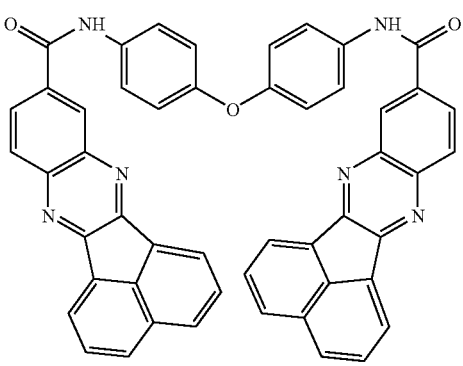
(XXX)
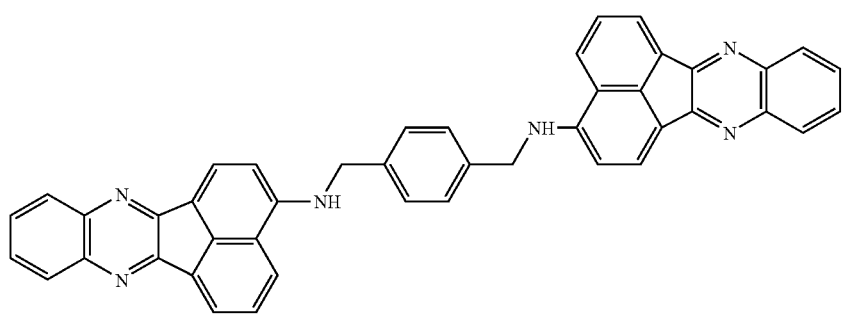
(XXXI)
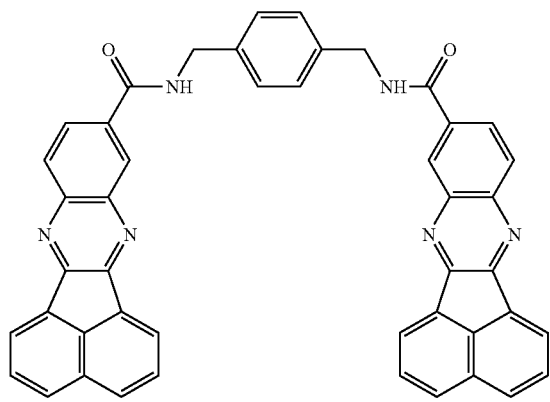
(XXXII)
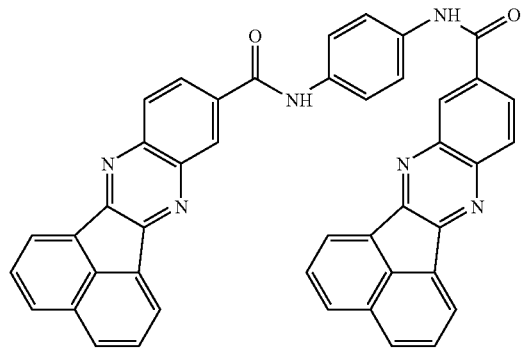
(XXXIII)

-continued
(XXXIV)
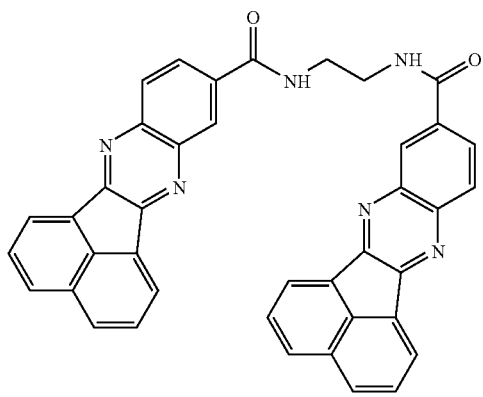
(XXXV)
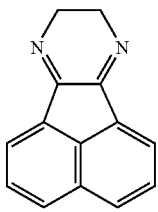
(XXXVI)
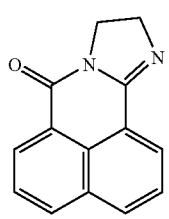
(XXXVII)
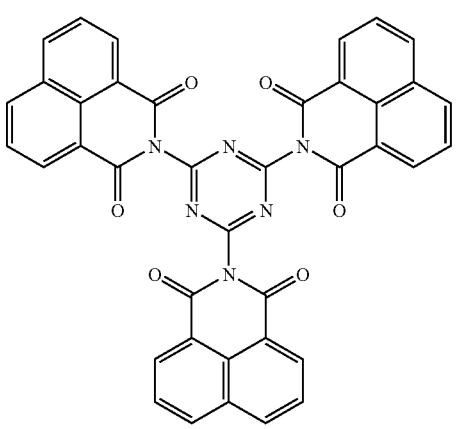
(XXXVIII)
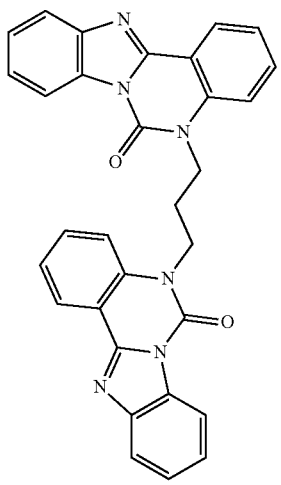
(XXXIX)
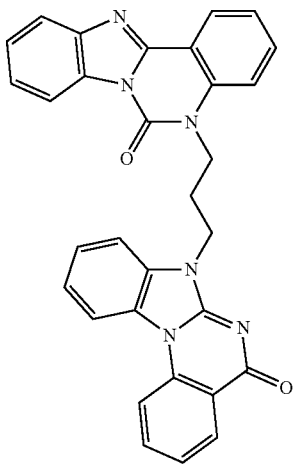
(XL)
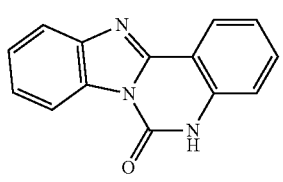
(XLI)
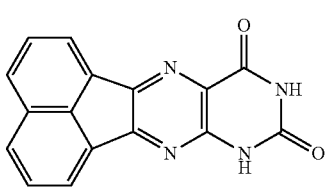

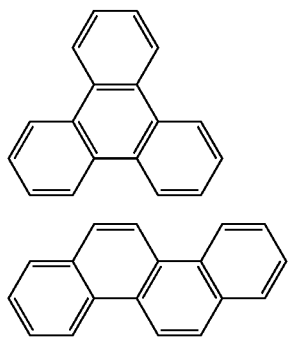
(XLII)

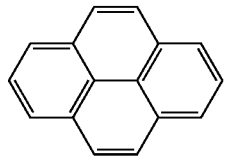
(XLIII)

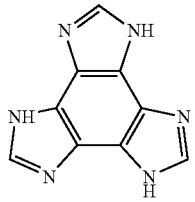
(XLIV)

(XLV)

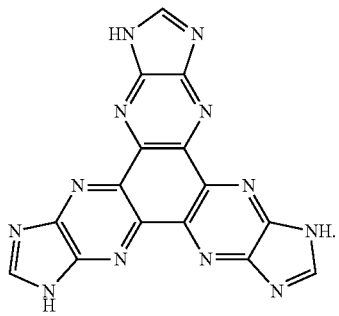
(XLVI)

17. An optically anisotropic compensation panel according to claim 1, wherein the counterion is selected from the list comprising $H^+$, $NH_4^+$, $Na^+$, $K^+$, $Li^+$, $Ba^{++}$, $Ca^{++}$, $Mg^{++}$, $Sr^{++}$, $Cs^+$, $Pb^{++}$, and $Zn^{++}$.

18. An optically anisotropic compensation panel according to claim 1, wherein the organic compound is an oligophenyl derivative.

19. An optically anisotropic compensation panel according to claim 18, wherein the oligophenyl derivative has a general structural formula corresponding to one of structures 1 to 7:

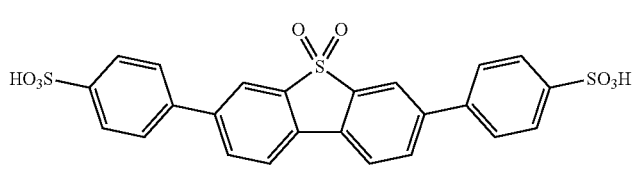
(1)

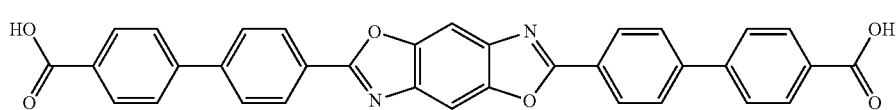
(2)

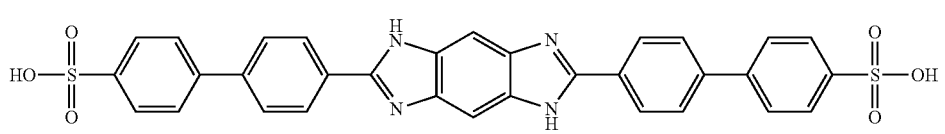
(3)

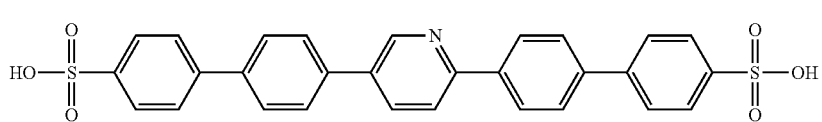
(4)

(5)
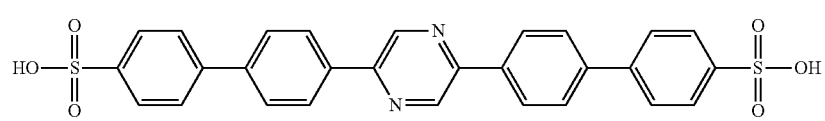
(6)
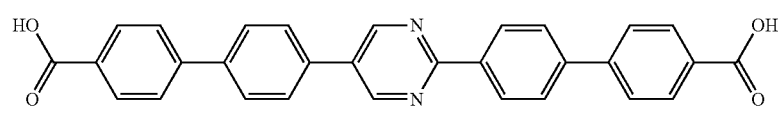
(7)
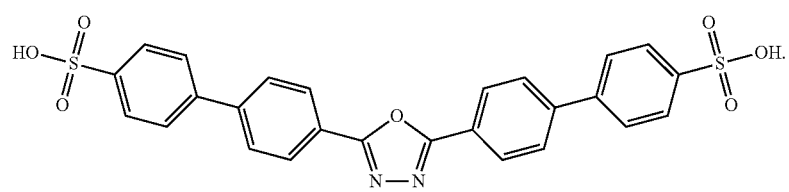
20. An optically anisotropic compensation panel according to claim 1, wherein the organic compound is selected from the list comprising derivatives of 1H,1'H-2,2'-bibenzimidazole, derivatives of 2,2'-bi-1,3-benzoxazole, and derivatives of 2,2'-bi-1,3-benzothiazole and has a general structural formula corresponding to one of structures 8 to 26:
(8)
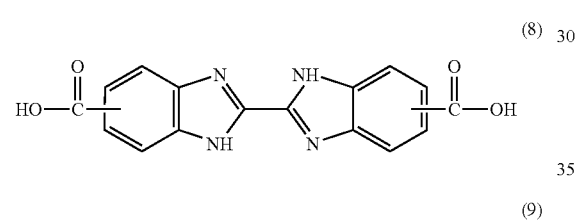
(9)
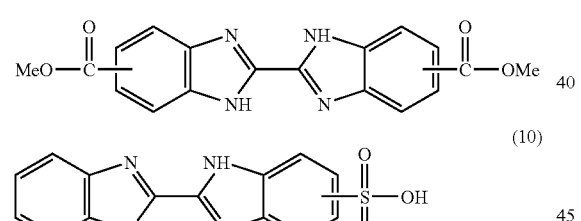
(10)
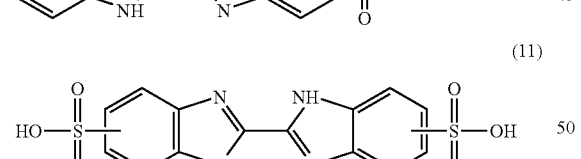
(11)
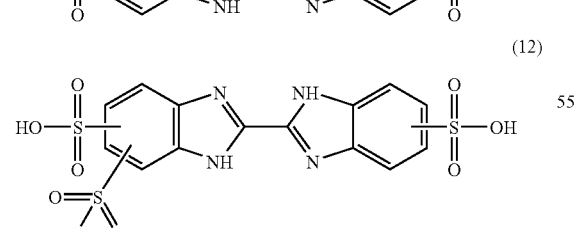
(12)
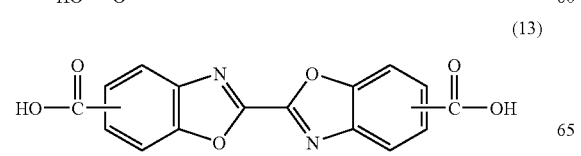
(13)

-continued
(14)
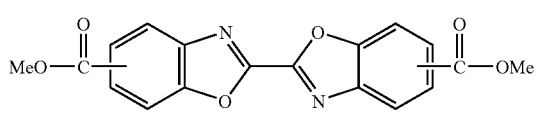
(15)
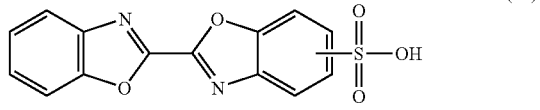
(16)
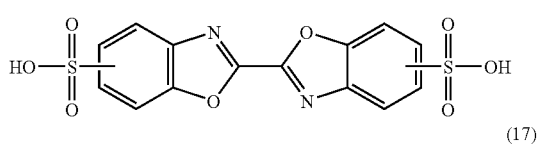
(17)
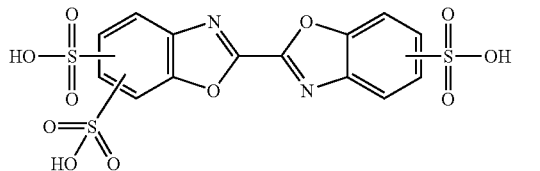
(18)
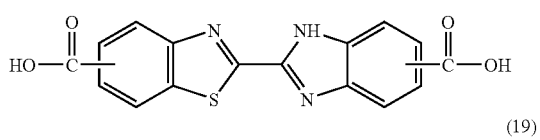
(19)
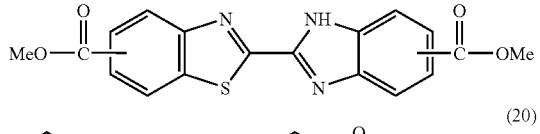
(20)
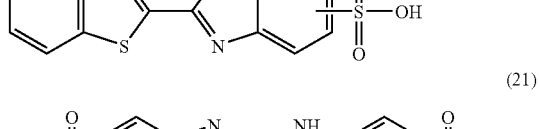
(21)

(22)
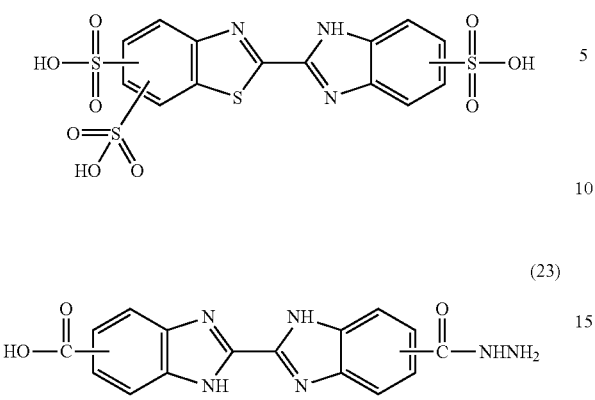

(23)

(24)

(25)

(26)

21. An optically anisotropic compensation panel according to claim 1, wherein the organic compound is a "triazine" derivative and has a general structural formula corresponding to one of structures 27 to 29:

(27)
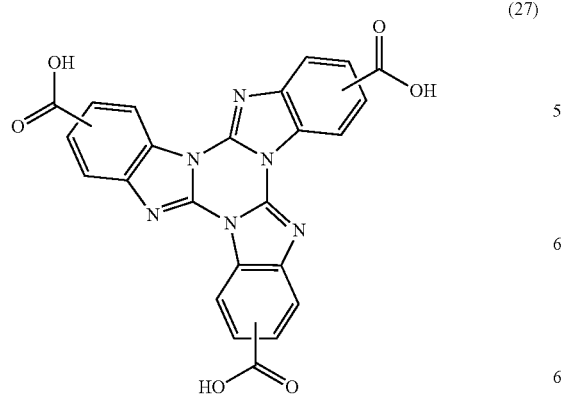

(28)
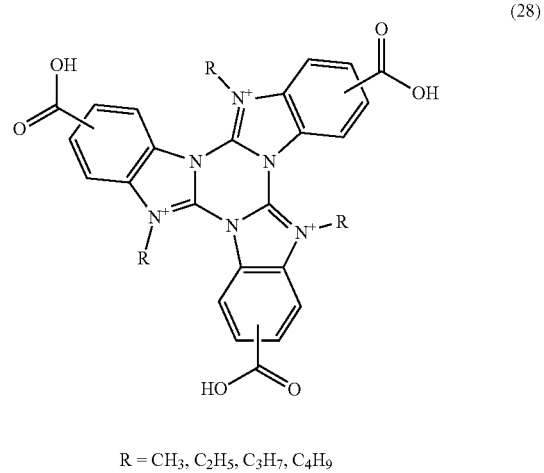

R = CH₃, C₂H₅, C₃H₇, C₄H₉

(29)
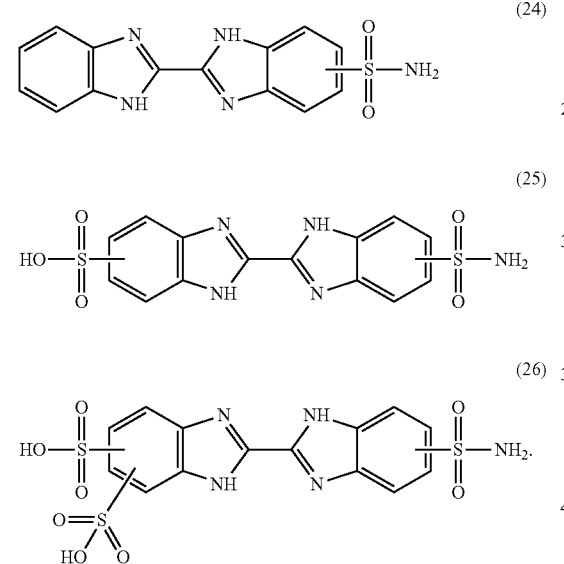

22. An optically anisotropic compensation panel according to claim 1, wherein the organic compound is an acenaphthoquinoxaline derivative.

23. An optically anisotropic compensation panel according to claim 22, wherein the acenaphthoquinoxaline derivative comprises carboxylic and/or sulfonic groups and has a general structural formula corresponding to one of structures 30 to 48:

(30)
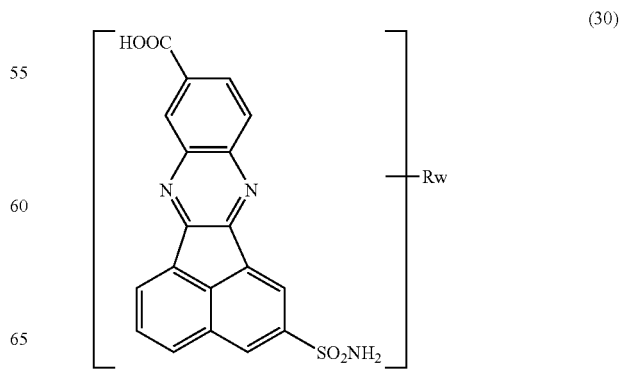

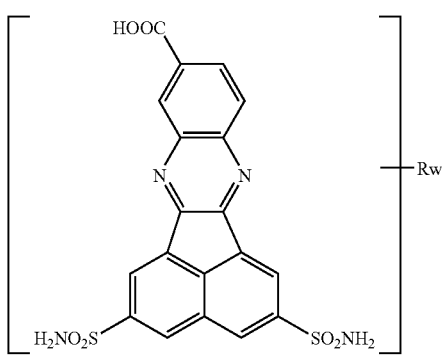
(31)
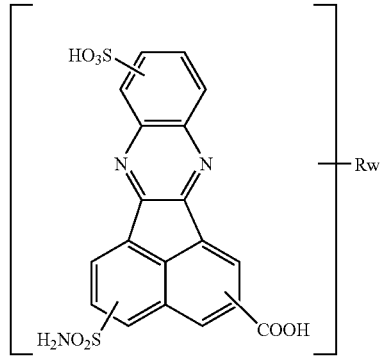
(35)
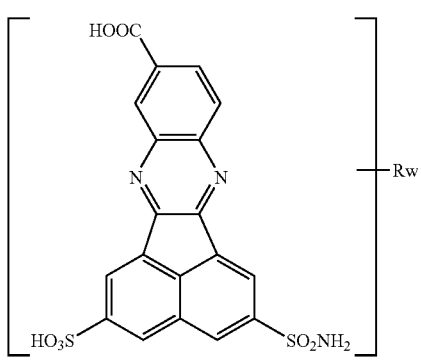
(32)
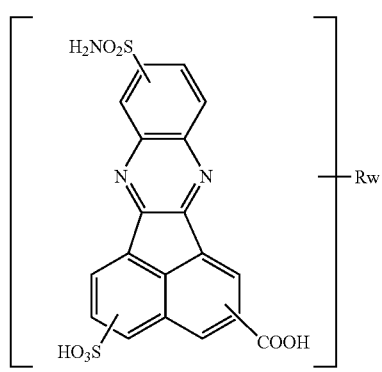
(36)
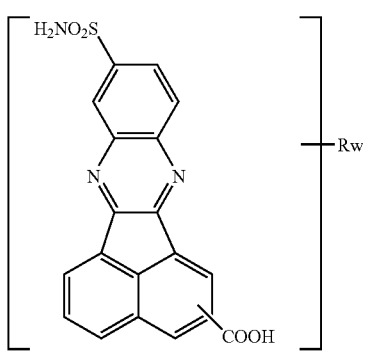
(33)
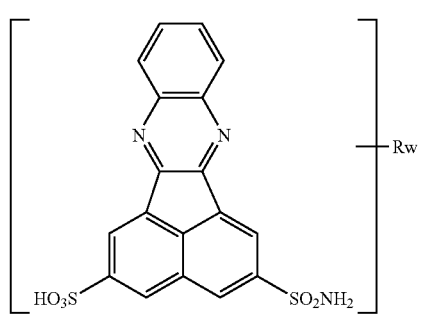
(37)
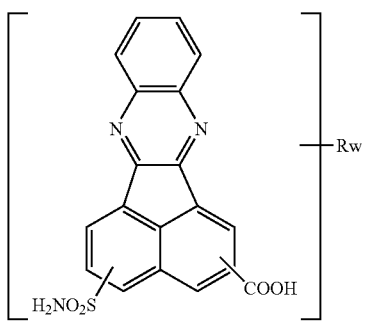
(34)
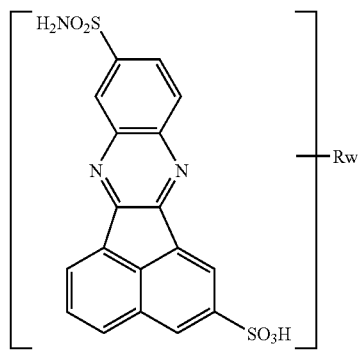
(38)

(39) 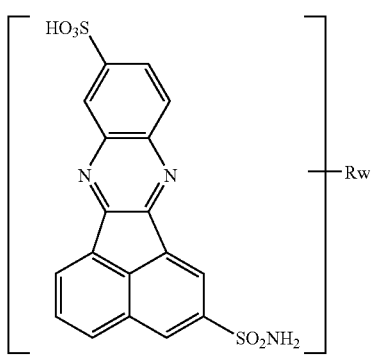
(40) 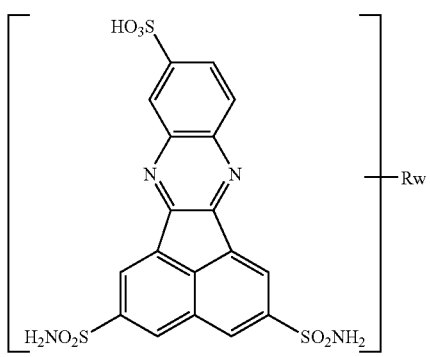
(41) 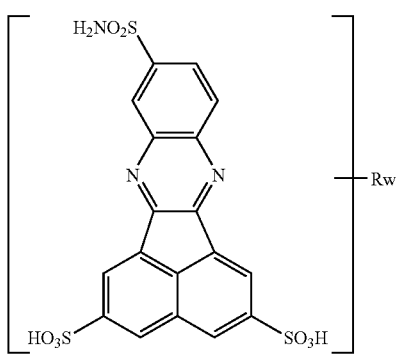
(42) 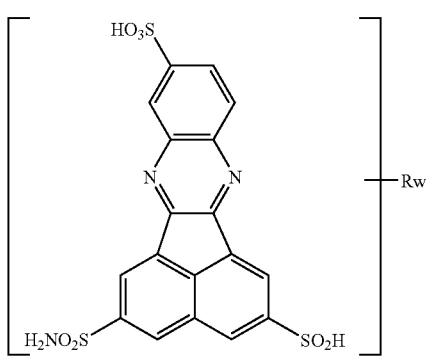
(43) 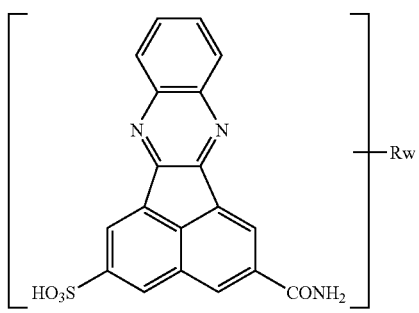
(44) 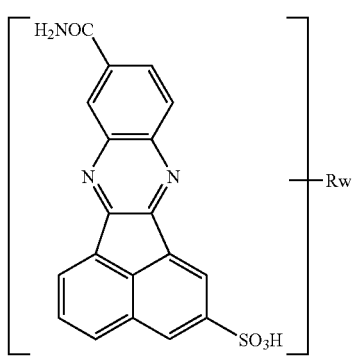
(45) 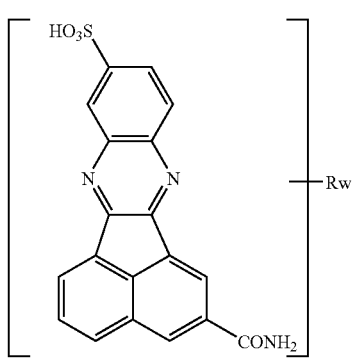
(46) 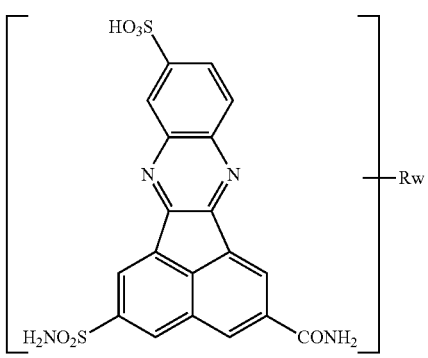

(47)
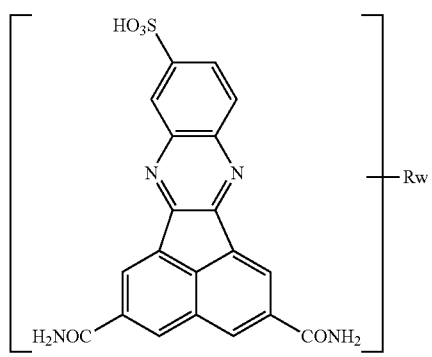

(48)
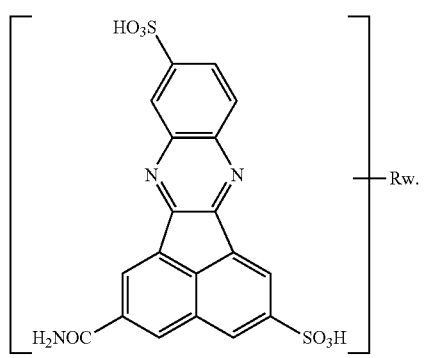

24. An optically anisotropic compensation panel according to claim 1, wherein the organic compound is a 6,7-dihydrobenzimidazo[1,2-c]quinazolin-6-one derivative.

25. An optically anisotropic compensation panel according to claim 24, wherein the 6,7-dihydrobenzimidazo[1,2-c]quinazolin-6-one derivative comprises carboxylic and/or sulfonic groups and said derivative has a general structural formula from the group comprising structures 49 to 70:

(49)
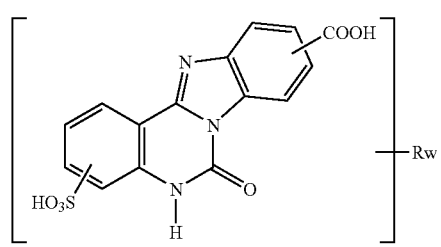

(50)
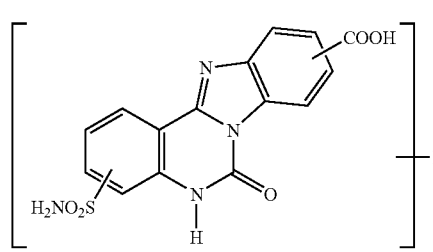

(51)
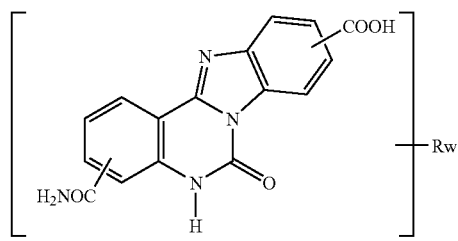

(52)
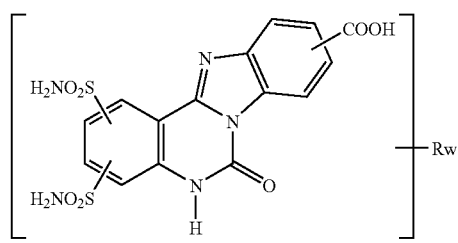

(53)
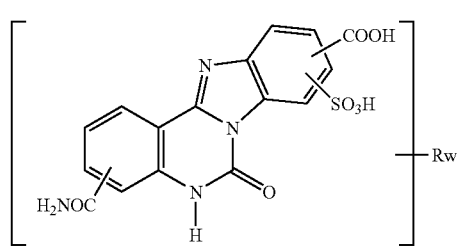

(54)
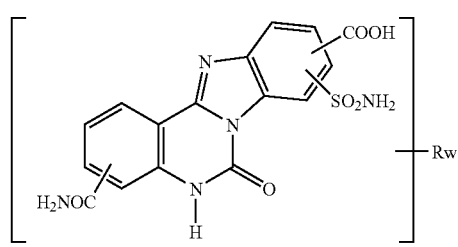

(55)
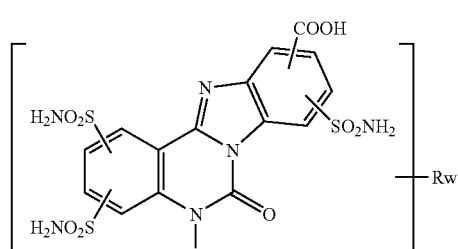

(56)
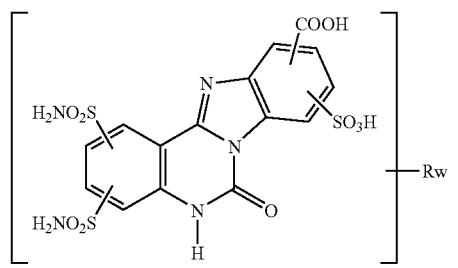

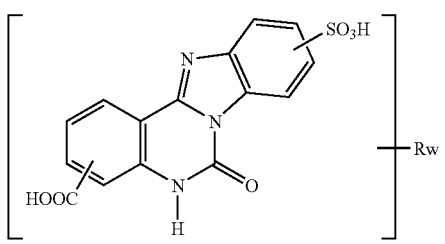 (57)
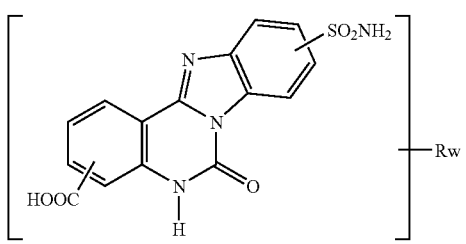 (58)
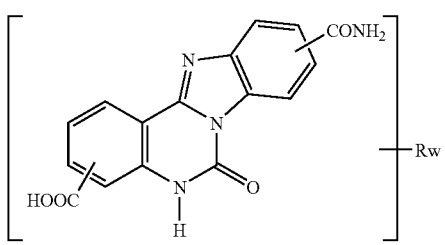 (59)
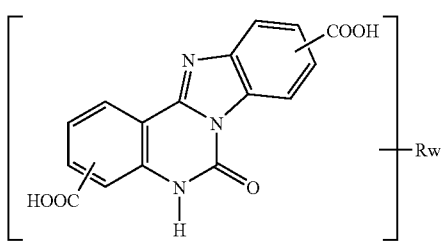 (60)
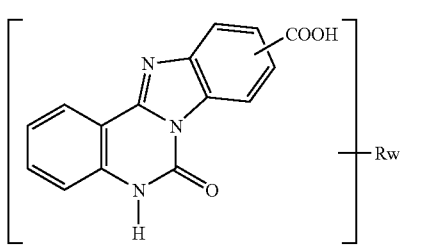 (61)
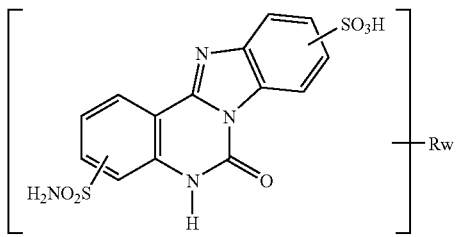 (62)
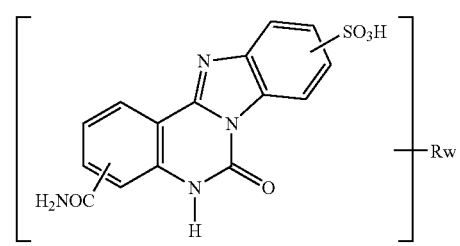 (63)
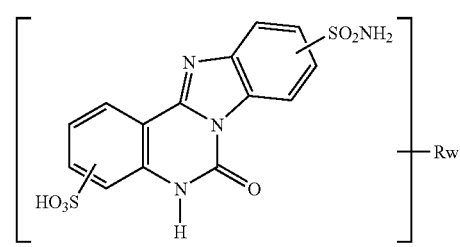 (64)
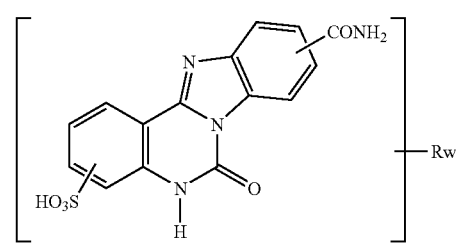 (65)
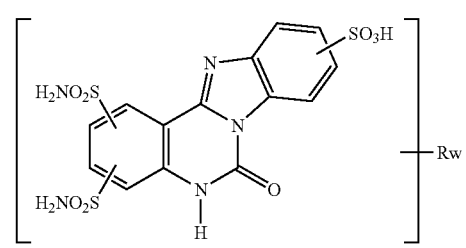 (66)
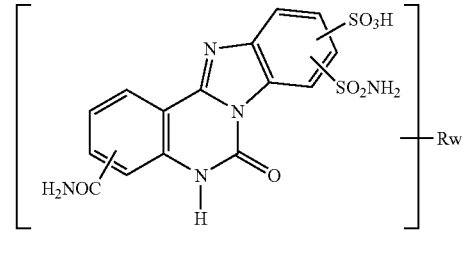 (67)
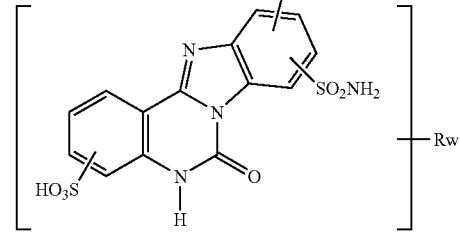 (68)

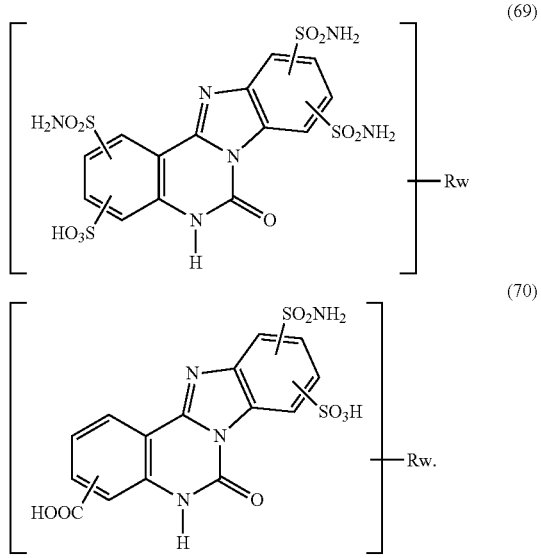

26. An optically anisotropic compensation panel according to claim 1, wherein the anisotropic host matrix is characterized by three principal refractive indices ($n_{x,h}$, $n_{y,h}$ and $n_{z,h}$) which possess normal spectral dispersion $\partial n_u(\lambda)/\partial\lambda<0$ in the visible spectral range, and wherein the subscript u is selected from the list comprising x, y and z.

27. An optically anisotropic compensation panel according to claim 1, wherein the anisotropic host matrix possesses biaxial properties of $B_A$-type and is characterized by an in-plane difference of refractive indices $\Delta_{in,h}(\lambda)=|n_{y,h}(\lambda)-n_{x,h}(\lambda)|$ possessing a normal spectral dispersion $(\partial\Delta_{in,h}(\lambda)/\partial\lambda<0)$ in the visible spectral range.

28. An optically anisotropic compensation panel according to claim 27, wherein the anisotropic host matrix is further characterized by an out-of-plane difference of refractive indices $\Delta_{out,h}(\lambda)=|n_{x,h}(\lambda)-n_{z,h}(\lambda)|$ possessing a normal spectral dispersion $(\partial\Delta_{out,h}(\lambda)/\partial\lambda<0)$ in the visible spectral range.

29. An optically anisotropic compensation panel according to claim 1, wherein the anisotropic host matrix possesses biaxial properties of $B_A$-type and is characterized by an out-of-plane difference of refractive indices $\Delta_{out,h}(\lambda)=|n_{x,h}(\lambda)-n_{z,h}(\lambda)|$ possessing normal dispersion $(\partial\Delta_{out,h}(\lambda)/\partial\lambda<0)$ in the visible spectral range.

30. An optically anisotropic compensation panel according to any of claim 28 or 29, wherein the anisotropic host matrix comprises anisotropic supramolecules characterized by a polarizability tensor, for which one of its principal axes is substantially parallel to the x-axis.

31. An optically anisotropic compensation panel according to claim 1, wherein the anisotropic host matrix possesses uniaxial properties of positive A-type and is characterized by an in-plane difference of refractive indices $\Delta_{in,h}(\lambda)=|n_{y,h}(\lambda)-n_{x,h}(\lambda)|$ possessing normal dispersion $(\partial\Delta_{in,h}(\lambda)/\partial\lambda<0)$ in the visible spectral range.

32. An optically anisotropic compensation panel according to claim 1, wherein the anisotropic host matrix possesses uniaxial properties of negative A-type and is characterized by an in-plane difference of refractive indices $\Delta_{in,h}(\lambda)=|n_{y,h}(\lambda)-n_{x,h}(\lambda)|$ possessing normal dispersion $(\partial\Delta_{in,h}(\lambda)/\partial\lambda<0)$ in the visible spectral range.

33. An optically anisotropic compensation panel according to any of claim 31 or 32, wherein the anisotropic host matrix comprises uniaxial anisotropic supramolecules which are oriented with one of their principal axes substantially parallel to the x-axis, wherein one of principal directions of polarizability tensor of said supramolecules coincides with this principal axis of supramolecule, and other two principal axes may be chosen in a perpendicular plane arbitrarily and principal values of the polarizability tensor along these chosen two principal axes are substantially equal.

34. An optically anisotropic compensation panel according to claim 1, wherein the anisotropic host matrix possesses biaxial properties of $A_C$-type and is characterized by a difference of refractive indices $\Delta_{out,h}(\lambda)=|n_{x,h}(\lambda)-n_{z,h}(\lambda)|$ possessing a normal spectral dispersion $(\partial\Delta_{out,h}(\lambda)/\partial\lambda<0)$ in the visible spectral range.

35. An optically anisotropic compensation panel according to claim 34, wherein the anisotropic host matrix is further characterized by an in-plane difference of refractive indices $\Delta_{in,h}(\lambda)=|n_{y,h}(\lambda)-n_{x,h}(\lambda)|$ possessing a normal dispersion $(\partial\Delta_{in,h}(\lambda)/\partial\lambda<0)$ in the visible spectral range.

36. An optically anisotropic compensation panel according to claim 1, wherein the anisotropic host matrix possesses biaxial properties of $A_C$-type and is characterized by an in-plane difference of refractive indices $\Delta_{in,h}(\lambda)=|n_{y,h}(\lambda)-n_{x,h}(\lambda)|$ possessing a normal spectral dispersion $(\partial\lambda_{in,h}(\lambda)/\partial\Delta<0)$ in the visible spectral range.

37. An optically anisotropic compensation panel according to claim 1, wherein the anisotropic host matrix possesses uniaxial properties of positive C-type and is characterized by an out-of-plane difference of refractive indices $\Delta_{out,h}(\lambda)=|n_{z,h}(\lambda)-n_{x,h}(\lambda)|$ possessing a normal spectral dispersion $(\partial\Delta_{out,h}(\lambda)/\partial\lambda<0)$ in the visible spectral range.

38. An optically anisotropic compensation panel according to claim 1, wherein the anisotropic host matrix possesses uniaxial properties of negative C-type and is characterized by an out-of-plane difference of refractive indices $\Delta_{out,h}(\lambda)=|n_{x,h}(\lambda)-n_{z,h}(\lambda)|$ possessing a normal spectral dispersion $(\partial\Delta_{out,h}(\lambda)/\partial\lambda<0)$ in the visible spectral range.

39. An optically anisotropic compensation panel according to claim 1, wherein the guest absorbing particle is selected from the list comprising a single atom, single organic molecule, single inorganic molecule, macromolecule, polymer molecule, group of atoms, inorganic nano-crystal, group of molecules, molecular nano-crystal, and non-ordered nano-particle.

40. An optically anisotropic compensation panel according to claim 1, wherein the guest particles are made of at least one inorganic material.

41. An optically anisotropic compensation panel according to claim 1, wherein the guest particles are made of at least one organic material.

42. An optically anisotropic compensation panel, comprising at least one optically anisotropic layer based on an ordered guest-host system comprising
an anisotropic host matrix, and
a guest component comprising guest particles,
wherein the anisotropic host matrix comprises an organic compound transparent to electromagnetic radiation in the visible spectral range,
the guest particles provide an absorption additional to an absorption of the anisotropic host matrix, and
said additional absorption is realized in at least one principal direction of the anisotropic host matrix in at least one sub-range of the wavelength range from approximately 250 to 2500 nm;
wherein the compensation panel possesses a spectrally controllable dispersion of refractive indices, and
wherein the guest particles are pigments or dye molecules.

43. An optically anisotropic compensation panel according to claim 1 or 42, wherein the guest particles are optically isotropic particles.

44. An optically anisotropic compensation panel according to claim 1 or 42, wherein the guest particles are optically anisotropic particles.

45. An optically anisotropic compensation panel according to claim 42, wherein at least one dye molecule has a general structural formula corresponding to structures 71 to 79:

46. An optically anisotropic compensation panel according to claim 1 or 42, further comprising a substrate.

47. An optically anisotropic compensation panel according to claim 46, wherein the substrate is made of one or several materials of the group comprising diamond, quartz, plastics, glasses, ceramics, and comprises at least one element of the group comprising color filter substrate, circuit features, multilevel interconnects, and TFT-array substrate.

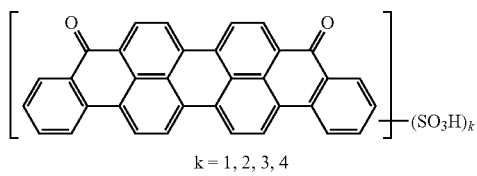

(71)

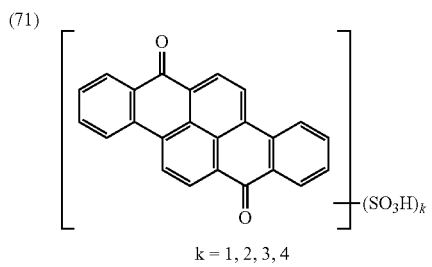

(72)

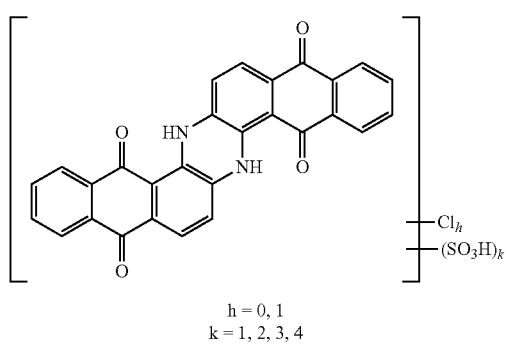

(73)

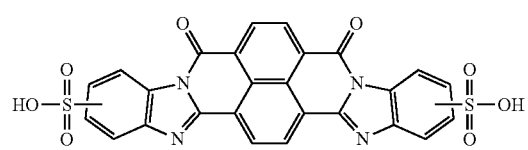

(74)

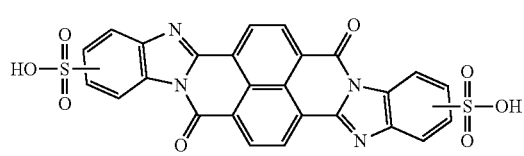

(75)

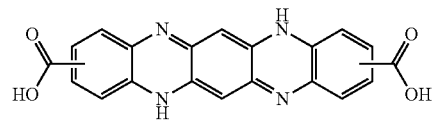

(76)

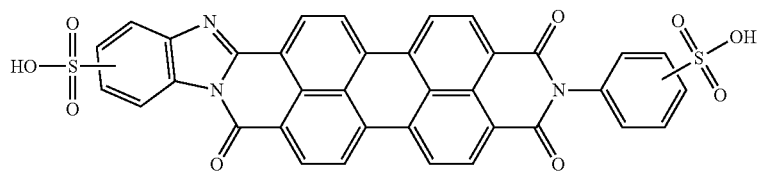

(77)

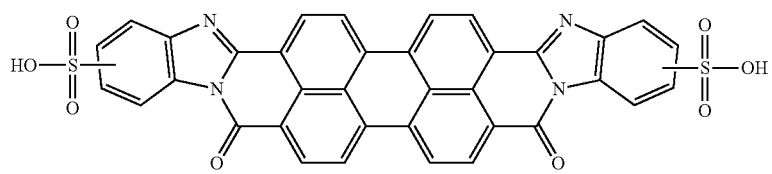

(78)

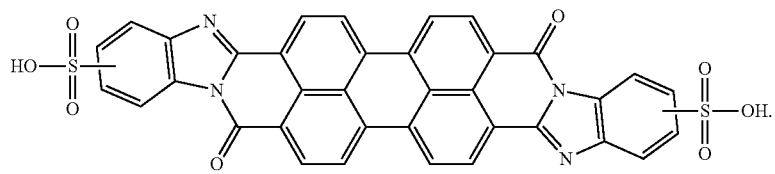

(79)

48. A color liquid crystal display comprising
a liquid crystal cell,
first and second polarizers arranged on each side of the liquid crystal cell, and
at least one compensation panel located between said polarizers,
  wherein the compensation panel comprises at least one optically anisotropic layer based on an ordered guest-host system,
wherein the guest-host system comprising
  an anisotropic host matrix comprising an organic compound transparent to electromagnetic radiation in the visible spectral range, and
  a guest component comprising guest particles,
wherein the guest particles provide an absorption additional to an absorption of the anisotropic host matrix, and
wherein said additional absorption is realized in at least one principal direction of the anisotropic host matrix in at least one subrange of the wavelength range from approximately 250 to 2500 nm,
wherein the organic compound has a general structural formula I

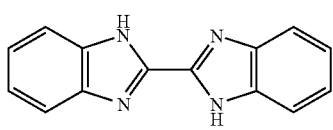
(I)

where Sys is an at least partially conjugated substantially planar polycyclic molecular system, X is a carboxylic group —COOH, m is 0, 1, 2, 3 or 4; Y is a sulfonic group —$SO_3H$, n is 0, 1, 2, 3 or 4; Z is a carboxamide, p is 0, 1, 2, 3 or 4; Q is a sulfonamide, v is 0, 1, 2, 3 or 4; D is a counterion; s is the number of counterions providing electrically neutral state of the molecule; R is a substituent selected from the list comprising $CH_3$, $C_2H_5$, Cl, Br, $NO_2$, F, $CF_3$, CN, OH, $CH_3$, $OC_2H_5$, $OCOCH_3$, OCN, SCN, $NH_2$, and $NHCOCH_3$, and w is 0, 1, 2, 3 or 4.

49. A color liquid crystal display according to claim 48, further comprising a color filter.

50. A color liquid crystal display according to claim 49, wherein the color filter has a configuration selected from the list comprises stripe, mosaic and delta configurations.

51. A color liquid crystal display according to claim 48, wherein the polycyclic molecular system Sys is substantially transparent in the visible spectral range.

52. A color liquid crystal display according to any of claims 48 or 51, wherein the polycyclic molecular system Sys has a general structural formula from the list comprising structures II to XLVI:

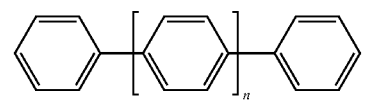
(II)

where n is the number in the range from 1 to 8

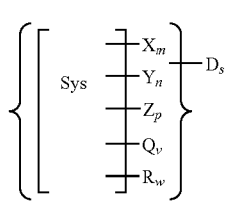
(III)

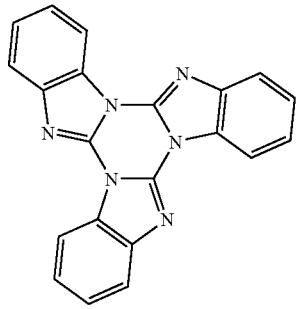
(IV)

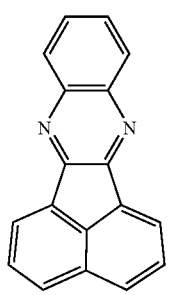
(V)

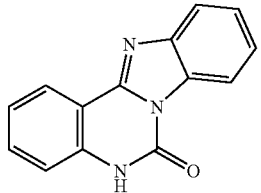
(VI)

-continued
(VII)
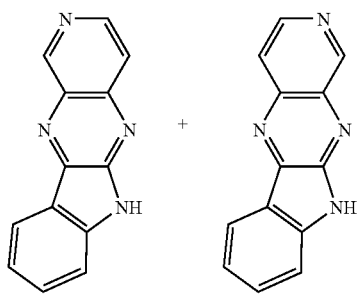  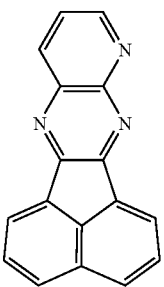
(VIII)
(IX)
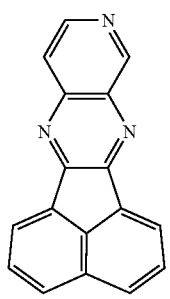
(X)
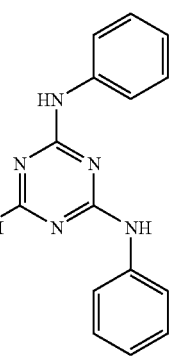
(XI)
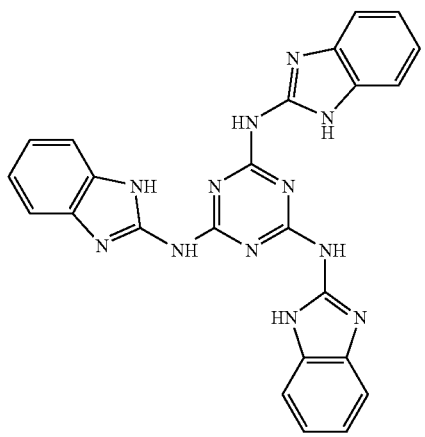
(XII)
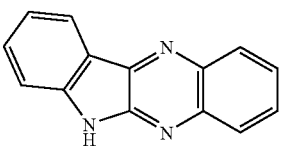
(XIII)
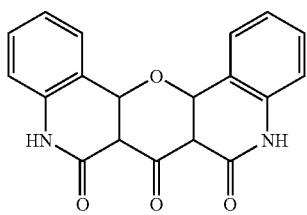
(XIV)
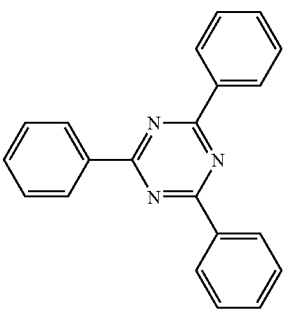
(XV)
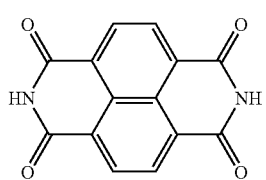
(XVI)
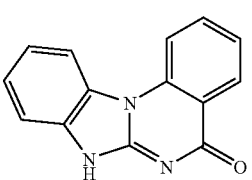

-continued
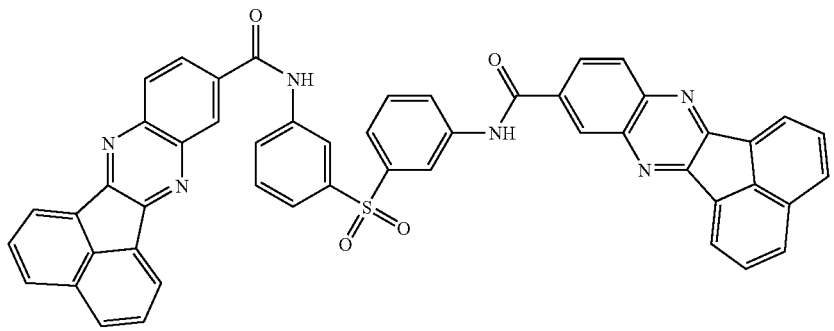
(XVII)
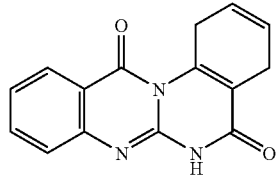
(XVIII)
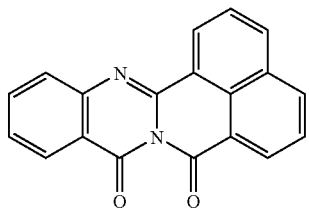
(XIX)
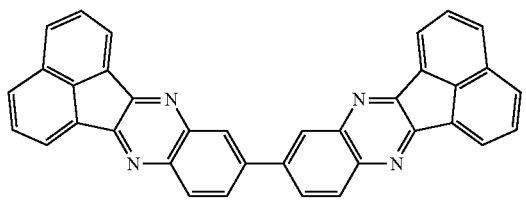
(XX)
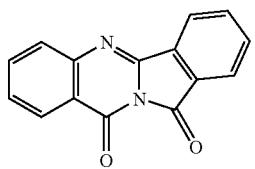
(XXI)
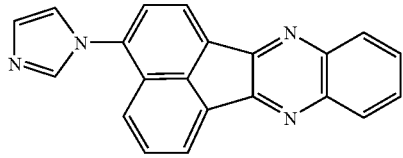
(XXII)
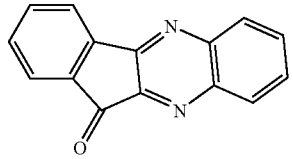
(XXIII)
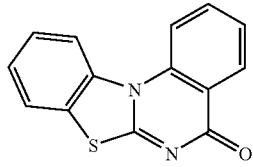
(XXIV)
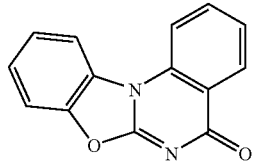
(XXV)
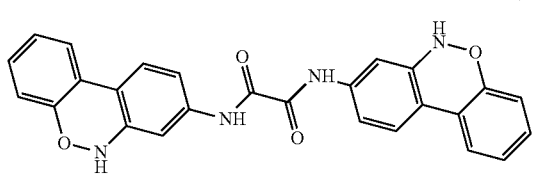
(XXVI)
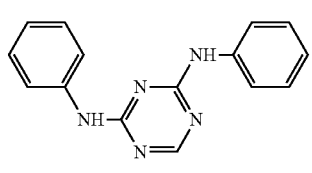
(XXVII)
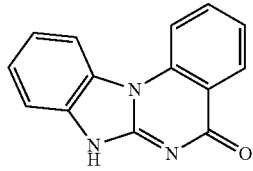
(XXVIII)
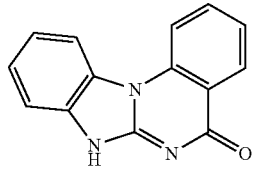
(XXIX)

-continued
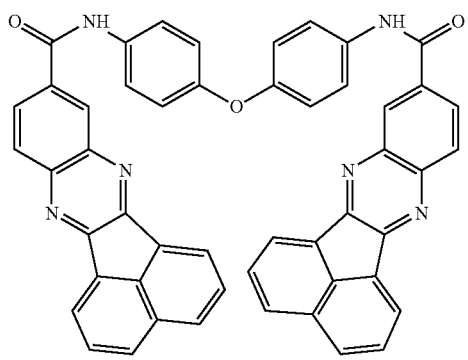
(XXX)
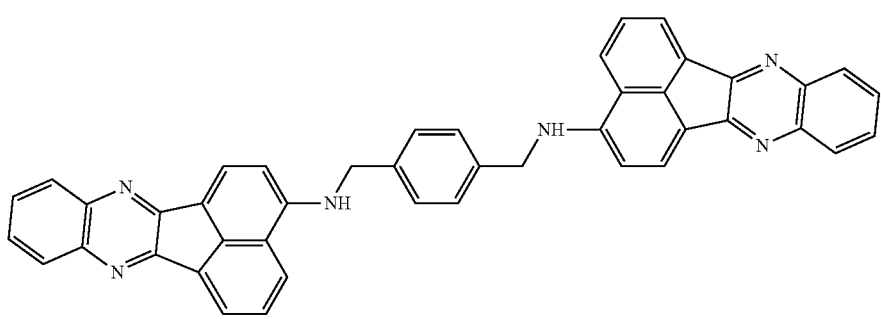
(XXXI)
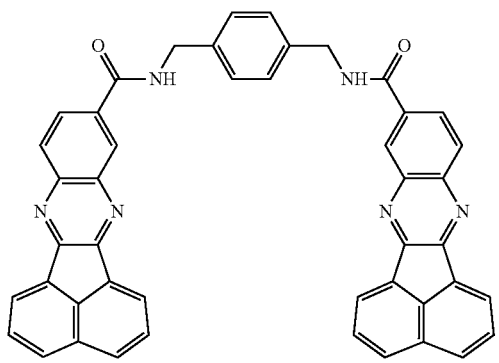
(XXXII)
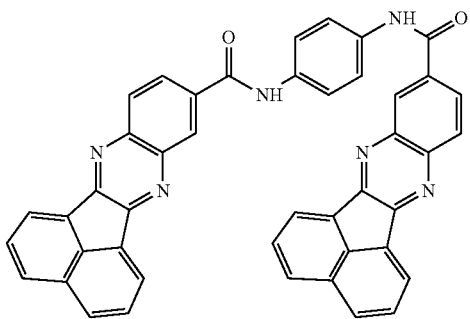
(XXXIII)
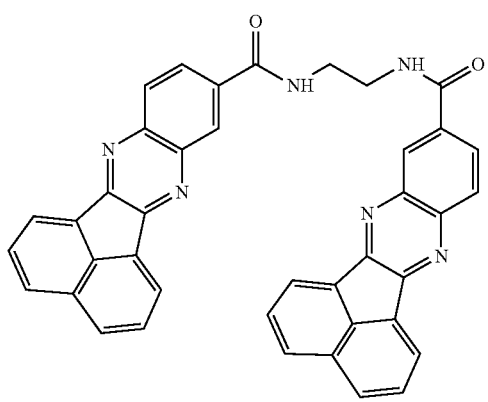
(XXXIV)
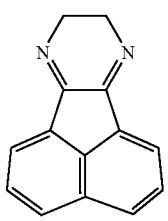
(XXXV)

-continued
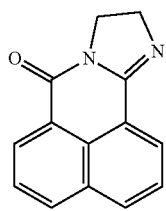
(XXXV)
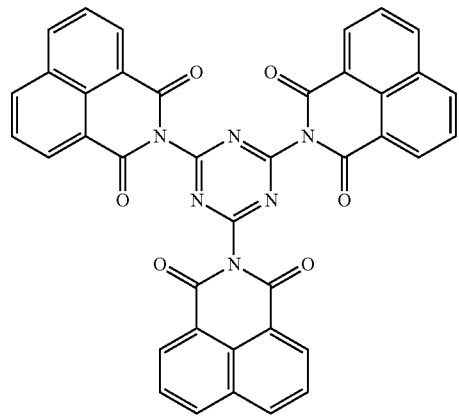
(XXXVI)
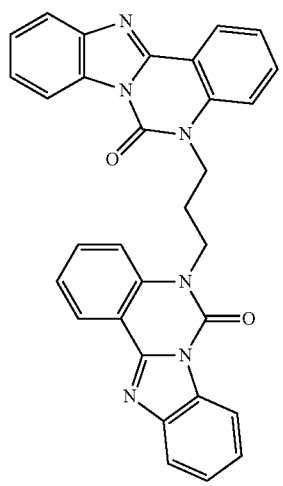
(XXXVII)
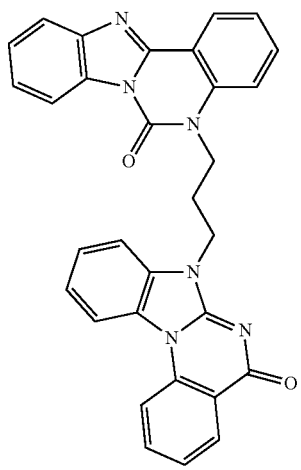
(XXXVIII)
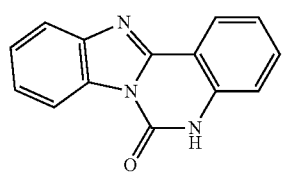
(XXXIX)
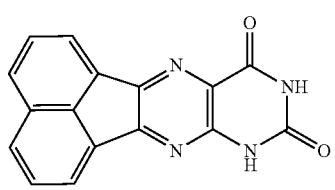
(XL)
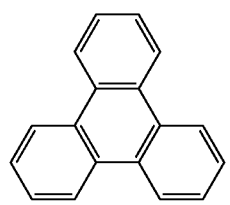
(XLI)
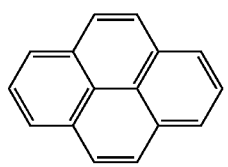
(XLII)
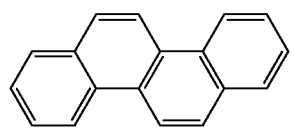
(XLIII)
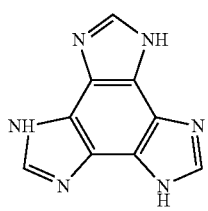
(XLIV)

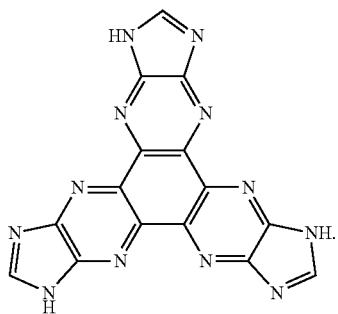

(XLVI)

53. A color liquid crystal display according to claim 48, wherein the counterion is selected from the list comprising $H^+$, $NH_4^+$, $Na^+$, $K^+$, $Li^+$, $Ba^{++}$, $Ca^{++}$, $Mg^{++}$, $Sr^{++}$, $Cs^+$, $Pb^{++}$, and $Zn^{++}$.

54. A color liquid crystal display according to claim 48, wherein the organic compound is an oligophenyl derivative.

55. A color liquid crystal display according to claim 54, wherein the oligophenyl derivative has a general structural formula corresponding to one of structures 1 to 7:

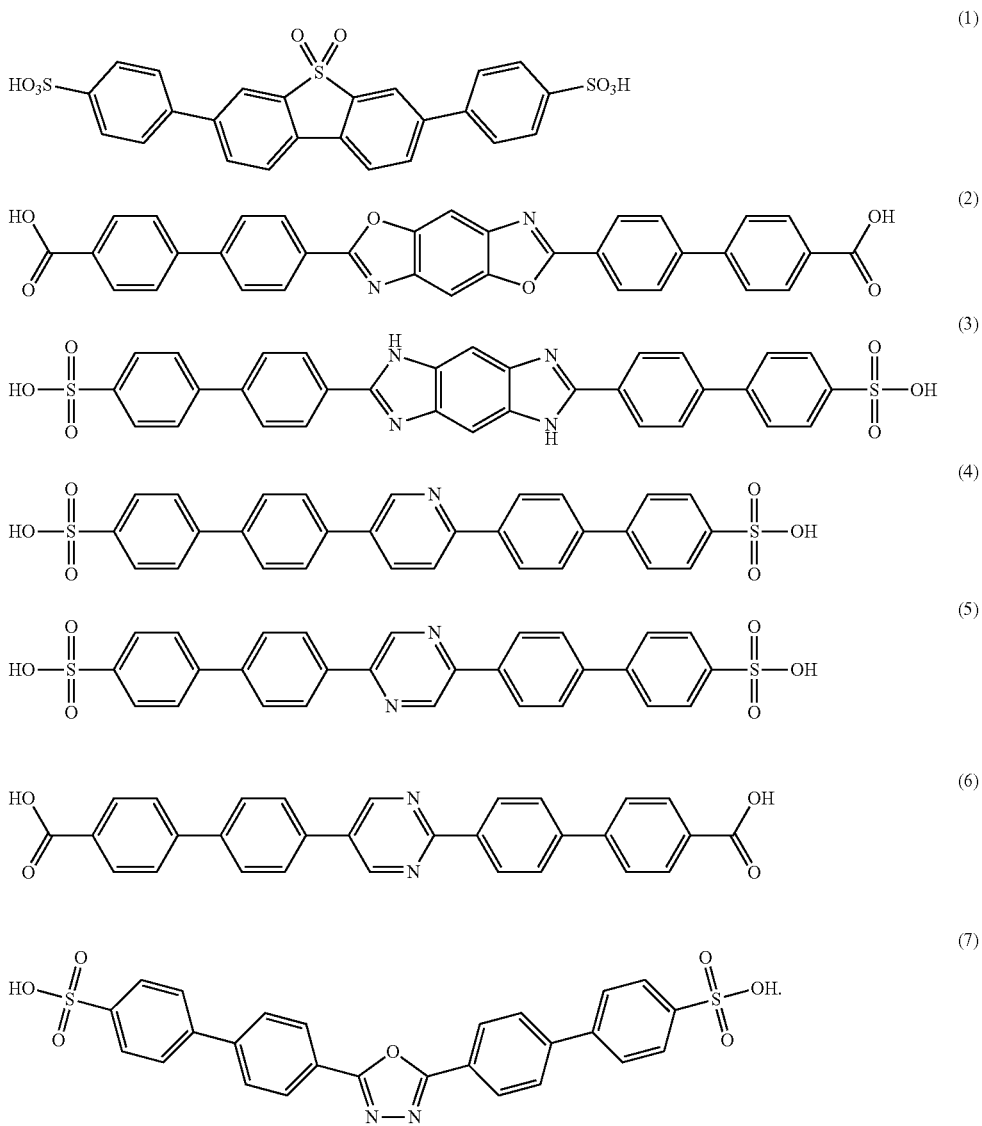

56. A color liquid crystal display according to claim 48, wherein the organic compound is a bibenzimidazole derivative and has a general structural formula corresponding to one of structures 8 to 26:

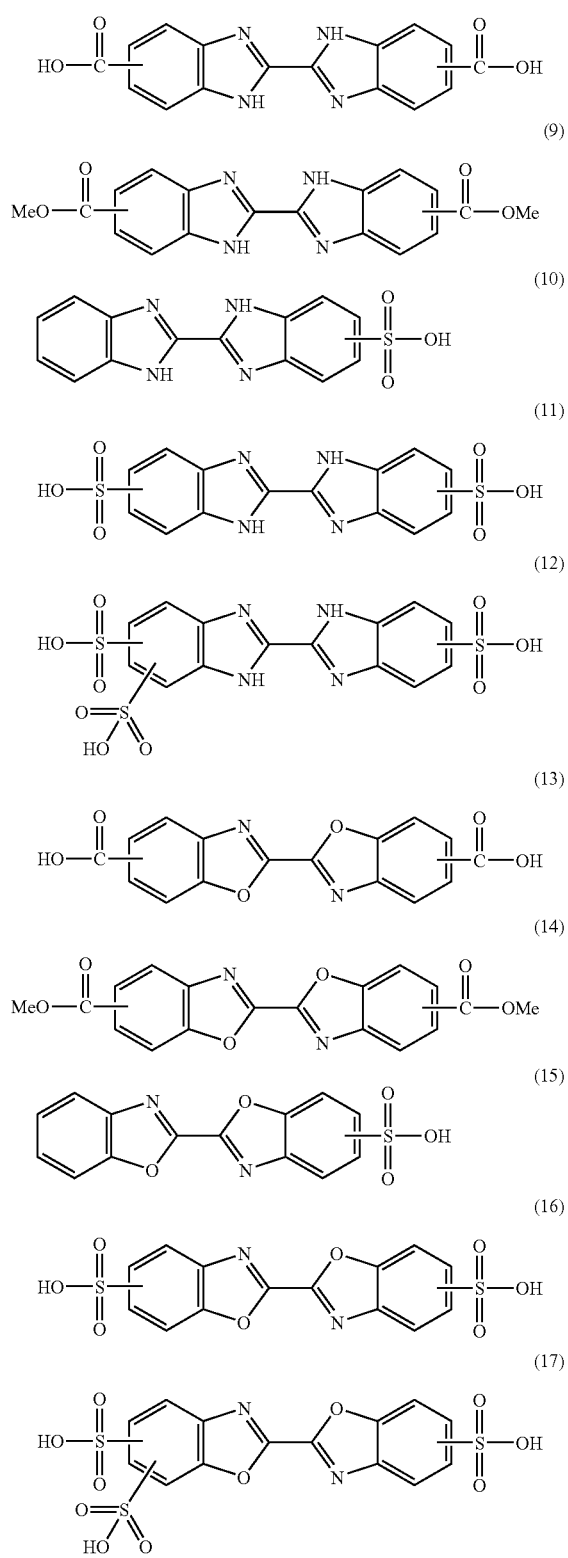

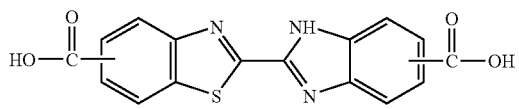

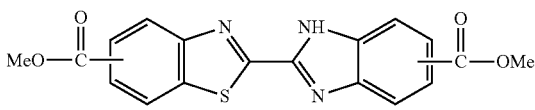

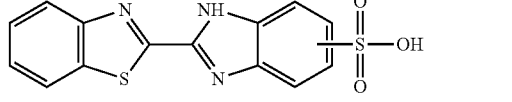

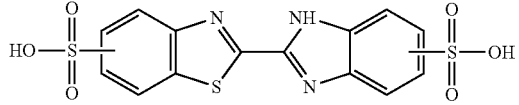

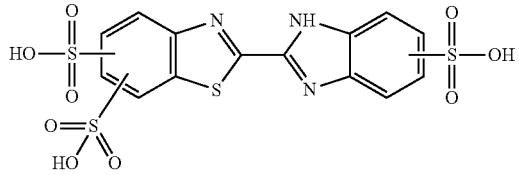

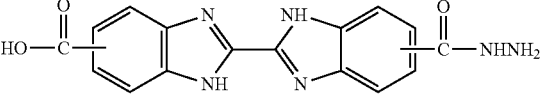

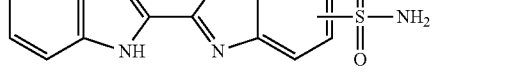

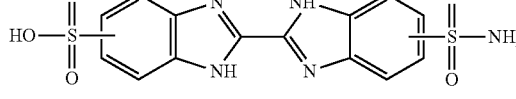

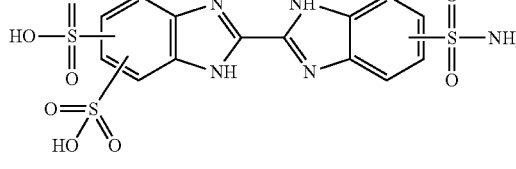

57. A color liquid crystal display according to claim 48, wherein the organic compound is a "triazine" derivative and has a general structural formula corresponding to one of structures 27 to 29:

(27)

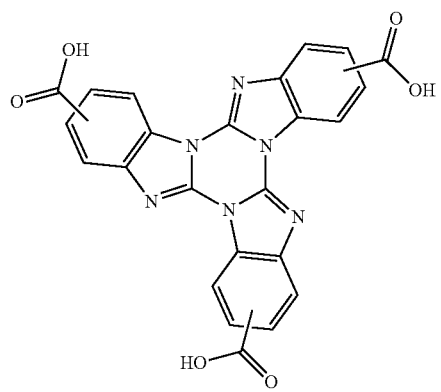

(28)

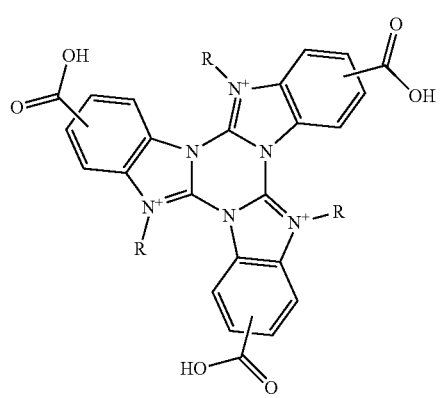

R = CH₃, C₂H₅, C₃H₇, C₄H₉

(29)

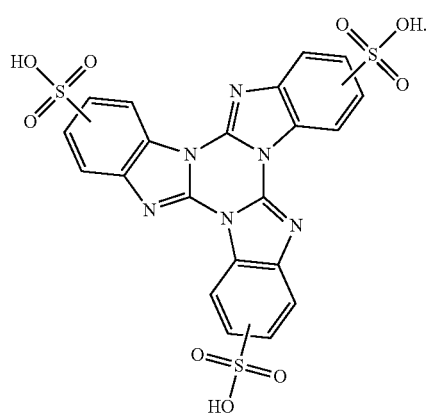

(30)

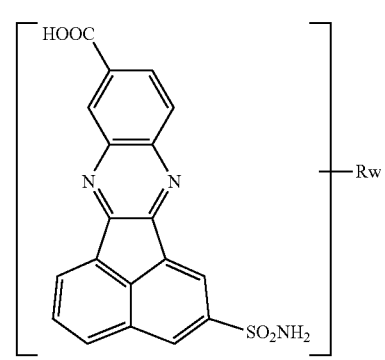

(31)

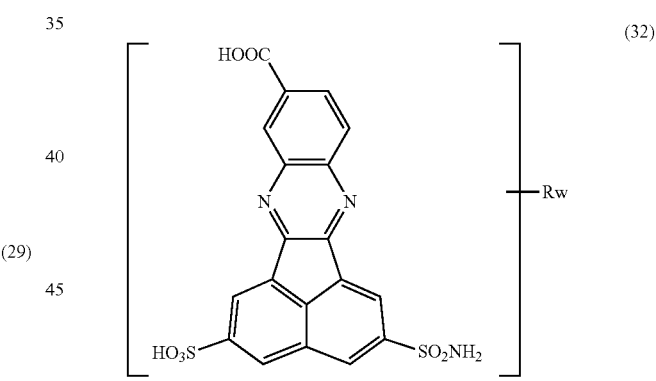

(32)

(33)

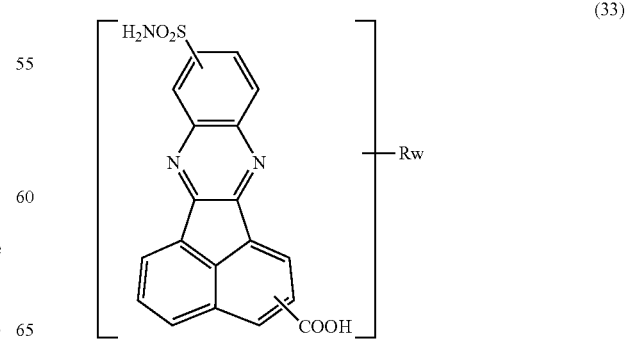

58. A color liquid crystal display according to claim 48, wherein the organic compound is an acenaphthoquinoxaline derivative.

59. A color liquid crystal display according to claim 58, wherein the acenaphthoquinoxaline derivative comprises carboxylic and/or sulfonic groups and has a general structural formula corresponding to one of structures 30 to 48:

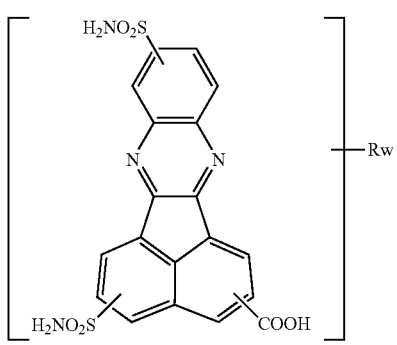
(34)
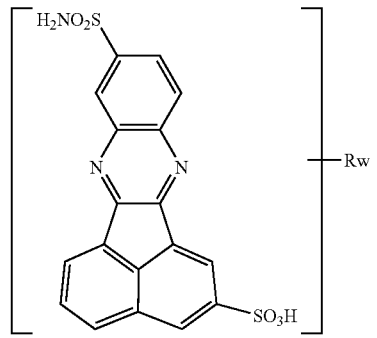
(38)
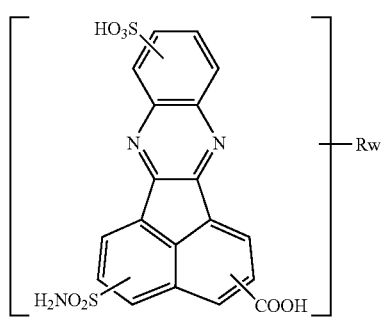
(35)
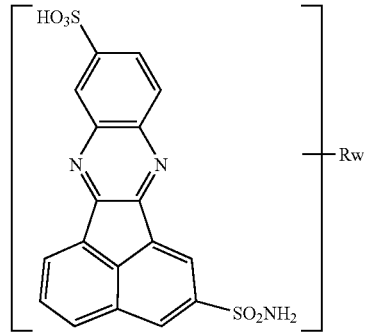
(39)
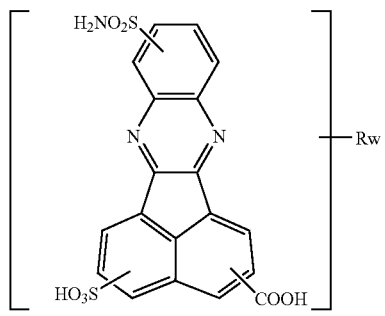
(36)
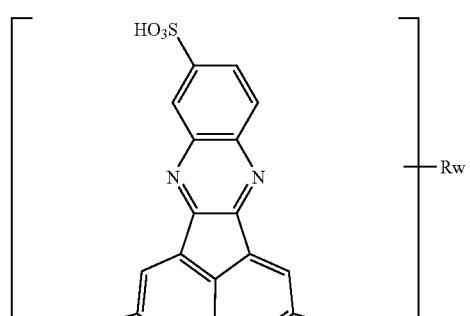
(40)
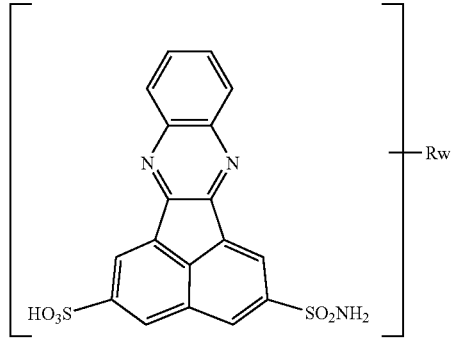
(37)
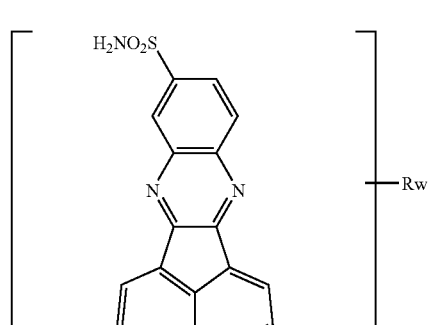
(41)

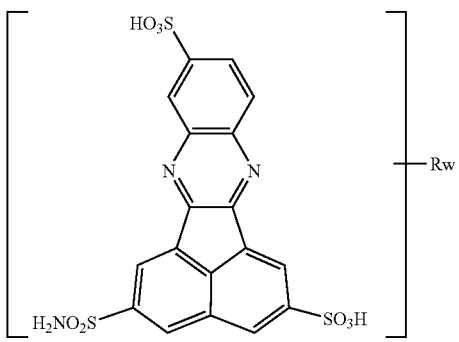 (42)

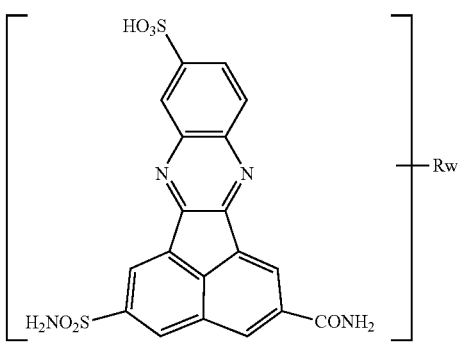 (46)

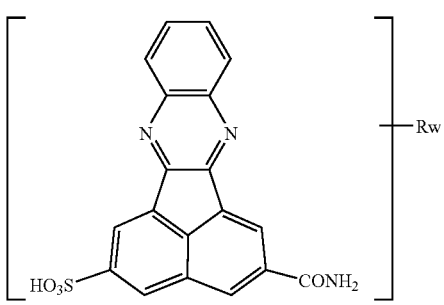 (43)

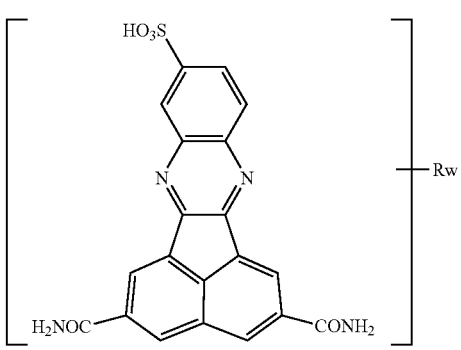 (47)

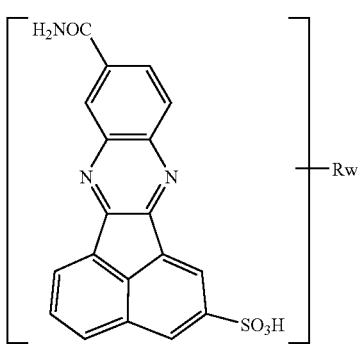 (44)

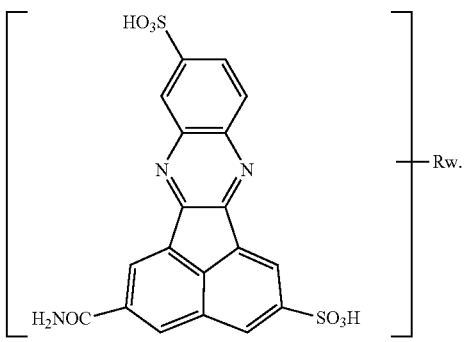 (48)

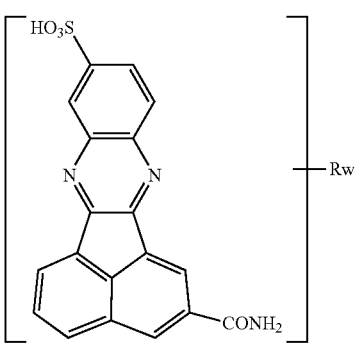 (45)

60. A color liquid crystal display according to claim 48, wherein the organic compound is a 6,7-dihydrobenzimidazo[1,2-c]quinazolin-6-one derivative.

61. A color liquid crystal display according to claim 60, wherein the 6,7-dihydrobenzimidazo[1,2-c]quinazolin-6-one derivative comprises carboxylic and/or sulfonic groups and said derivative has a general structural formula from the group comprising structures 49 to 70:

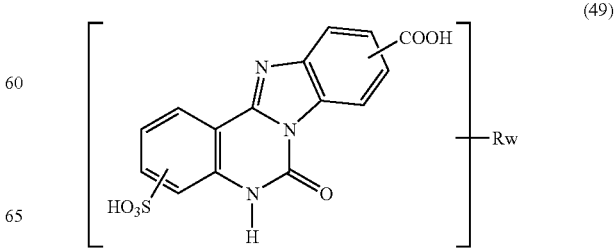 (49)

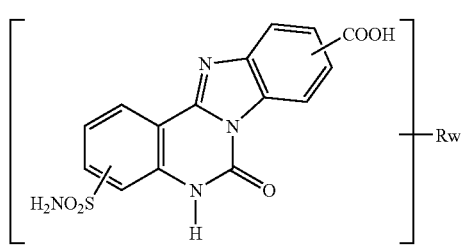 (50)
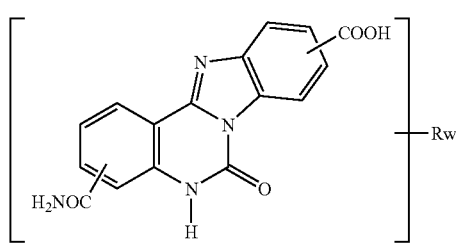 (51)
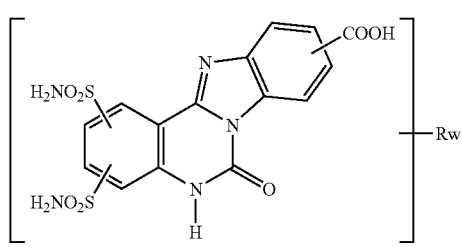 (52)
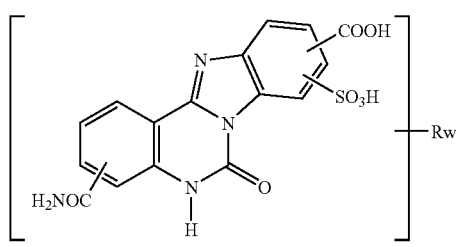 (53)
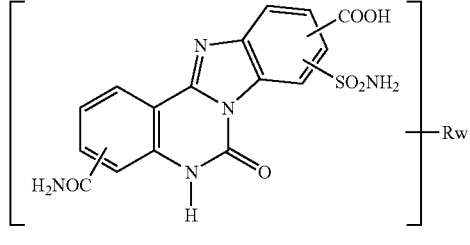 (54)
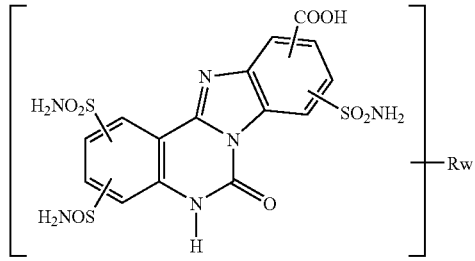 (55)
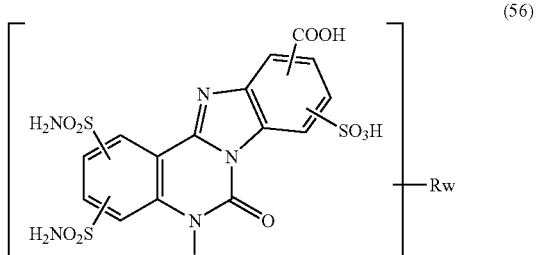 (56)
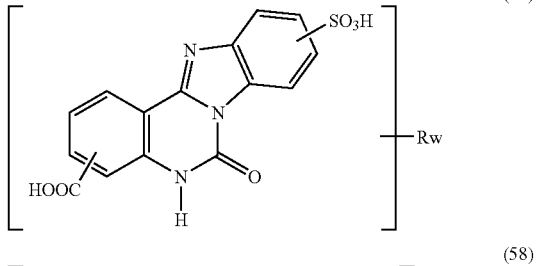 (57)
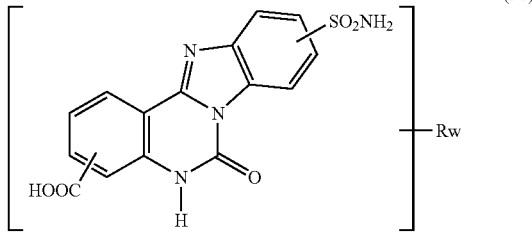 (58)
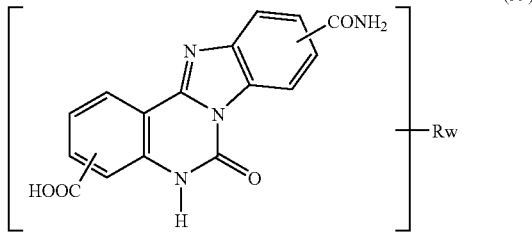 (59)
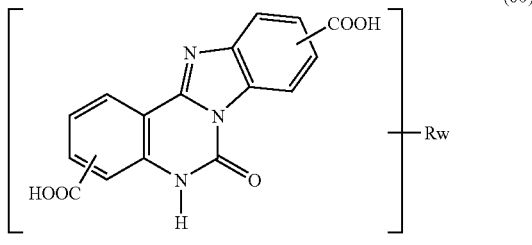 (60)
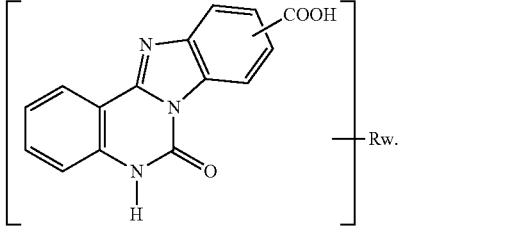 (61)
62. A color liquid crystal display according to claim 48, wherein the optically anisotropic layer is characterized by three principal refractive indices ($n_x$, $n_y$, and $n_z$) at least one of which satisfies the condition $\partial n_u(\lambda)/\partial \lambda \geq 0$ in at least one wavelength subrange of the visible spectral range, wherein the inferior index u is selected from the list comprising x, y and z.

63. A color liquid crystal display according to claim 48, wherein the optically anisotropic layer possesses biaxial properties of $B_A$-type and is characterized by an in-plane difference of refractive indices $\Delta_{in}(\lambda)=|n_y(\lambda)-n_x(\lambda)|$ which satisfies the condition $\partial \Delta_{in}(\lambda)/\partial \lambda \geqq 0$ in at least one wavelength subrange of the visible spectral range.

64. A color liquid crystal display according to claim 63, wherein the optically anisotropic layer is further characterized by an out-of-plane difference of refractive indices $\Delta_{out}(\lambda)=|n_z(\lambda)-n_x(\lambda)|$ which satisfies the condition $\partial \lambda_{out}(\lambda)/\partial \lambda \geqq 0$ in at least one wavelength subrange of the visible spectral range.

65. A color liquid crystal display according to claim 48, wherein the optically anisotropic layer possesses biaxial properties of $B_A$-type and is characterized by an out-of-plane difference of refractive indices $\Delta_{out}(\lambda)=|n_z(\lambda)-n_x(\lambda)|$ which satisfies the condition $\partial \Delta_{out}(\lambda)/\partial \lambda \geqq 0$ in at least one wavelength subrange of the visible spectral range.

66. A color liquid crystal display according to claim 48, wherein the optically anisotropic layer possesses uniaxial properties of negative A-type and is characterized by an in-plane difference of refractive indices $\Delta_{in}(\lambda)=|n_y(\lambda)-n_x(\lambda)|$ which satisfies the condition $\partial \Delta_{in}(\lambda)/\partial \lambda \geqq 0$ in at least one wavelength subrange of the visible spectral range.

67. A color liquid crystal display according to claim 48, wherein the optically anisotropic layer possesses uniaxial properties of positive A-type and is characterized by an in-plane difference of refractive indices $\Delta_{in}(\lambda)=|n_y(\lambda)-n_x(\lambda)|$ which satisfies the condition $\partial \Delta_{in}(\lambda)/\partial \lambda \geqq 0$ in at least one wavelength subrange of the visible spectral range.

68. A color liquid crystal display according to claim 48, wherein the optically anisotropic layer possesses biaxial properties of $A_C$-type and is characterized by an in-plane difference of refractive indices $\Delta_{in}(\lambda)=|n_y(\lambda)-n_x(\lambda)|$ which satisfies the condition $\partial \Delta_{in}(\lambda)/\partial \lambda \geqq 0$ in at least one wavelength subrange of the visible spectral range.

69. A color liquid crystal display according to claim 68, wherein the optically anisotropic layer is further characterized by an out-of-plane difference of refractive indices $\Delta_{out}(\lambda)=|n_x(\lambda)-n_z(\lambda)|$ which satisfies the condition $\partial \Delta_{out}(\lambda)/\partial \lambda \geqq 0$ in at least one wavelength subrange of the visible spectral range.

70. A color liquid crystal display according to claim 48, wherein the optically anisotropic layer possesses biaxial properties of $A_C$-type and is characterized by an out-of-plane difference of refractive indices $\Delta_{out}(\lambda)=|n_x(\lambda)-n_z(\lambda)|$ which satisfies the condition $\partial \Delta_{out}(\lambda)/\partial \lambda \geqq 0$ in at least one wavelength subrange of the visible spectral range.

71. A color liquid crystal display according to claim 48, wherein the optically anisotropic layer possesses uniaxial properties of negative C-type and is characterized by an out-of-plane difference of refractive indices $\Delta_{out}(\lambda)=|n_x(\lambda)-n_z(\lambda)|$ which satisfies the condition $\partial \Delta_{out}(\lambda)/\partial \lambda \geqq 0$ in at least one wavelength subrange of the visible spectral range.

72. A color liquid crystal display according to claim 48, wherein the optically anisotropic layer possesses uniaxial properties of positive C-type and is characterized by an out-of-plane difference of refractive indices $\Delta_{out}(\lambda)=|n_z(\lambda)-n_x(\lambda)|$ which satisfies the condition $\partial \Delta_{out}(\lambda)/\partial \lambda \geqq 0$ in at least one wavelength subrange of the visible spectral range.

73. A color liquid crystal display according to any of claims 63 to 64 or 66 to 69, wherein the in-plane difference of refractive indices $\Delta_{in}(\lambda)$ obeys the following condition: a wavelength dispersion factors $(\Delta_{in,450}/\Delta_{in,550})$ and $(\Delta_{in,550}/\Delta_{in,650})$ are in a range of 0.4-1.0, wherein $\Delta_{in,450}$, $\Delta_{in,550}$ and $\Delta_{in,650}$ are values of the in-plain differences of refractive indices at wavelengths of 450 nm, 550 nm and 650 nm respectively.

74. A color liquid crystal display according to any of claims 64 to 65 or 69 to 72, wherein the out-of-plane difference of refractive indices $\Delta_{out}(\lambda)$ obeys the following condition: spectral dispersion factors $(\Delta_{out,450}/\Delta_{out,550})$ and $(\Delta_{out,550}/\Delta_{out,650})$ are in a range of 0.4-1.0, wherein $\Delta_{out,450}$, $\Delta_{out,550}$ and $\Delta_{out,650}$ are values of the out-of-plane differences of the refractive indices $\Delta_{out}(\lambda)$ at wavelengths of 450 nm, 550 nm and 650 nm respectively.

75. A color liquid crystal display according to claim 48, wherein the guest particles are selected from the list comprising a single atom, single organic molecule, single inorganic molecule, macromolecule, polymer molecule, group of atoms, inorganic nano-crystal, group of molecules, molecular nano-crystal, and non-ordered nano-particle.

76. A color liquid crystal display according to claim 48, wherein the guest particles are made of at least one inorganic material.

77. A color liquid crystal display according to claim 48, wherein the guest particles are made of at least one organic material.

78. A color liquid crystal display, comprising
a liquid crystal cell,
first and second polarizers arranged on each side of the liquid crystal cell, and
at least one compensation panel located between said polarizers,
wherein the compensation panel comprises at least one optically anisotropic layer based on an ordered guest-host system,
wherein the guest-host system comprising
an anisotropic host matrix comprising an organic compound transparent to electromagnetic radiation in the visible spectral range, and
a guest component comprising guest particles,
wherein the guest particles provide an absorption additional to an absorption of the anisotropic host matrix, and
wherein said additional absorption is realized in at least one principal direction of the anisotropic host matrix in at least one subrange of the wavelength range from approximately 250 to 2500 nm,
wherein the guest particles are pigments or dye molecules.

79. A color liquid crystal display according to claim 48 or 78, wherein the guest particles are optically isotropic particles.

80. A color liquid crystal display according to claim 48 or 78, wherein the guest particles are optically anisotropic particles.

81. A color liquid crystal display according to claim 78, wherein at least one dye molecule has a general structural formula corresponding to structures 71 to 79:

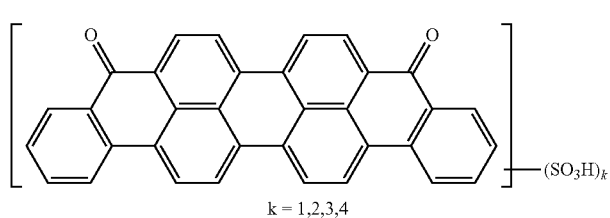
(71)
k = 1,2,3,4
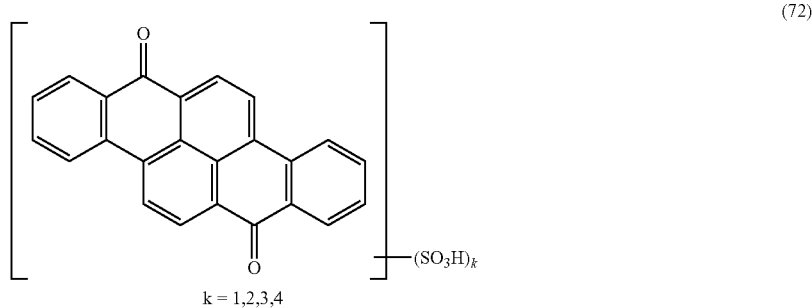
(72)
k = 1,2,3,4
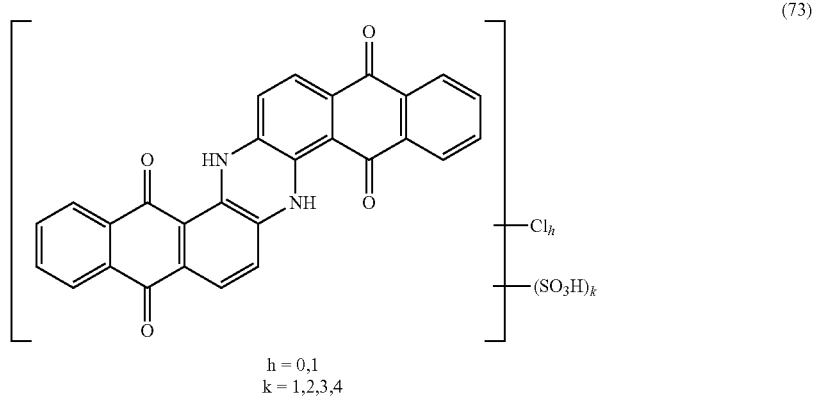
(73)
h = 0,1
k = 1,2,3,4
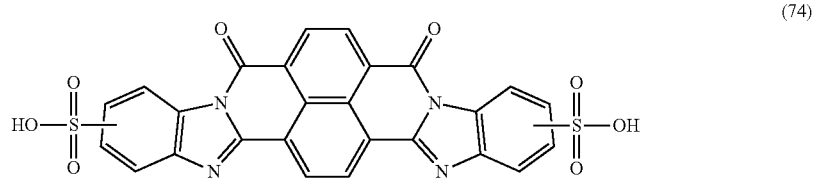
(74)
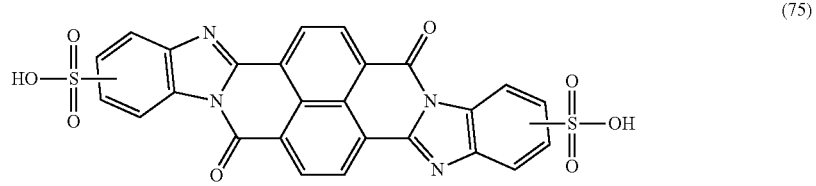
(75)
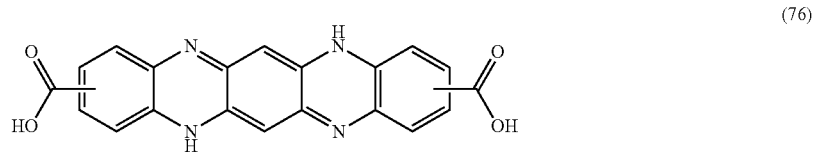
(76)
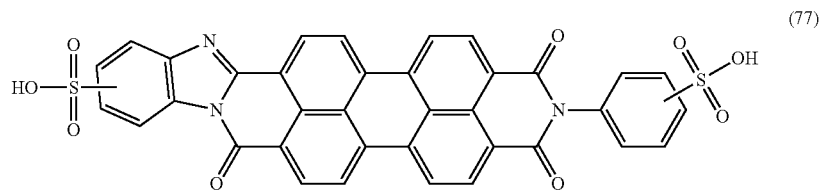
(77)

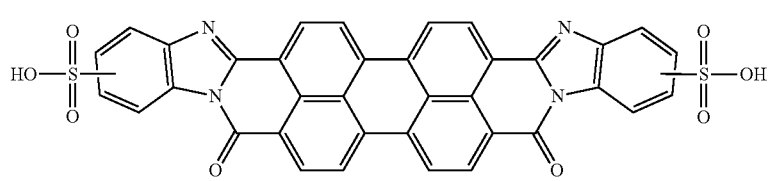
(78)

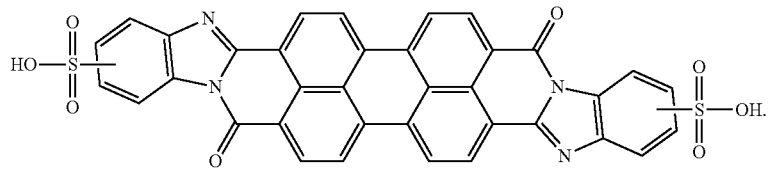
(79)

82. A color liquid crystal display according to claim 48 or 78 wherein the compensation panel further comprises a substrate, wherein the substrate is made of one or several materials of the group comprising diamond, quartz, plastics, glasses, ceramics, and comprises at least one element of the group comprising the color filter substrate, circuit features, multilevel interconnects, and a TFT-array substrate.

83. A color liquid crystal display according to claim 48 or 78, wherein the liquid crystal cell is an in-plane switching mode liquid crystal cell.

84. A color liquid crystal display according to claim 48 or 78, wherein the liquid crystal cell is a vertically-aligned mode liquid crystal cell.

85. A color liquid crystal display according to claim 48 or 78, wherein the compensation panel is located inside the liquid crystal cell.

86. A color liquid crystal display according to claim 48 or 78, wherein the compensation panel is located outside the liquid crystal cell.

* * * * *